(12) United States Patent
Yang

(10) Patent No.: US 11,164,325 B2
(45) Date of Patent: Nov. 2, 2021

(54) GENERATING AND EVALUATING MAPPINGS BETWEEN SPATIAL POINT SETS

(71) Applicant: Tianzhi Yang, Westbury, NY (US)

(72) Inventor: Tianzhi Yang, Westbury, NY (US)

( * ) Notice: Subject to any disclaimer, the term of this patent is extended or adjusted under 35 U.S.C. 154(b) by 9 days.

(21) Appl. No.: 16/783,959

(22) Filed: Feb. 6, 2020

(65) Prior Publication Data

US 2020/0327683 A1 Oct. 15, 2020

(51) Int. Cl.
*G06K 9/62* (2006.01)
*G06T 7/33* (2017.01)
*G06T 3/00* (2006.01)

(52) U.S. Cl.
CPC .............. *G06T 7/33* (2017.01); *G06K 9/6202* (2013.01); *G06K 9/6215* (2013.01); *G06T 3/0006* (2013.01)

(58) Field of Classification Search
CPC .. G06K 9/6211; G06K 9/6215; G06K 9/6224; G06K 9/00664; G06K 9/00791; G06K 9/00805; G06K 19/07722; G06K 9/00973; G06K 9/4671; G06K 9/6202; G06T 7/33; G06T 2207/20164; G06T 3/0006; G06T 3/0075; G06T 7/246; G06T 2207/20072; G06T 7/277; G06T 7/337; G06T 7/73; G06F 17/10; G06F 17/16; G06F 16/23; G06F 16/437; G06F 7/785; G06F 9/28; G06Q 50/01
See application file for complete search history.

(56) References Cited

U.S. PATENT DOCUMENTS

| | | | |
|---|---|---|---|
| 6,272,245 B1 | 8/2001 | Lin | |
| 6,453,064 B1 * | 9/2002 | Aikawa | G06K 9/00 382/128 |
| 6,640,201 B1 | 10/2003 | Hahlweg | |

(Continued)

OTHER PUBLICATIONS

Yang et al. An Affine Energy Model for Image Registration Using Markov Chain Monte Carlo. Technical Report.

(Continued)

*Primary Examiner* — Ian L Lemieux

(57) ABSTRACT

A method implemented on a computing device comprising a data-parallel coprocessor and a memory coupled with the data-parallel processor for generating and evaluating N-to-1 mappings between spatial point sets in nD. The method comprises using the computing device to carry out steps comprising receiving a first and a second spatial point sets, an array of (n+1) combinations in the first spatial point set, an array of one or more pairs of neighbor (n+1) combinations referencing into the array of (n+1) combinations, and a CCISS between the two spatial point sets; computing a plurality of solving structures and provide a two-level indexing structure for (n+1) combinations for the plurality of (n+1) combinations; generating one or more N-to-1 mappings; and generating a plurality of local distance measures for unique combinations of the one or more pairs of neighbor (n+1) combinations and the one or more N-to-1 mappings. Some embodiments further comprises providing in addition a two-level indexing structure for pairs of neighbor (n+1) combinations for generating the plurality of local distance measures.

20 Claims, 24 Drawing Sheets

(56) References Cited

U.S. PATENT DOCUMENTS

| | | | |
|---|---|---|---|
| 7,010,158 | B2 | 3/2006 | Cahill et al. |
| 7,373,275 | B2 | 5/2008 | Kraft |
| 8,144,947 | B2 | 3/2012 | Kletter et al. |
| 8,233,722 | B2 | 7/2012 | Kletter et al. |
| 8,280,640 | B2 * | 10/2012 | Levin .................. G06F 7/02 702/19 |
| 8,571,351 | B2 | 10/2013 | Yang |
| 8,811,772 | B2 | 8/2014 | Yang |
| 8,867,827 | B2 * | 10/2014 | Yeatman, Jr. ........ H04N 13/275 382/154 |
| 9,020,274 | B2 | 4/2015 | Xiong et al. |
| 10,467,499 | B2 * | 11/2019 | Lawrence .......... G06K 9/00288 |
| 10,649,770 | B2 * | 5/2020 | Johnson ................ G06F 16/23 |
| 2018/0041747 | A1 * | 2/2018 | Zhou .................... H04N 13/271 |
| 2019/0333242 | A1 * | 10/2019 | Chen .................... G06K 9/4671 |
| 2019/0347556 | A1 * | 11/2019 | Yim ..................... G06K 9/6228 |
| 2020/0074668 | A1 * | 3/2020 | Stenger ................. G06T 7/0002 |

OTHER PUBLICATIONS

Timothy R. Linden. A Triangulation-Based Approach to Nonrigid Image Registration. Masters Thesis (Wright State University). 2011.

Seetharaman et al. A piecewise affine model for image registration in nonrigid motion analysis. Proc 2000 IEEE Int Conf Image Processing.

Ourselin et al. Reconstructing a 3D structure from serial histological sections. Image and Vision Computing 19(1-2): 25-31.

Ding et al. Yinyang K-means: a drop-in replacement of the classic K-means with consistent speedup.vol. 37 (ICML'15). 579-587.

Kim et al. "Multiple Hypothesis Tracking Revisited." 2015 IEEE International Conference on Computer Vision (ICCV) (2015): 4696-4704.

David G. Lowe. Distinctive Image Features from Scale-Invariant Keypoints. Int. J. Comput. Vision 60, 2 (Nov. 2004), 91-110.

Multiple Object Tracking. Matlab Online Documentation. Retrieved from Mathworks.com on May 8, 2019.

D. Huber. Automatic 3D Modeling Using Range Images Obtained from Unknown Viewpoints. 3DIM 2001, pp. 153-160. May 2001.

Andrew E. Johnson. "Spin-Images: A Representation for 3-D Surface Matching." (1997). PhD thesis. Carnegie Mellon University.

Direct linear transformation. In Wikipedia. Retrieved Apr. 23, 2019, from https://en.wikipedia.org/wiki/Direct_linear_transformation.

Rob et al. How can I create cartesian product of vector of vectors?. Retrieved May 31, 2019, from Stackprinter.com.

Batista et al. Parallel Geometric Algorithms for Multi-Core Computers. Computational Geometry. 43. 663-677. 2010.

Rong et al. Computing two-dimensional Delaunay triangulation using graphics hardware. I3D 2008, pp. 89-97.

Nanjappa, Delaunay triangulation in R3 on the GPU. PhD Thesis, 2012.

Alcantara et al. Building an Efficient Hash Table on the GPU. GPU Computing Gems Jade Edition. pp. 39-53, ISBN 9780123859631.

Kirsch et al. More Robust Hashing: Cuckoo Hashing with a Stash. Algorithms—ESA 2008. Lecture Notes in Computer Science, vol. 5193. vol.

Overview of CUDPP hash tables. Online Documentation, Retrieved Dec. 20, 2019, from .cudpp.github.io/cudpp/2.0/hash_overview.hml.

Mixed Radix. In Wikipedia. Retrieved Dec. 30, 2019, from https://en.wikipedia.org/wiki/Mixed_radix.

Fechner et at Accelerating K-Means on the Graphics Processor via CUDA. Intensive 2009. 7-15.

Harris et al. Parallel Prefix Sum (Scan) with CUDA. GPU Gems. vol. 3 chapter 39 pp. 851-876. (2007).

Vadim Markovtsev. "Yinyang" K-means and K-nn using NVIDIA CUDA. Kmcuda Online Documentation. Retrieved Feb. 6, 2020.

\* cited by examiner

GENERATING AND EVALUATING MAPPINGS BETWEEN SPATIAL POINT SETS

CROSS-REFERENCE TO RELATED APPLICATIONS

This application is related to U.S. application Ser. No. 16/428,970 filed on Jun. 1, 2019, and U.S. application Ser. No. 16/442,911 filed on Jun. 17, 2019.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND—PRIOR ART

The following is a tabulation of some prior art that presently appears relevant:

U.S. Patents

| Patent Number | Kind Code | Issue Date | Patentee |
| --- | --- | --- | --- |
| 6,272,245 | B1 | Aug. 7, 2001 | Lin |
| 6,640,201 | B1 | Oct. 28, 2003 | Hahlweg |
| 7,010,158 | B2 | Mar. 7, 2006 | Cahill et al. |
| 7,373,275 | B2 | May 13, 2008 | Kraft |
| 8,233,722 | B2 | Jul. 31, 2012 | Kletter et al. |
| 8,144,947 | B2 | Mar. 27, 2012 | Kletter et al. |
| 8,571,351 | B2 | Oct. 19, 2013 | Yang |
| 8,811,772 | B2 | Aug. 19, 2014 | Yang |
| 9,020,274 | B2 | Apr. 28, 2015 | Xiong et al. |

Nonpatent Literature Documents

Yang, Tianzhi and Keyes, David E. (2008). An Affine Energy Model for Image Registration Using Markov Chain Monte Carlo. Submitted to SIAM Journal of Imaging Sciences in July 2008, in March 2009 we were told that it was rejected, in the mean while it has been placed on the first author's web page (http://www.columbia.edu/~ty2109) for a while, then removed.

Linden, Timothy R. (2011). A Triangulation-Based Approach to Nonrigid Image Registration. Masters Thesis (Wright State University). [online] [retrieved on Jan. 31, 2012] Retrievable from http://rave.ohiolink.edu/etdc/view?acc_num=wright1310502150.

Seetharaman, G., G. Gasperas, et al. (2000). A piecewise affine model for image registration in nonrigid motion analysis. Proceedings 2000 International Conference on Image Processing. (Cat. No 0.00CH37101)

Ourselin, S., A. Roche, et al. (2001). Reconstructing a 3D structure from serial histological sections. Image and Vision Computing 19(1-2): 25-31.

Kim, Chanho & Li, Fuxin & Ciptadi, Arridhana & Rehg, James. (2015). Multiple Hypothesis Tracking Revisited. 2015 IEEE International Conference on Computer Vision (ICCV) (2015): 4696-4704.

Lowe, D. G. Distinctive Image Features from Scale-Invariant Keypoints. Int. J. Comput. Vision 60, 2 (November 2004), 91-110.

Multiple Object Tracking. Matlab Online Documentation. Retrieved May 8, 2019, from https://www.mathworks.com/help/vision/ug/multiple-object-tracking.html.

D. F. Huber. Automatic 3D modeling using range images obtained from unknown viewpoints. Proceedings Third International Conference on 3-D Digital Imaging and Modeling, Quebec City, Quebec, Canada, 2001, pp. 153-160.

Johnson, Andrew Edie. "Spin-Images: A Representation for 3-D Surface Matching." (1997). PhD thesis, Robotics Institute, Carnegie Mellon University. [online] [retrieved on May 29, 2019] Retrievable from http://www.ri.cmu.edu/pub_f iles/pub2/johnson_andrew_1997_3/j ohnson_andrew_1997_3.pdf.

Direct linear transformation. In Wikipedia. Retrieved Apr. 23, 2019, from https://en.wikipedia.org/wiki/Direct_linear_transformation.

Rob et al. How can I create cartesian product of vector of vectors?. Answers to a stackoverflow question. Retrieved May 31, 2019, from http://www.stackprinter.com/export?question=5279051&service=stackoverflow.

Batista, Vicente Helano F. & Millman, David & Pion, Sylvain & Singler, Johannes. (2010). Parallel Geometric Algorithms for Multi-Core Computers. Computational Geometry. 43. 663-677.

Rong, Guodong & Tan, Tiow-Seng & Cao, Thanh-Tung & Stephanus, (2008). Computing two-dimensional Delaunay triangulation using graphics hardware. Proceedings of the Symposium on Interactive 3D Graphics and Games, I3D 2008. 89-97.

Nanjappa, Ashwin. (2012). Delaunay triangulation in R3 on the GPU. PhD Thesis. Retrieved Dec. 29, 2019, from https://www.comp.nus.edu.sg/~tants/gdel3d_files/AshwinNanjappaThesis.pdf.

Dan A. Alcantara, Vasily Volkov, Shubhabrata Sengupta, Michael Mitzenmacher, John D. Owens, Nina Amenta. (2012). Building an Efficient Hash Table on the GPU. GPU Computing Gems Jade Edition. Pages 39-53. ISBN 9780123859631.

Kirsch A., Mitzenmacher M., Wieder U. (2008) More Robust Hashing: Cuckoo Hashing with a Stash. In: Halperin D., Mehlhorn K. (eds) Algorithms—ESA 2008. ESA 2008. Lecture Notes in Computer Science, vol 5193. Springer, Berlin, Heidelberg.

Overview of CUDPP hash tables. Online Documentation. Retrieved Dec. 20, 2019, from cudpp.github.io/cudpp/2.0/hash_overview.html.

Harris, M. and Sengupta, S. and Owens, J. D. (2007). Parallel Prefix Sum (Scan) with CUDA. GPU Gems. Volume 3 chapter 39 pages 851-876.

Mixed Radix. In Wikipedia. Retrieved Dec. 30, 2019, from https://en.wikipedia.org/wiki/Mixed_radix.

Zechner, Mario & Granitzer, Michael. (2009). Accelerating K-Means on the Graphics Processor via CUDA. Proceedings of the 1st International Conference on Intensive Applications and Services, INTENSIVE 2009. 7-15.

Yufei Ding, Yue Zhao, Xipeng Shen, Madanlal Musuvathi, and Todd Mytkowicz. 2015. Yinyang K-means: a drop-in replacement of the classic K-means with consistent speedup. In Proceedings of the 32nd International Conference on International Conference on Machine Learning—Volume 37 (ICML'15). JMLR.org, 579-587.

Vadim Markovtsev, "Yinyang" K-means and K-nn using NVIDIA CUDA. Kmcuda Online Documentation.

Retrieved Feb. 6, 2020, from https://github.com/src-d/kmcuda/blob/master/README.md.

In image registration, one wants to align a template image with a reference image. In feature-based image registration methods, a finite set of feature points is selected from each image, then the features points of the template image are mapped to those of the reference image. A feature point typically represents an outstanding feature of an image, e.g. a corner of a shape, local maxima and minima of differences of Gaussians, and a point of maximal curvature. Feature points are usually 2D or 3D spatial points that carry with them feature specific information in addition to their coordinates.

Feature-based image registration methods can be used when deformations are relatively large; on the other hand, non-parametric registration methods, such as the elastic and the fluid registration methods, are used when deformations are small. Because of this, feature-based registration is sometimes carried out as a pre-processing step that precedes non-parametric registration.

Besides, the matching of spatial point sets is an important problem in various computer vision and pattern recognition areas such as motion tracking, localization, shape matching, and industrial inspection. In such applications, digital images are captured using various devices such as medical imaging machines, digital cameras, Radars, Lidars, or any other devices that converts physical signals into images reflecting the spatial distribution of the physical signals. For example the MRI machine that uses a powerful magnetic field to produce greyscale images, and the infrared camera that generates images based on infrared radiations. As another example, being widely used in Robotics and Self-Driving Vehicle applications, RGBD cameras are used to capture color images as well as depth maps. A depth map may contain distance information from targets to a plane that's parallel to the image plane and passing through the camera center. To generate a depth map, various hardwares and algorithms have been developed. For example, the Intel RealSense D400 camera uses the active stereoscopy technology, where a light projector projects light patterns onto objects and capture the same patterns using two cameras from different perspectives. The depth information is computed using triangulation. In comparison, the StereoLabs ZED uses the passive stereoscopy technology, where it tries to match natural patterns at key points in natural environments using triangulation. The Kinect V2 uses the Time-Of-Flight (TOF) technology, where a receiver receives photons emitted from a light transmitter and then reflected back from subjects' surfaces. The delay is used to compute the depth. The Orbbec Astra S camera employs the structured light technology, where a laser projector projects structured patterns that is triangulated using a camera. As another example, the radar uses an antenna to transmit and receive radio waves. In addition to the depth information, it can measure velocity using the Doppler effect. The radar is suitable for self-driving vehicles when harsh weather conditions prevents other technologies from fully functioning.

Often a set of measurement points are extracted from captured images using various interest point or bounding box detectors (e.g. the SIFT, SURF, various corner or blob detectors, various object detection neural networks etc.), and the measurement points are then matched against a given point set. For example, in multi-object tracking (MOT), each moving object can be tracked by a Bayesian Filter. At each time step, a set of filters are used to generate a set of predictions for a set of objects based on their past trajectories and elapsed times. The predictions can be given as a multivariate statistical distributions with means and covariances. Examples of Bayesian Filters are the Kalman Filter, the Extended Kalman Filter, the Unscented Kalman Filter, and the Particle Filter, etc. The predictions are then matched with a set of measurement points such that for each prediction is associated with a best measurement point according to a certain criterion. This step is also called data association. Finally, the coordinates of the best measurements are used to update the corresponding filters. Refer to "Multiple Object Tracking" retrieved from Matlab Online Documentation for an example.

In localization, a vehicle can use a Bayesian Filter to estimate its own pose. At each time step the vehicle receives various readings and actuation information, where such readings could include for example previous poses, various odometry readings, GPS readings etc., and such actuations could be given in the form of linear and angular accelerations, and/or forces and torques combined with a dynamic model of the vehicle, etc. Combine these information with elapsed times, the vehicle can predict its current pose, which is typically represented as a statistical distribution. The pose can be used to transform a set of landmarks in a digital map that is downloaded or computed ahead of time from the map's frame to the vehicle's frame. The transformed landmarks are then matched against a set of measured landmarks. Alternatively measurements can be transformed from the vehicle's frame to the map's frame to match with the landmarks. The coordinates of the associated best measurements are then used to update the Bayesian Filter.

As another example, data association can be applied to multi-sensor data fusion. In Localization or MOT, when multiple sensors are used, one often needs to identify measurements generated by the different sensors. This is sometimes not straight forward due to the presence of noises in measurements.

One simple approach for data association is to use the Nearest Neighbor Association algorithm, which involves choosing for each landmark the closest measurement. Referring to FIG. 1, there is shown an example where there is a vehicle 50. Landmarks 54, 58, 64, and 68 are obtained from a digital map stored in memory, and 52, 56, 60, 62, and 66 are obtained from vehicle 50's measurements. The Nearest Neighbor Association algorithm associates measurement 52 with landmark 54, measurement 60 with landmark 58, measurement 62 with landmark 64, and measurement 66 with landmark 68. But if one takes into account the geometry, landmark 58 is more likely to be associated with measurement 56.

Associating two spatial point sets usually involves minimizing an energy function, that is, select from a set of candidate mappings a mapping that minimizes the energy function. Similar problems has received attentions in the computer vision community, and various energy functions has been proposed. For example, the Hausdorff distance has been used by many authors to match two point clouds. Another widely used distance is the bottleneck distance, which is the maximum distance between any two matched points.

Sometimes an exact optimal mapping can be obtained that minimizes the energy function. For example when the number of candidate mappings is small, then one can do an exhaustive search. Efficient optimization methods are applicable when the energy function is linear with linear constraints, or sometimes when the energy function is quadratic. On the other hand, if the number of candidate mappings is large and the energy landscape is rough with lots of local minima (or maxima), then sometimes the practice is to use heuristics. Examples include Simulated Annealing (SA), Generic Algorithm (GA), Tabu Search (TS), and the greedy algorithm.

It is understood that heuristics usually are not guaranteed to generate the best solutions for complex problems, hence most of the times the target is rather a solution that is hopefully close to the best one. Hybrid methods that combine exact methods and heuristics have been applied in different areas such as the designing of mobile networks and power systems. For example, a greedy simulated annealing algorithm combines a greedy local search and SA to improve the convergence speed.

Underlying some existing methods for matching spatial point sets is the assumption that either it is the same set of objects that appear in both images and their spatial arrangements are by and large the same (e.g. medical images, static images of landscape, buildings, mountains, multi-sensor images), or the noises are relatively small. Such noises may come from for example occlusions, distortions, or relative motions. In some situations such assumption is valid, but new methods need to be developed for less ideal situations. For example, when a template image presents two cars and a reference image shows only one, when objects undergo relative motions, or when objects are partially occluded in a reference image while they are fully revealed in a template image.

In medical imaging literatures, matching of point sets sometimes precedes finer registration techniques that establishes pixel-level correspondences. The matching of point sets is sometimes carried out by a least square regression or its variations, based on the assumption that there exists a global affine transformation. For example, referring to "A piecewise affine model for image registration in nonrigid motion analysis" by Seetharaman (2000), a global affine transformation is estimated by using a scatter matrix, which measures how the point sets as a whole are distributed in space; local points are then matched by a nearest-neighbor technique. Referring to the Block matching method in "Reconstructing a 3D structure from serial histological sections" by Ourselin et al. (2001), it repeats the regression step multiple times using an iterative scheme. In image alignment, for example in "Distinctive Image Features from Scale-Invariant Keypoints" by Lowe (Int. J. Comput. Vision 60(2): 91-110, 2004), candidate point correspondences are first identified by comparing features, then a least square problem is solved to extract the parameters of an affine-transformation based on the assumption that most candidates more or less comply with a global affine transformation.

In U.S. Pat. No. 9,020,274 granted Apr. 28, 2015 by Xiong et al., it uses a control network of super points, the disclosed embodiment is not scale invariant. In U.S. Pat. No. 6,640,201 granted Oct. 28, 2003 by Hahlweg, it discloses a method that uses transformation equations whose parameters measure similarities between point sets. The method is affine-invariant if the transformation equation is carefully chosen. In U.S. Pat. No. 7,373,275 granted May 13, 2008 by Kraft, it computes a force field that perturbs one point set to align with the other.

In U.S. Pat. No. 8,233,722 granted Jul. 31, 2012 by Kletter et al., it describes a method for querying documents using their images. Given an image of a document, a set of 2D key points are generated, where each key point corresponds to the centroid locations of a connected component in the image. For each key point, a predetermined number of fingerprints are computed, where each fingerprint consists of a series of persistent ratios capturing the local geometry of the point among its predetermined number of nearest-neighbor key points. To make it robust w.r.t. noises, various combinations of the nearest neighbors are considered; to make it rotation invariant, various permutations of the nearest neighbors are also considered. Thus a substantial number of fingerprints are needed for a key point to make it robust. Also I think if one wants to consider the geometric relationships among key points that are far away from each other using this method, one may need to be consider neighborhoods of different sizes, and this may further increases the number of fingerprints. To speed up fingerprint matching, fingerprints are stored in a Fan Tree, where each path from the root to a leaf node represents a fingerprint. In U.S. Pat. No. 8,144,947 granted Mar. 27, 2017 by the same authors, the same idea is applied to photograph images where keypoints are extracted using scale space methods.

In U.S. Pat. No. 6,272,245 granted Aug. 7, 2001 by Lin, it extracts significant regions from an input image using two-dimensional window search, and generates feature vectors for the significant regions based on their statistical characteristics. The feature vectors are compared to those stored in a database from a model, and for found matches the coordinates of the significant regions are placed in a candidate list. Next it compares the geometric relationships among the significant regions in the candidate list and those among the matches found in the model to validate their geometric consistencies. Examplery geometric relationships include the distance between two significant regions, and the angle made by two significant regions to a common third significant region. Thus in the vocabulary of this document, local statistical features are used to find candidate correspondences, and geometric consistency is used to validate the compatibilities among the correspondences.

In U.S. Pat. No. 7,010,158 granted Mar. 7, 2006 by Cahill et al., it introduces a method for stitching multiple 3D panoramic scene images into a 3D model of the whole scene. After obtaining a plurality of 3D panoramic images, it converts them to surface meshes and uses Huber's algorithm to compute transformations that align the surface meshes. It then aligns and integrates the surface meshes, and finally integrates the textures and intensities. Referring to "Automatic 3D modeling using range images obtained from unknown viewpoints" by Huber, it in turn refers to the "spin-image" representation introduced in "Spin-Images: A Representation for 3-D Surface Matching" by Johnson. Here for each 3D surface point it generates a spin-image which is a rigid transformation invariant representation of the local geometry in the point's object centered coordinate system called the spin-map coordinates. Between the surface points of two surface meshes, it generates (in my own words) candidate correspondences by examining the similarities of the points' spin-images. It further checks the consistency between pairs of correspondences by examining the geometric consistencies, which essentially compares the distances in the spin-map coordinates. Correspondences that are geometrically consistent are grouped to estimate a transformation that is used to align the two meshes. Thus in the vocabulary of this document, local geometric features are compared to find candidate correspondences, and the geometric consistency is used to filter out incompatible correspondences and select a group of compatible correspondences.

In Simultaneous Localization And Mapping (SLAM), correspondences between feature points are used to estimate essential matrices or fundamental matrices, which are then used to estimate depths in multiview geometry.

In "An Affine Energy Model for Image Registration Using Markov Chain Monte Carlo" by Yang and Keyes (2008), an affine energy model for matching point sets using SA is presented. There, a smoothness constraint is defined in terms of the Euclidean distance between the elements of the matrices of pairs of affine transformations, where the energy function depends only on the location of the points. SA is used to solve the registration problem by iteratively removing and inserting cross-edges. Its potential in avoiding local minima in the presence of global affine and nonlinear transformations is demonstrated by comparing it with non-parametric registration and affine registration models. Referring to "A Triangulation-Based Approach to Nonrigid Image Registration" by Linden (2011) it also uses the Euclidean distance to compare affine transformations for the purpose of image registration. But since the elements of an affine transformation is a mixture of rotation, scaling, displacement and shearing, they may not have much physical meaning without proper decompositions.

In my first U.S. Pat. No. 8,571,351 granted Oct. 19, 2013, instead of relying on the Euclidean distance, various spatial agents are constructed and transformed by affine transformations, and distance measures are computed by comparing transformed spatial agents. In my second U.S. Pat. No. 8,811,772 granted Aug. 19, 2014, a distance measure is computed using the difference of the left sub-matrices of two affine transformations, where the two affine transformations are computed for a pair of mapped agreeable (n+1) combinations. Examples of such distance measures include various matrix norms using its singular values and equivalents.

In my previous U.S. application Ser. No. 16,428,970 filed on Jun. 1, 2019, it describes embodiments that use Match-Pairs. In my previous U.S. application Ser. No. 16,442,911 filed on Jun. 17, 2019, it describes embodiments that in addition computes conflict lists and correspondence lists as bit fields, and compute the compatibilities among Match-Pairs involves performing bitwise operations on the bit fields. Some terms may have been defined multiple times in this document and in my existing patent applications and patents, if there are any conflicts then the definitions in this document takes precedence when applied to this document.

DRAWINGS—FIGURES

Figure 12A:
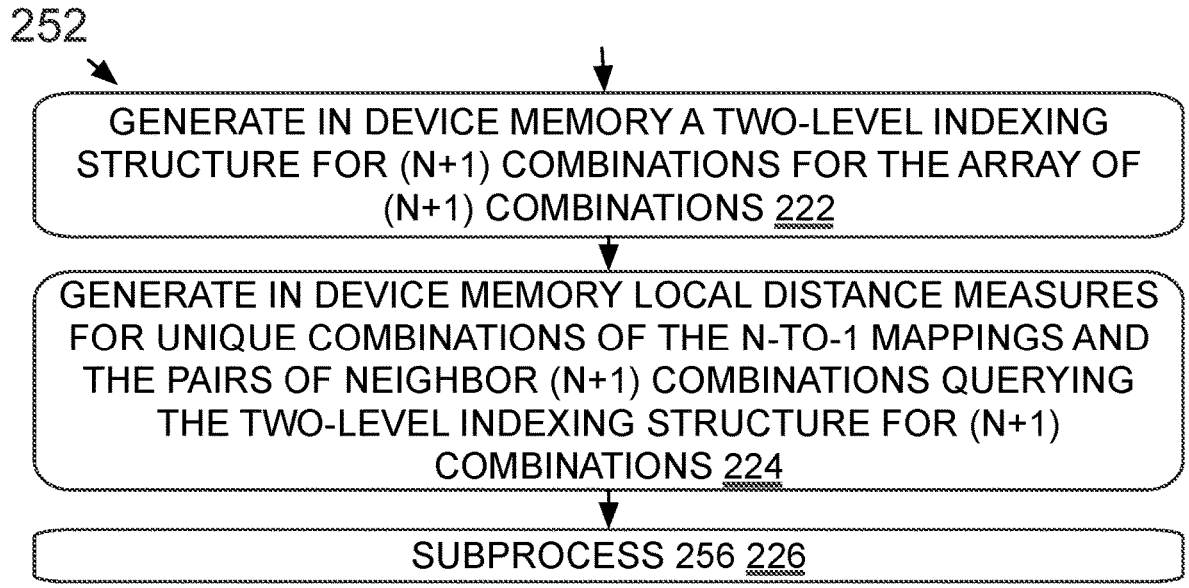

FIG. 12a shows a subprocess 252 that is the second part of an exemplary process where subprocess 252 is carried out after subprocess 250 for generating and evaluating N-to-1 mappings between two spatial point sets in nD according to one embodiment.

Figure 12B:
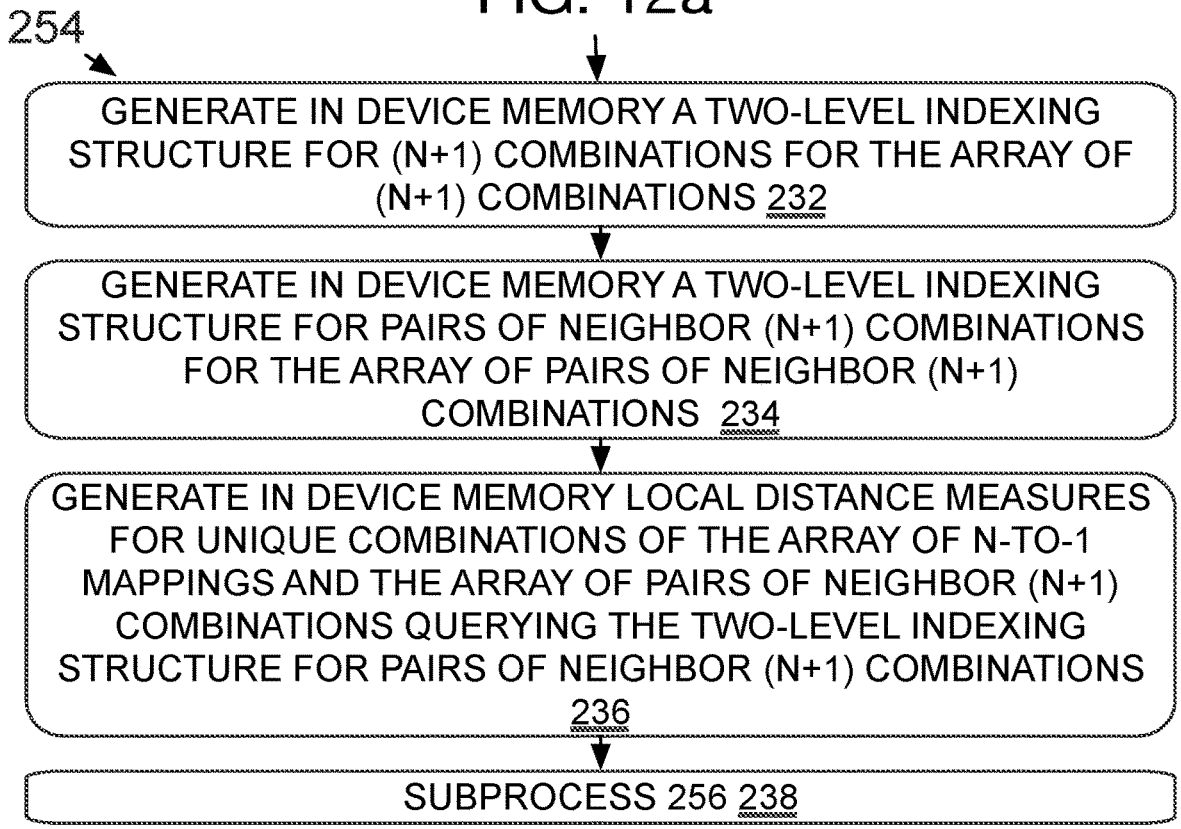

FIG. 12b shows a subprocess 254 that is the second part of another exemplary process where subprocess 254 is carried out after subprocess 250 for generating and evaluating N-to-1 mappings between two spatial point sets in nD according to another embodiment.

Figure 13:
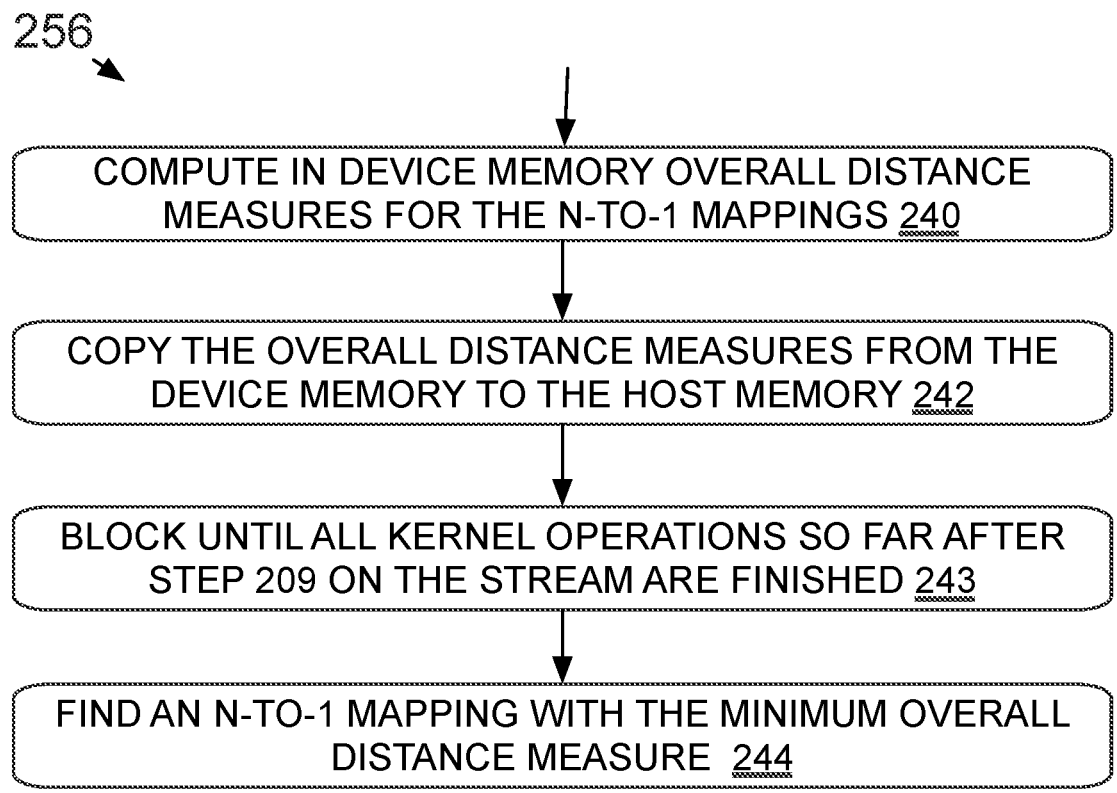

FIG. 13 shows a subprocess 256 that is the third part of the two exemplary processes where subprocess 256 is carried out after subprocesses 252 or 254 for generating and evaluating N-to-1 mappings between two spatial point sets in nD according to some embodiments.

Figure 14A:
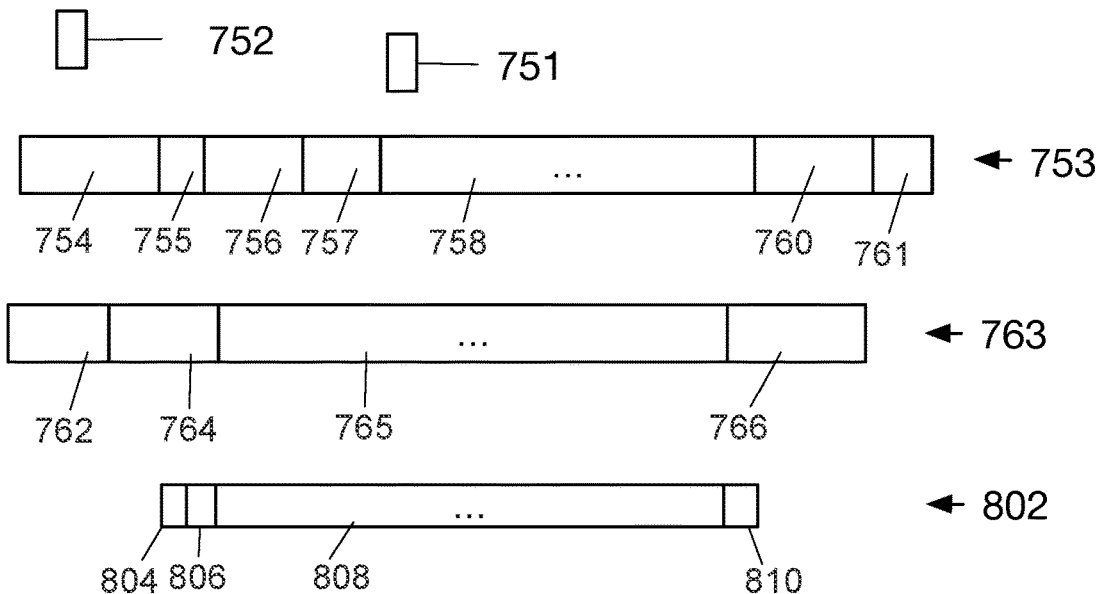

FIG. 14a is a visual illustration of the memory layouts of an exemplary two-level indexing structure for (n+1) combinations according to one embodiment.

Figure 14B:
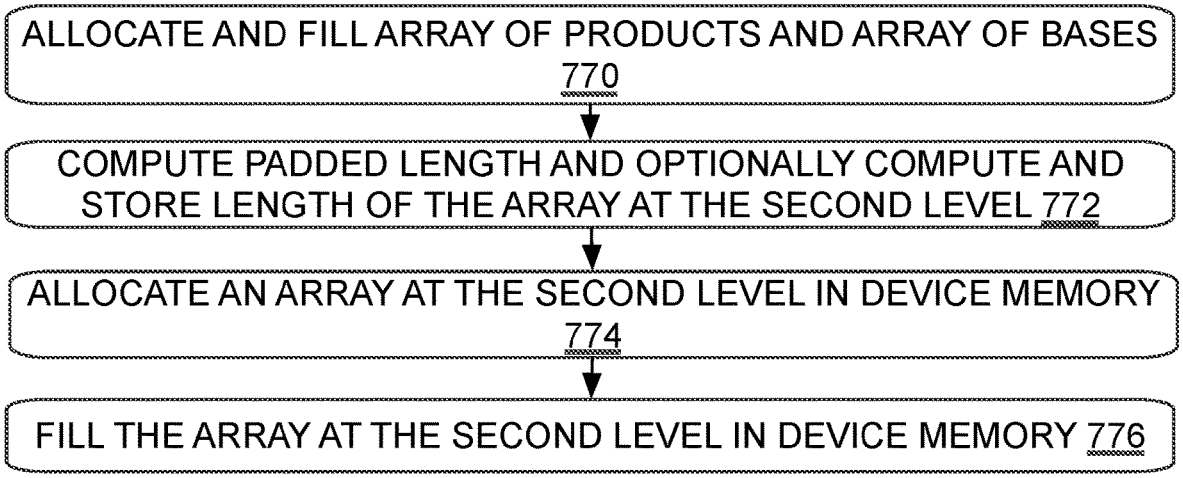

FIG. 14b shows a process for constructing the two-level indexing structure for (n+1) combinations according to one embodiment.

Figure 14C:
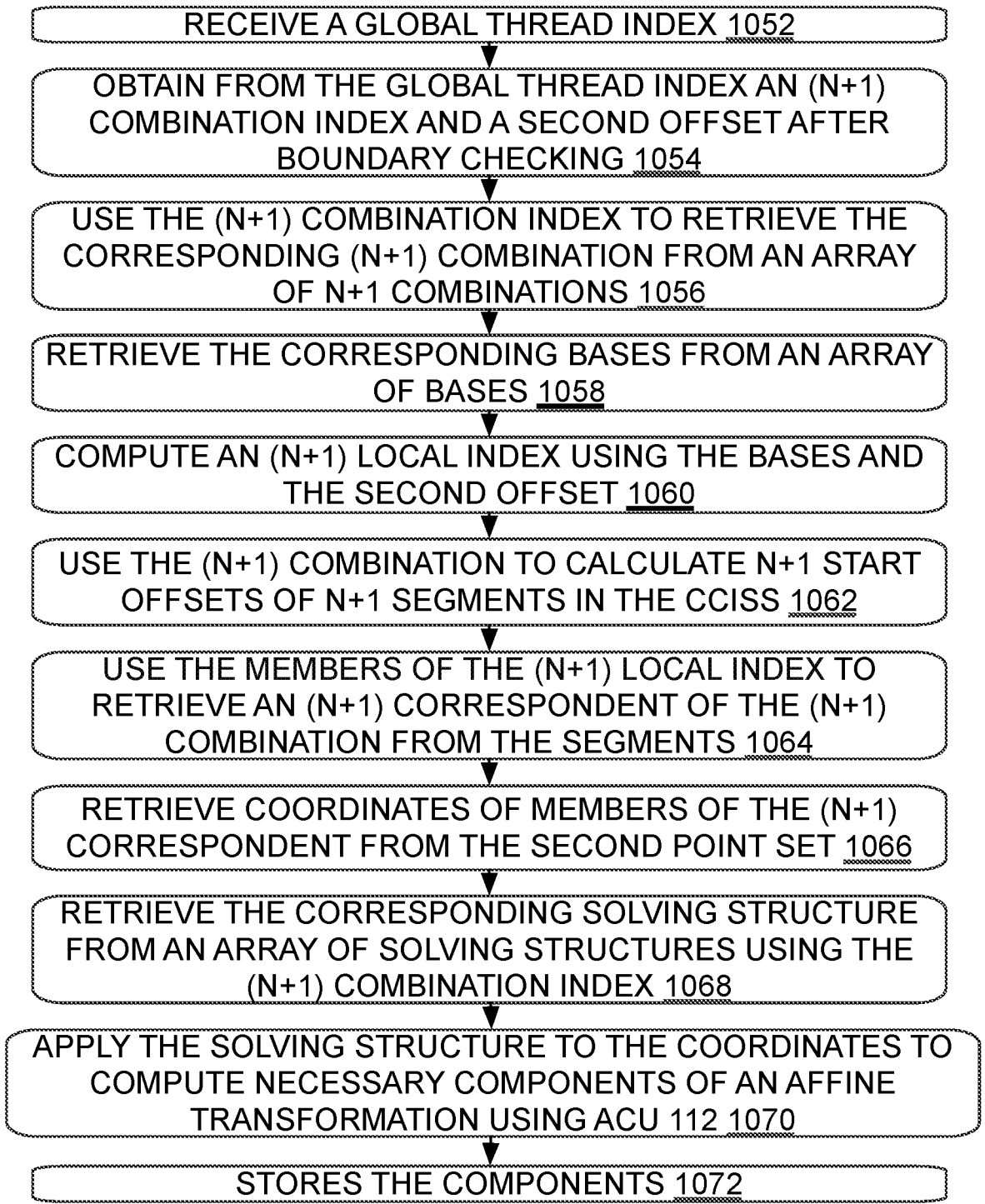

FIG. 14c shows a series of steps for using a hardware thread to compute necessary components of an affine transformation for a two-level indexing structure for (n+1) combinations according to one embodiment.

Figure 14D:
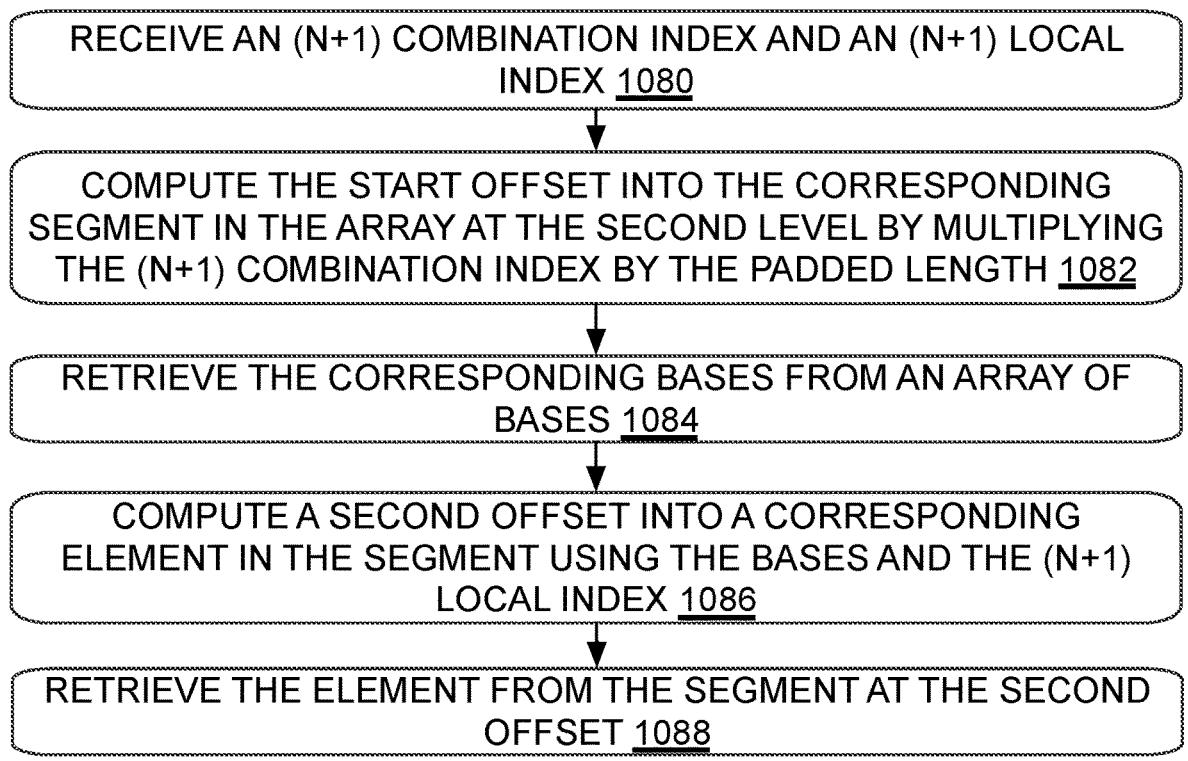

FIG. 14d shows a series of steps for using a hardware thread to query a two-level indexing structure for (n+1) combinations according to one embodiment.

Figure 15:
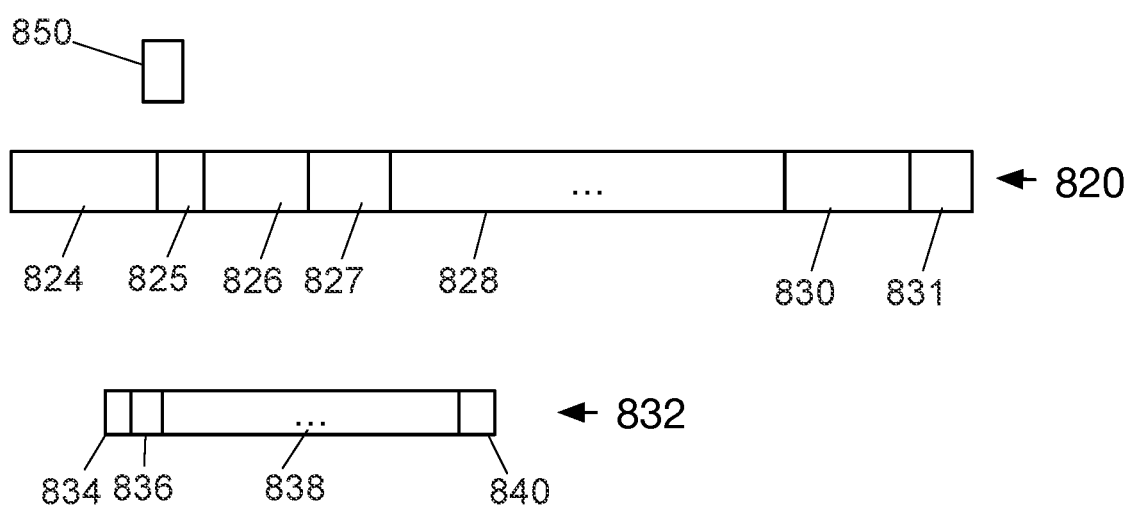

FIG. 15 shows the memory layouts of an uniformly padded CCISS according to one embodiment.

Figure 16:
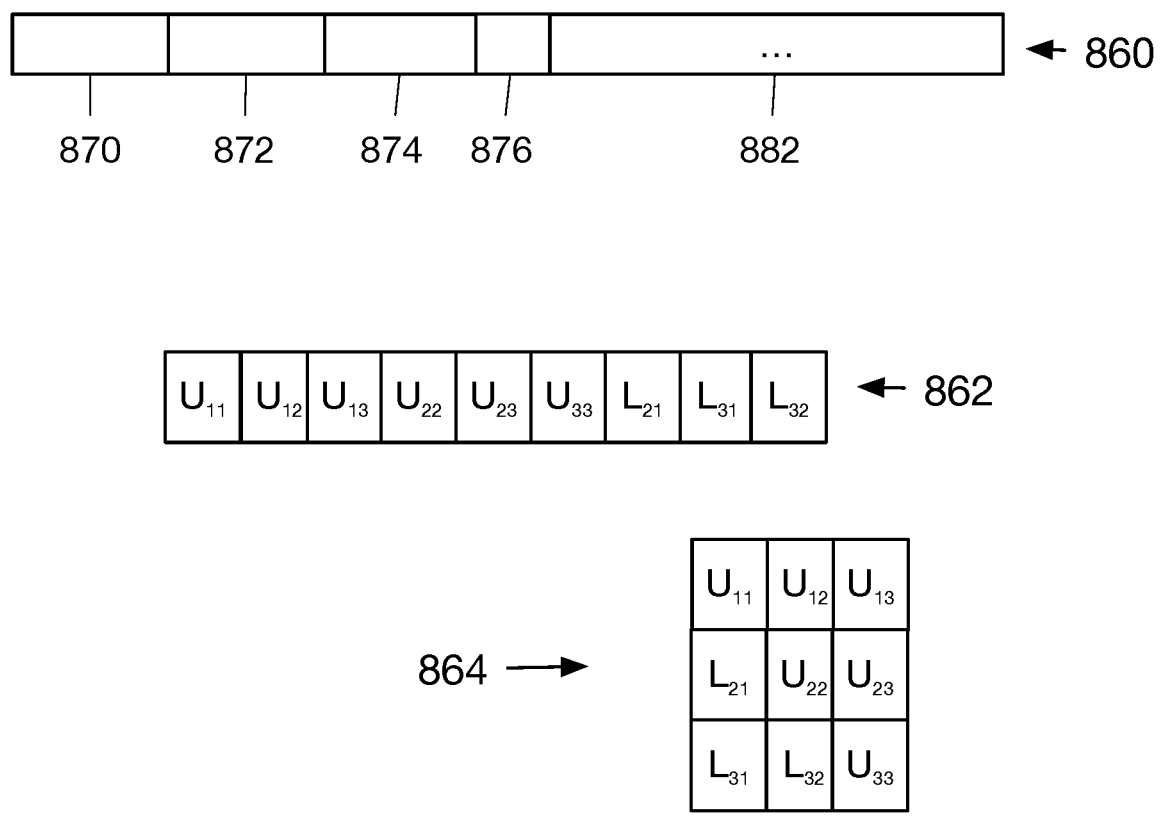

FIG. 16 shows the memory layouts of an AoS of solving structures according to another embodiment.

Figure 17A:
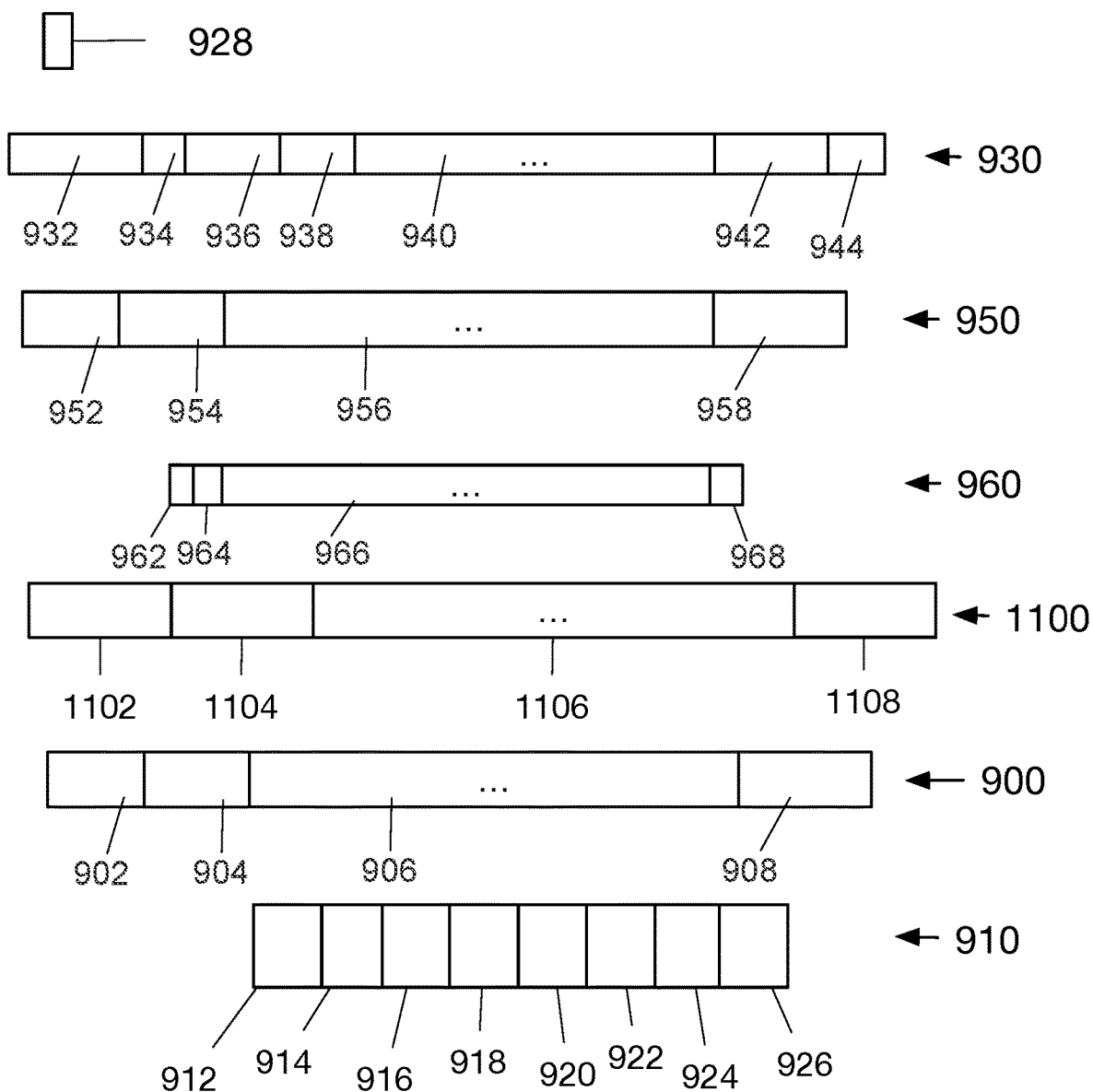

FIG. 17a is a visual illustration of the memory layouts of an exemplary two-level indexing structure for pairs of neighbor (n+1) combinations according to one embodiment.

Figure 17B:
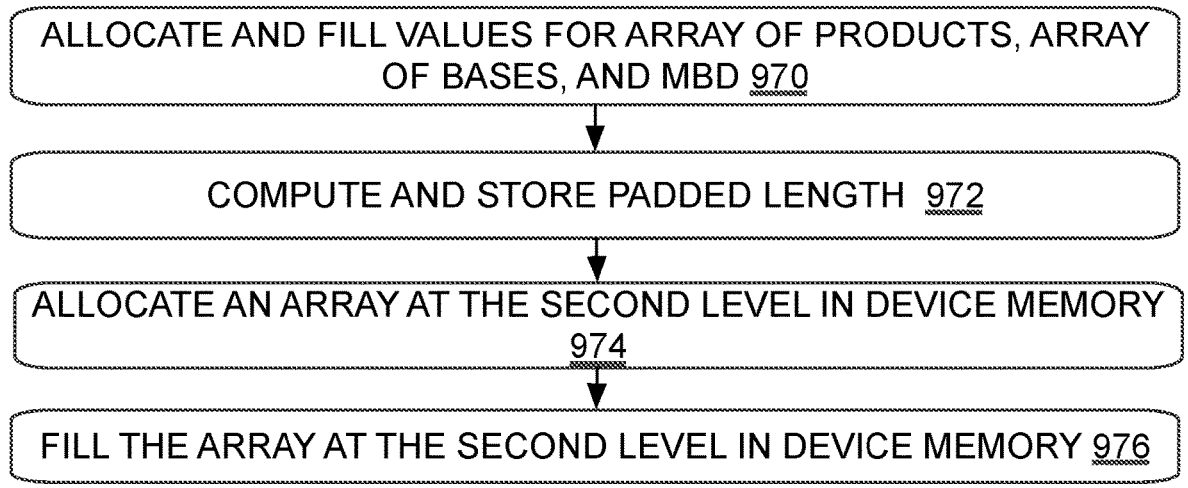

FIG. 17b shows a process for constructing a two-level indexing structure for pairs of neighbor (n+1) combinations according to one embodiment.

Figure 17C:
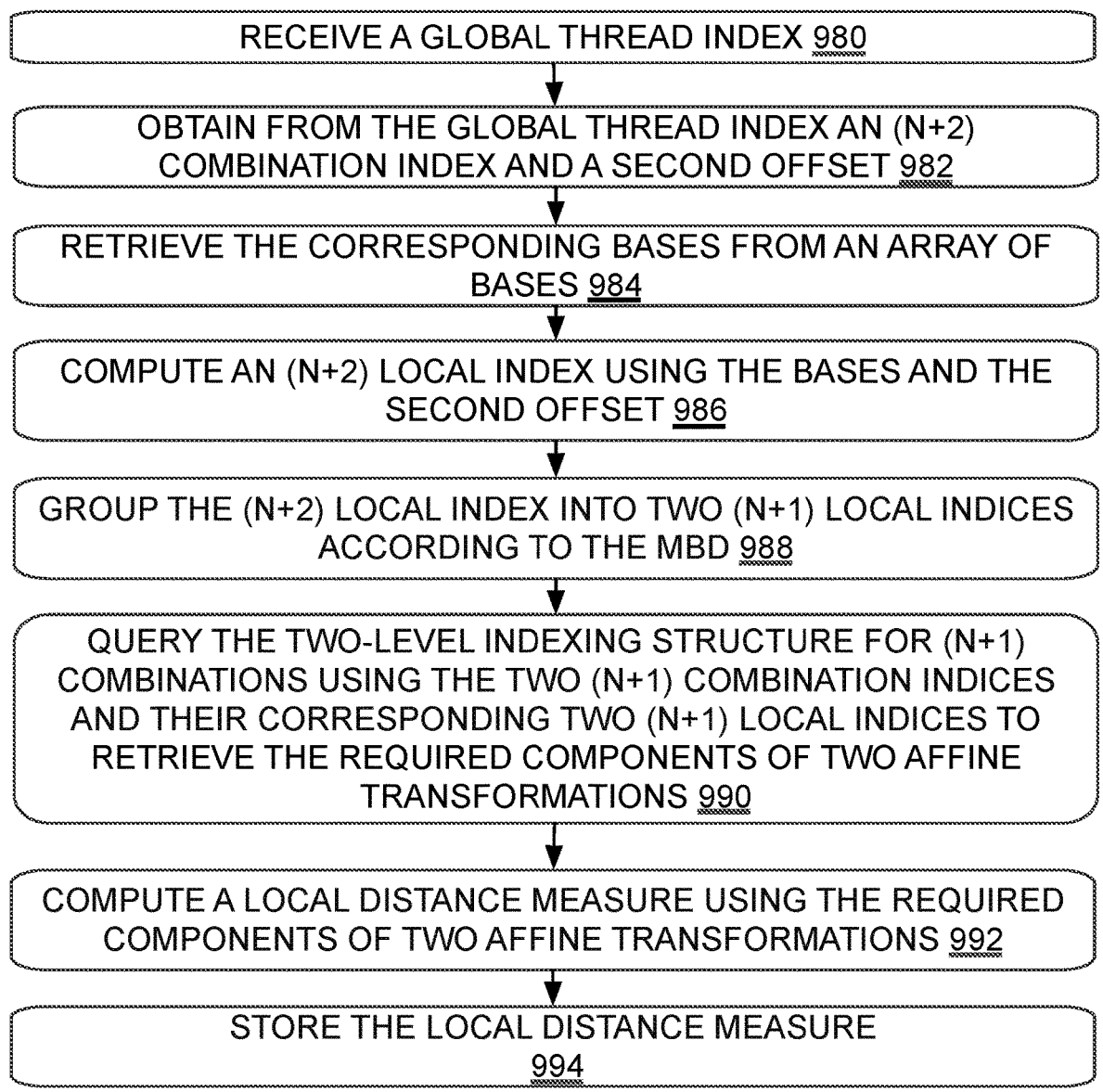

FIG. 17c shows a series of steps for using a hardware thread to compute a local distance measure for a two-level indexing structure for pairs of neighbor (n+1) combinations according to one embodiment.

Figure 17D:
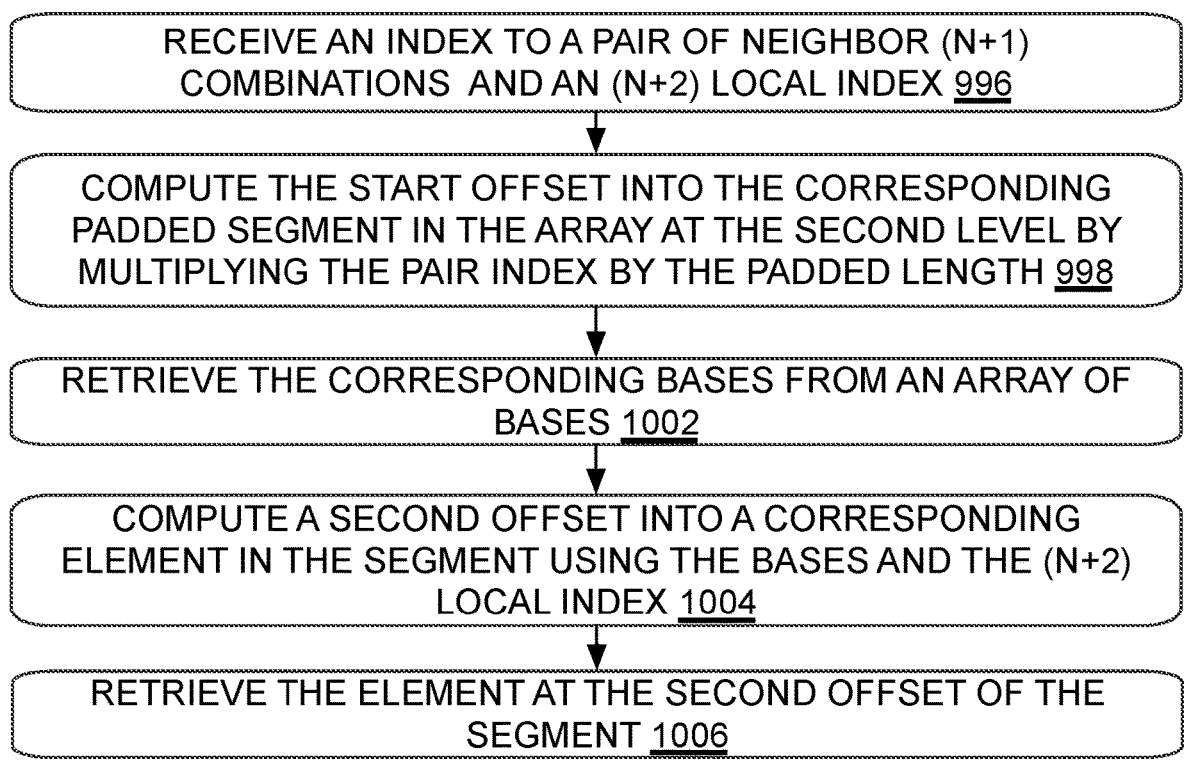

FIG. 17d shows a series of steps for using a hardware thread to query a two-level indexing structure for pairs of neighbor (n+1) combinations according to one embodiment.

Figure 18:
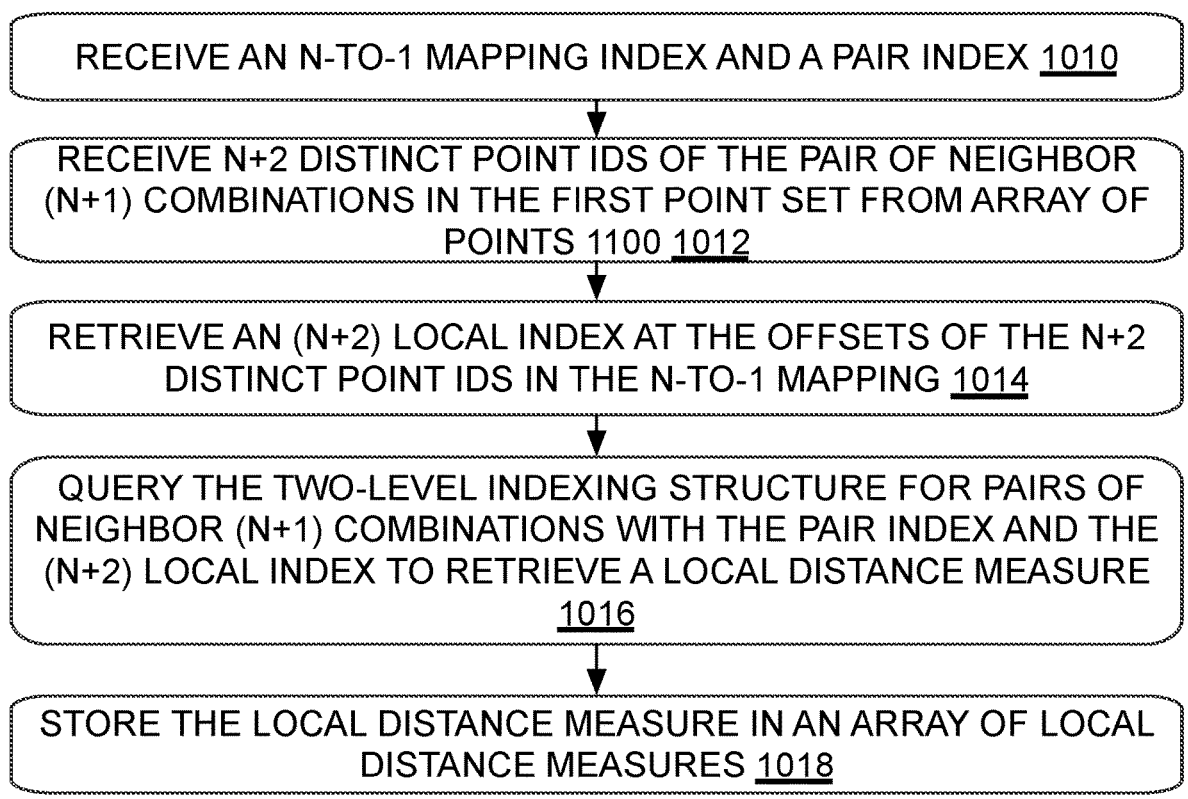

FIG. 18 shows an exemplary process for retrieving a local distance measure from a two-level indexing structure for pairs of neighbor (n+1) combinations given an N-to-1 mapping index and a pair index according to one embodiment.

Figure 19:
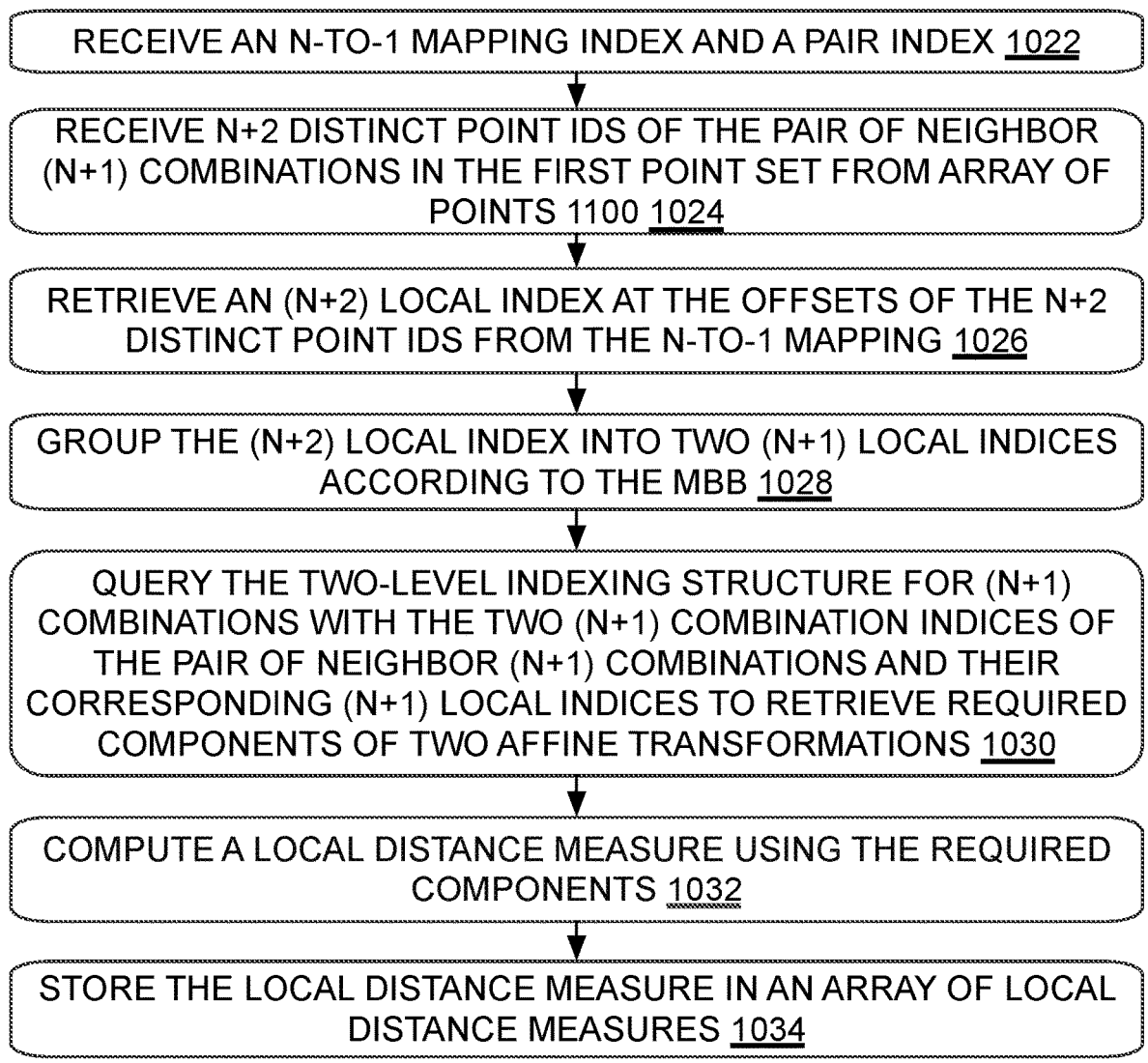

FIG. 19 shows another exemplary process for retrieving a local distance measure using a two-level indexing structure for (n+1) combinations given an N-to-1 mapping index and a pair index according to another embodiment.

DETAILED DESCRIPTION—DEFINITIONS

The affine transformation in nD is a line-preserving transformation from $R^n$ to $R^n$ that preserves parallelism and division-ratio. An affine transformation T acting on a point whose coordinate vector is $\vec{x}=[x_1, \ldots, x_n]^T \in R^n$ is denoted by $T(\vec{x})$. We have $$T(\vec{x}) = A(T)\vec{x} + \vec{t}(T)$$

where $A(T)$ is an n-by-n matrix, $\vec{t}(T)$ is an n-by-1 vector, and both are uniquely determined by T. It can be written as a single matrix-vector multiplication in homogeneous coordinates:

$$T(\vec{x}) = \begin{bmatrix} A(T) & \vec{t}(T) \\ 0 & 1 \end{bmatrix} \begin{bmatrix} x_1 \\ \vdots \\ x_n \\ 1 \end{bmatrix}$$

In homogeneous coordinates a point is usually represented in its standard form, which means that its component corresponding to the extra dimension obtained by embedding into a projective space is 1. It is also understood that in homogeneous coordinates two vectors are viewed as equal if one can be obtained by multiplying the other by a non-zero scalar.

In this invention, a spatial point is a point of interest in nD, n=2,3. The point of interest is extracted from a digital image using some feature extractor and inserted into the space (by assigning coordinates to the point), inserted by a human operators through a computer user interface, or inserted into the space by some other computer algorithm. Examples include interest points extracted using the Scale-Invariant Feature Transform (SIFT), Speeded-Up Robust Features (SURF) and various other corner and blob detectors, centroids and corners detected using object detection neural networks, pre-computed or pre-generated landmarks on digital maps, and predictions made by various Bayesian Filters.

To each received spatial point there is in the input at least its coordinates and its point id. For a point whose point id is i, its coordinates is denoted by loc(i). Whether loc(•) is in homogeneous or inhomogeneous coordinates depends on the context. For example in one embodiment the input coordinates could be integers representing the pixels' row and column indices in 2D. In another embodiment it could include in addition their depth coordinates in 3D. Alternatively for some other embodiments, it can also be in floating points, fixed points, rational numbers etc. In the current embodiment, a point id is a non-negative integer that is the offset of the point's coordinates in an array of coordinates. Alternatively, a point id can be any identifier as long as it uniquely identifies a point within a point set. For example in another embodiment, it is the starting address of the point's coordinates in the device memory. In yet another embodiment, they are computer generated unique ids (GUID).

As one skilled in the art knows, a collection of data structures can be stored as an SoA (structure of arrays) or as an AoS (array of structures). An SoA contains two or more scalar arrays, where optional paddings can be added between the arrays so that each scalar array of the SoA starts at a memory address that is an integral multiple of the width of a cache line of the target coprocessor. Examples include 32 bytes, 64 bytes, and 128 bytes. Alternatively they can be stored in array of structures (AoS), hash tables, or other suitable data structures.

In this document, an element of an SoA refers to the collection of scalars at the same offset of all the scalar arrays of the SoA, and a segment of an SoA refers to the collections of scalars from the same starting offset to the same ending offset in all the scalar arrays of the SoA. A padding in an SoA pads each of its scalar arrays at the same offset with the same number of scalars, where the number is referred to as the number of padding elements of the padding. The length of an SoA refers to the number of elements excluding paddings unless explicitly specified. For an AoS, the components of each of its elements (for an AoS we refer to each structure that is stored in the AoS as one of its elements are stored together, and each element or every fixed number of consecutive elements could be padded by extra bytes so that each element starts at an offset that satisfies the alignment requirements of the hardware architecture. The length of an AoS refers to the number of elements stored in the AoS, and the offset of an element refers to number of elements stored before it in the AoS. When we say an array of some struct, if that some struct is not a scalar, then the array can be stored either as an AoS or an as SoA unless explicitly specified. In this document. notations such as "0-th", "1-st", "2-nd" are used to denote the elements for SoA or structures for AoS at respective offsets 0, 1, and 2.

In this document, an N-to-1 mapping is a mapping between a first point set and a second point set with the restriction such that for each point in the first point set there is at most one corresponding point in the second point set, but for each point in the second point set there can be zero, one, or more corresponding points in the first point set. A point of either point sets is isolated if it is not associated with any points in the other point set in the N-to-1 mapping. When a point from the first point set is associated with a point from the second point set, we refer to this association as a correspondence with each point being the other's correspondent. Together the two points are referred to as the end points of the correspondence. When a point from the second point set is associated with more than one point from the first point set, there is a correspondence between the point from the second point set and each of its associated points in the first point set. Thus an N-to-1 mapping comprises a set of correspondences subjecting to the restriction.

An N-to-1 mapping between two point sets in $R^n$ can also be represented by a displacement field, where to each non-isolated point of the first point set there is attached a displacement vector, such that the point's correspondent's coordinates can be calculated by adding the displacement vector to the point's coordinates.

Given a first and a second point sets, a candidate correspondence is an association between a point in the first point set and a point in the second point set. As an example, in some embodiments, candidate correspondences are generated by a tracker for multi-object tracking (MOT). In MOT, each observed trajectory could be tracked by a Bayesian Filter for example a Kalman Filter or an Extended Kalman Filter, etc. At each time step, the tracker generates a new set of predictions for the objects using the Bayesian filters according to their past trajectories and elapsed times. The predictions are sometimes given as multivariate normal distributions, from which gate areas can be defined as all points whose Mahalanobis distances to the means are smaller than a predetermined threshold(s). At each time step it also provides a set of measurements from various sensors. If a measurement falls within the gate area of a prediction, the prediction and the measurement defines a candidate correspondence. Please refer to "Multiple Hypothesis Tracking Revisited" by Kim et al. for more details.

As another example, referring to "Distinctive Image Features from Scale-Invariant Keypoints" by David Lowe, associated with each interest point a SIFT feature vector of 128 elements is computed. A vector summarizes the local textures surrounding an interest point. Thus a candidate correspondence is generated between two interest points in two images only if the Euclidean distance between the two feature vectors is below a certain predetermined threshold. As another example, in U.S. Pat. No. 6,272,245 granted Aug. 7, 2001 by Lin, distances between local statistical features are used to find candidate correspondences. As yet another example, in "Spin-Images: A Representation for 3-D Surface Matching" by Johnson, local geometries captured in spin-images are used to find candidate correspondences. Various embodiments according to this invention can be applied to such applications to find geometrically consistent candidate correspondences.

In nD, an (n+1) combination of a point set is a subset of n+1 distinct points, where in 2D they are not all on the same line and in 3D they are not in the same plane. An (n+1) combination in general position can define a simplex in nD. For example, in 2D, three non-collinear points define a triangle, and in 3D four non-coplanar points define a tetrahedron. If two (n+1) combinations have n points in common, then they are said to be neighbors. Thus a pair of neighbor (n+1) combinations contain exactly n+2 distinct points. The intersection of a pair of (n+1) combinations refers to the set of points that belong to both (n+1) combinations. In 2D, two (n+1) combinations having two points in common means the corresponding triangles share a common edge, which we will refer to as the common edge of the two (n+1) combinations. Similarly, in 3D, two (n+1) combinations having three points in common means the corresponding tetrahedra share a common triangle, which we will refer to as the common triangle of the two (n+1) combinations. In nD, an (n+2) combination in a point set is a subset of n+2 distinct points, where in 2D they are not all on the same line and in 3D they are not all in the same plane. It's obvious that a pair of neighbor (n+1) combinations comprises an (n+2) combination. A "common line" refers to the line passing through a common edge (of a pair of neighbor (n+1) combinations) in 2D, and a "common surface" refers to the surface passing through a common triangle (of a pair of neighbor (n+1) combinations) in 3D. Moreover, depending on the context a "common hyperplane" refers to either a common edge in 2D or a common triangle in 3D. In this document, in 2D, an (n+1) combination is often denoted by a tuple. For example, an (n+1) combination denoted by $(i_1, i_2, i_3)$ contains three distinct points $i_1, i_2, i_3$. An (n+1) combination can contain for example the vertices of a triangle. Similarly, in 3D a tuple containing four points is used to denote an (n+1) combination, which for example could contain the vertices of a tetrahedron. A tuple containing four points is also used to denote an (n+2) combination in 2D. A line segment is often denoted by a tuple of two end points. For example, $(p_1, p_2)$ represents a line segment whose two end points are $p_1$ and $p_2$. This notation is also used to denote a candidate correspondence. The exact meaning shall be clear from the context. When using a tuple, an order among its points is assumed unless it is clarified in its context. In the C/C++ programming languages, a tuple of n+1 components can be stored in a scalar array of length n+1, in a struct containing n+1 scalar components, or in n+1 scalar variables referenced by different symbols. An (n+1) local index, an (n+2) local index, and an (n+1) correspondent can be programmed similarly.

Given a first point set, a second point set, a set of candidate correspondences between the two point sets, and an (n+1) combination in the first point set, an (n+1) correspondence of the (n+1) combination comprises the indices of n+1 candidate correspondences, where the n+1 candidate correspondences together have n+1 distinct end points in the first point set, the n+1 distinct points in the first point set forms the (n+1) combination, and the mapping from the distinct points to their correspondents in the second point set in the n+1 candidate correspondences is N-to-1. Given a pair of neighbor (n+1) combinations, we define an (n+2) correspondence of the pair of neighbor (n+1) combinations to include two (n+1) correspondences such that their corresponding (n+1) combinations make the pair of neighbor (n+1) combinations, and when combined together they still define an N-to-1 mapping.

To make things clear, unless specified otherwise in the context, "n+1 candidate correspondences" refers to a set of candidate correspondences where the number of candidate correspondences is n+1, and "(n+1) correspondences" refers to a set of elements where each element is an (n+1) correspondence that in turn comprises n+1 candidate correspondences. An (n+1) correspondence includes through its n+1 candidate correspondences n+1 end points in the second point set, where the n+1 end points in the second point set may not be distinct since the mapping is N-to-1. Thus two candidate correspondences in an (n+1) correspondence can have the same end point in the second point set, nevertheless we'll refer to the n+1 end points in the second point set as an "(n+1) correspondent". Similarly we refer to the end points of an (n+2) correspondence in a second point set an "(n+2) correspondent".

If we replaces the indices of the n+1 candidate correspondences in an (n+1) correspondence with the candidate correspondences' indices in their separate sets of candidate correspondences (to be clarified in detail later), the collection of the n+1 indices in their separate sets of candidate correspondences will be referred to as an "(n+1) local index". Similar we define an "(n+2) local index".

Detailed Description—Hardware Components

Figure 7:
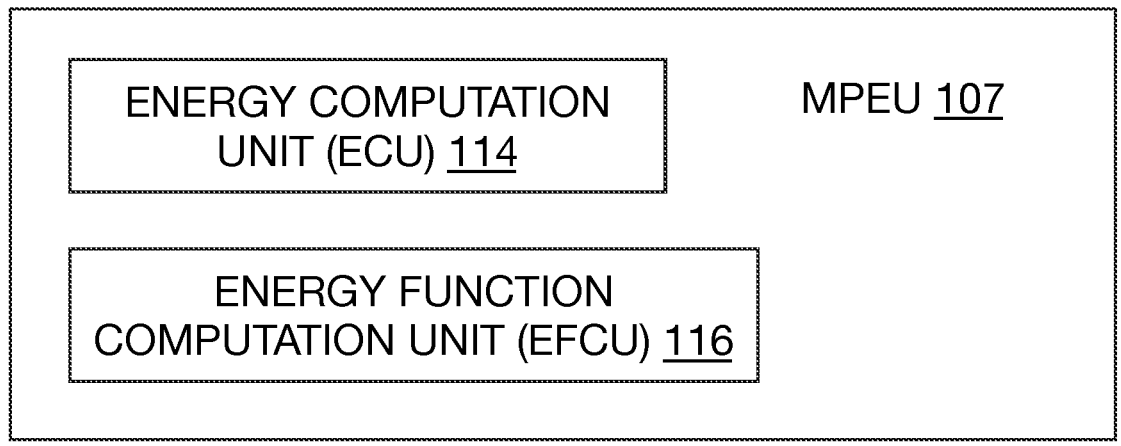
FIG. 7 is a block diagram of an exemplary Mapped Pair Evaluation Unit according to one embodiment.
Figure 9:
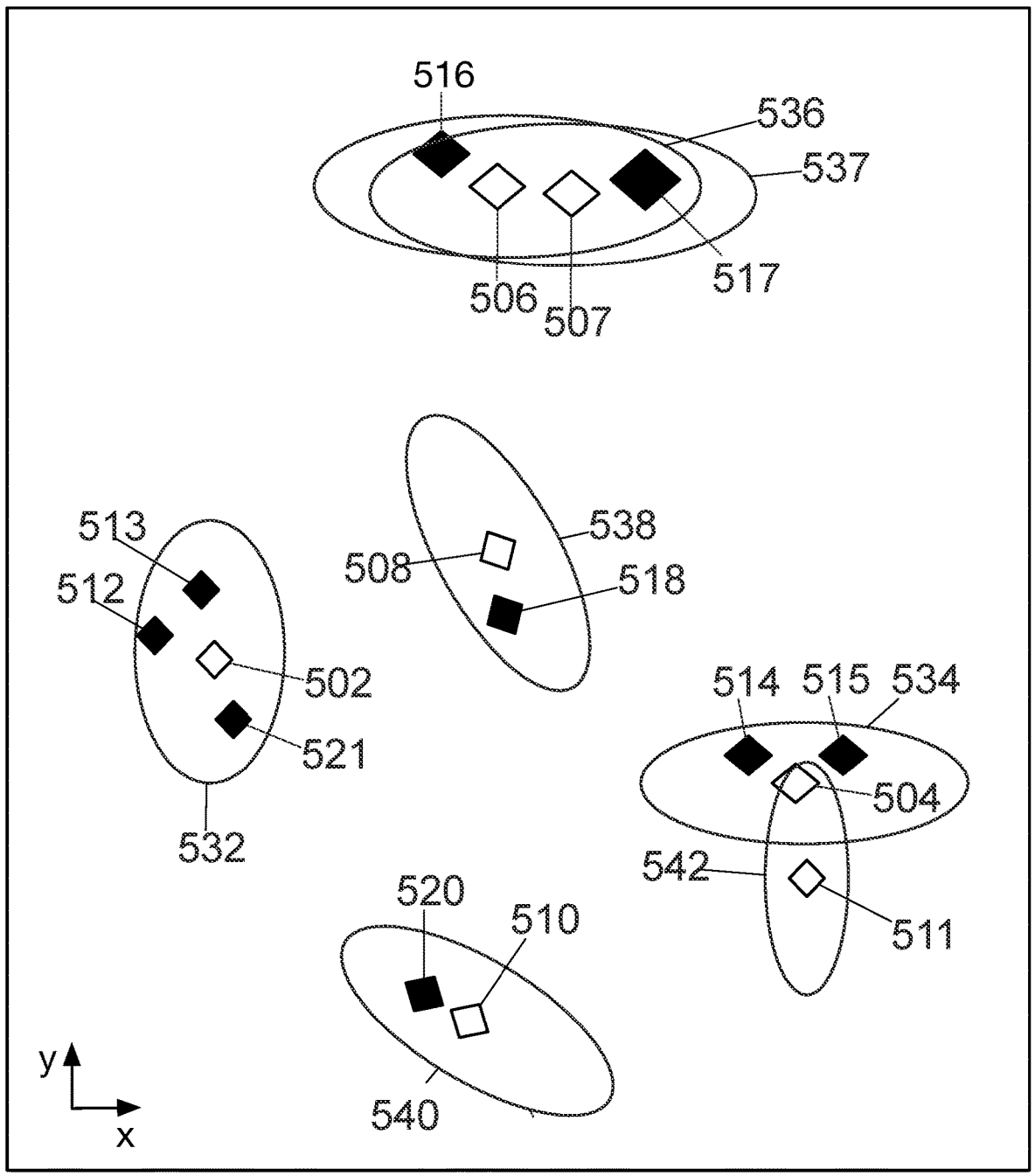
FIG. 9 shows two point sets in 2D where the first point set is represented by white diamonds and the second point set is represented by black diamonds. The points in the first point set are illustrated with their gate areas.

A computing device implements a Matching Unit for example as the one shown in FIG. 9 in the form of software, hardware, firmware, ASIC, or combinations thereof. FIG. 7 depicts an exemplary computing device 607 comprising one or more general purpose processor(s) 602, host memory module(s) 606, bus modules 603, supporting circuits 609, and a data-parallel coprocessor 612. Some embodiments may further include a communication interface 608 that receives inputs from and send outputs to an external network 605. Processor(s) 602 comprises one or more general purpose microprocessors, where such general purpose microprocessors can be one of those found in desktop machines, in embedded systems, virtual CPUs such as those found in cloud computing environments, or any other suitable type of general purpose processors for executing required instructions. Each processor comprises one or more cores that are connected point-to-point, where each core has its own functional units, registers, and caches. All cores in a processor share a common memory module of host memory module(s) 606, and may also shared a common cache. Supporting circuits 609 comprise well-known circuits such as various I/O controllers, power supplies, and the like. Bus 603 comprises data buses and instruction buses between the general purpose processors, the host memory, the coprocessor, communication interfaces, and various peripherals.

Host memory 606 comprises storage devices for example read-only memory (ROM), dynamic random-access memory (DRAM), and the like. Memory 606 provides temporary storage for operation system instructions, which provides an interface between the software applications being executed and the hardware components. Memory 606 is further loaded with instructions for various embodiments of Matching Units including those that program coprocessor 612.

Examples of operating systems include for example MICROSOFT WINDOWS, LINUX, UNIX, various real time operating systems (RTOS) and the like. They also include necessary device driver and runtime so that coprocessor 612 can be programmed from the host. Computing device 607 may further comprise storage devices (not shown) for recording instructions of computer programs into a record medium, or loading instructions from a record medium into memory. For example, such record medium may include internal hard drive, external hard drives, FLASH drives, optical disks, and cloud based storages accessible through Internet.

Data-parallel coprocessor 612 comprises a host interface 630 for receiving data and instructions and sending data between the host and the device. It also comprises one or more SIMD (Single Instruction Multiple Data) cores 616a-616d, where each SIMD core comprises a number of lanes of functional units, where a lane is sometimes refer to as a "CUDA core" in NVIDIA devices and "Processing Elements" in OpenCL contexts. Multiple SIMD cores share a dispatcher unit that fetches, decodes, and dispatches instructions. Multiple SIMD cores also share a scheduler unit that schedules and assigns computation tasks to the SIMD cores. For an illustrative example in FIG. 7 data-parallel coprocessor 612 comprises dispatcher units 622a and 622b and scheduler units 621a and 621b. SIMD cores 616a and 616b share dispatcher unit 622a and scheduler unit 621a; SIMD cores 616c and 616d share dispatcher unit 622b and scheduler unit 621b. Compare to CPU cores, CUDA cores or Processing Elements are much simpler but appear in larger numbers, and hardware threads can be switched on and off at very low cost for latency hiding.

In some embodiments, CUDA cores or Processing Elements can be used to emulate threads by masking out branches that are not executing. In some other embodiments, some lanes may read garbages in and write garbages out. A lane of an SIMD core can execute a "hardware thread" at any time, which is a separate copy of a set of states associate with a kernel function. A data-parallel coprocessor executes a grid of hardware threads and the hardware threads are grouped into units of execution, which are called "warp"s in CUDA and "wavefront"s in AMD devices.

In some embodiments, data-parallel coprocessor 612 include a device memory (a.k.a. global memory) 610 that the SIMD cores can read and write. Alternatively, a coprocessor can be integrated into the same chip as processor(s) 602, in which case they may access memory 606 via bus 603. Examples include various AMD APUs and Intel CPUs that have integrated GPUs. In the former case we say that device memory 610 is coupled with the coprocessor, and in the later case we say that host memory 606 is coupled with the coprocessor. Even when coprocessor 612 has its own device memory 610, in some embodiments a portion of host memory 606 can still be mapped into the address space of coprocessor 612 and that portion is said to be coupled with the coprocessor. In some embodiments, a portion (not shown) of device memory 610 may be used for constant storage to provide read-only access and broadcast access patterns.

Data-parallel coprocessor 612 also include register files 624a and 624b, load/store units 626a, 626b. 626c, and 626d, shared memories 614a and 614b, and inter connections 628. The SIMD cores load data from coupled memories at the addresses computed by the load/store units into the register files through the inter connections, operate on the register files, and store the results into coupled memories at the addresses computed by the load/store units through the inter connections.

In some embodiments, hardware resources are grouped into one or more Resource Groups, which are called Compute Units in the vocabulary of OpenCL. In CUDA devices they map to Stream Multiprocessors (SM). For example in FIG. 7, Resource Group 620a includes scheduler 621a, dispatcher 622a, register files 624a, SIMD cores 616a and 616b, load/store units 626a and 626b, and shared memory 614a. Resource Group 620b includes scheduler 621b, dispatcher 622b, register files 624b, SIMD cores 616c and 616d, load/store units 626c and 626d, and shared memory 614b. The SIMD cores within a Resource Group share hardware resources including registers, load/store units, and optional shared memories. A Resource Group may optionally have its own cache (not shown), which in a CUDA device corresponds to the L1 cache. Similarly in some embodiments, device memory 610 may optionally have its own cache (not shown), which in a CUDA device corresponds to the L2 cache.

Examples of coprocessor 612 include various NVIDIA® CUDA® devices, various discrete AMD® GPUs, GPUs embedded in various AMD APUs and various Intel® CPUs, and various Intel FPGA-based acceleration platforms, GPUs embedded in various ARM devices etc. For example, an NVIDIA CUDA device comprises a large amount of CUDA cores that are divided into multiple Stream Multiprocessors (SM). Each SM includes a plurality of CUDA cores and a limited amount of shared memories/L1 cache, register files, special function units (SFUs), and controlling units, where the exact numbers depend on the GPU architecture. The coprocessor includes a global memory that is also referred to as its device memory for storing for example global data that are visible to all hardware threads and kernel code, etc. On a more abstract level, an OpenCL device includes multiple compute units that correspond to SMs in CUDA, and each compute unit includes multiple processing elements that correspond to multiple CUDA cores. For an OpenCL device its memories are divided into global memories, local memories that correspond to shared memories in CUDA, and private memories that correspond to registers or local memories in CUDA.

According to the CUDA programming model, a user code is divided into a host code that runs on the host side of a computing device and a device code that runs on the coprocessor. The device code is defined in one or more device functions called kernels. Each time a user launches a kernel on a CUDA device, a grid is spawned that contains a number of hardware threads. Kernel launches are asynchronous so that host codes can run concurrently together with device codes after the call returns. A grid is decomposed into multiple thread blocks, and each thread block contains multiple hardware threads. The user specifies the dimensions of a grid in terms of the number of thread blocks in each of the dimensions, and the dimensions of its blocks in terms of the number of hardware threads in each of the dimensions at the time of a kernel launch. The CUDA device receives the kernel parameters and assigns the thread blocks to the SMs, where each thread block is assigned to one SM while each SM can be assigned multiple thread blocks. There is an upper bound that limits the maximum number of thread blocks on an SM at any single time, and this number varies among different GPU architectures. In practice, at any time the actual number of thread blocks that can be assigned to an SM is also restricted by the supplies and demands of its shared resources such as memories and registers. The hardware threads in a thread block are further decomposed into multiple warps for scheduling and dispatching in its SM. High throughput is achieved by efficiently switching to another warp when one is stalled. At the time of writing, a warp consists of 32 hardware threads. The hardware threads in the same thread block can synchronize and communicate with each other using various mechanisms. From the stand point of a hardware thread, the kernel runs a sequential program.

A CUDA stream is a queue of operations. The user adds jobs into the stream and they are executed first in first out (FIFO). Grid level parallelism is achieved by overlapping multiple streams. For example while transferring data between general purpose processor 602 (a.k.a. the host) and coprocessor 612 (a.k.a. the device) for one frame, at the same time the coprocessor can be executing a computing kernel for an earlier frame.

Similar concepts can be found in the OpenCL programming model. Each time a user program enqueues a kernel into the command queue of an OpenCL device, a grid containing work-items that correspond to GPU threads in CUDA is spawned, and the user specifies the dimensions of the work-items by providing an NDRange. An NDRange of work-items are decomposed into work-groups that correspond to thread blocks in CUDA. Within a work-group the work-items can synchronize with each other using various synchronization mechanisms provided by an OpenCL runtime. Work-groups are assigned to compute units where they are further decomposed into wavefronts for AMD GPUs. Compared with warps in CUDA devices, a wavefront for AMD GPUs typically consists of 64 work-items.

In order to communicate with OpenCL devices, a host program creates a context to manage a set of OpenCL devices and a command queue for each of the OpenCL devices. Commands that are enqueued into a command queue could include for example kernels, data movements, and synchronization operations. Compared to streams in the CUDA programming model, commands in an out-of-order queue can be made to depend on events that are associated with other commands. Alternatively a host program can create multiple in-order command queues for the same device. Kernel launches are also asynchronous, and since kernel launches can be associated with events, if required the OpenCL runtime provides APIs for a host to block on the events until the corresponding operations finish. In addition, the OpenCL programming model provides several mechanisms for exchanging data between hosts and OpenCL devices, such mechanisms including for example buffers, images, and pipes.

Dynamic Parallelism allows a hardware thread to enqueue a grid for another kernel or recursively for the same kernel. The new grid is considered a child of the parent hardware thread. The parent hardware thread can implicitly or explicitly synchronize on the child's completion, at which point the results are guaranteed to be visible to the parent grid. OpenCL version 2 and CUDA version 5.0 onwards support dynamic parallelism.

Shared memories are often used as a faster but smaller intermediary to improve access to global memories. Shared memories as its name suggests are shared by all hardware threads in a same thread block. A shared memory comprises multiple memory banks, and one sometimes needs to pad data arrays in order to avoid bank conflicts.

In this document I'll use "hardware threads" to refer to either GPU threads in CUDA or work-items in OpenCL depending on the context. I'll mostly use CUDA terminologies: for example "thread blocks" refers to thread blocks in the CUDA context or work groups in the OpenCL context, and I'll use "shared memories" to refer to either shared memories in the CUDA context or local memories in the OpenCL context.

Detailed Description—Matching Unit

Figure 8:
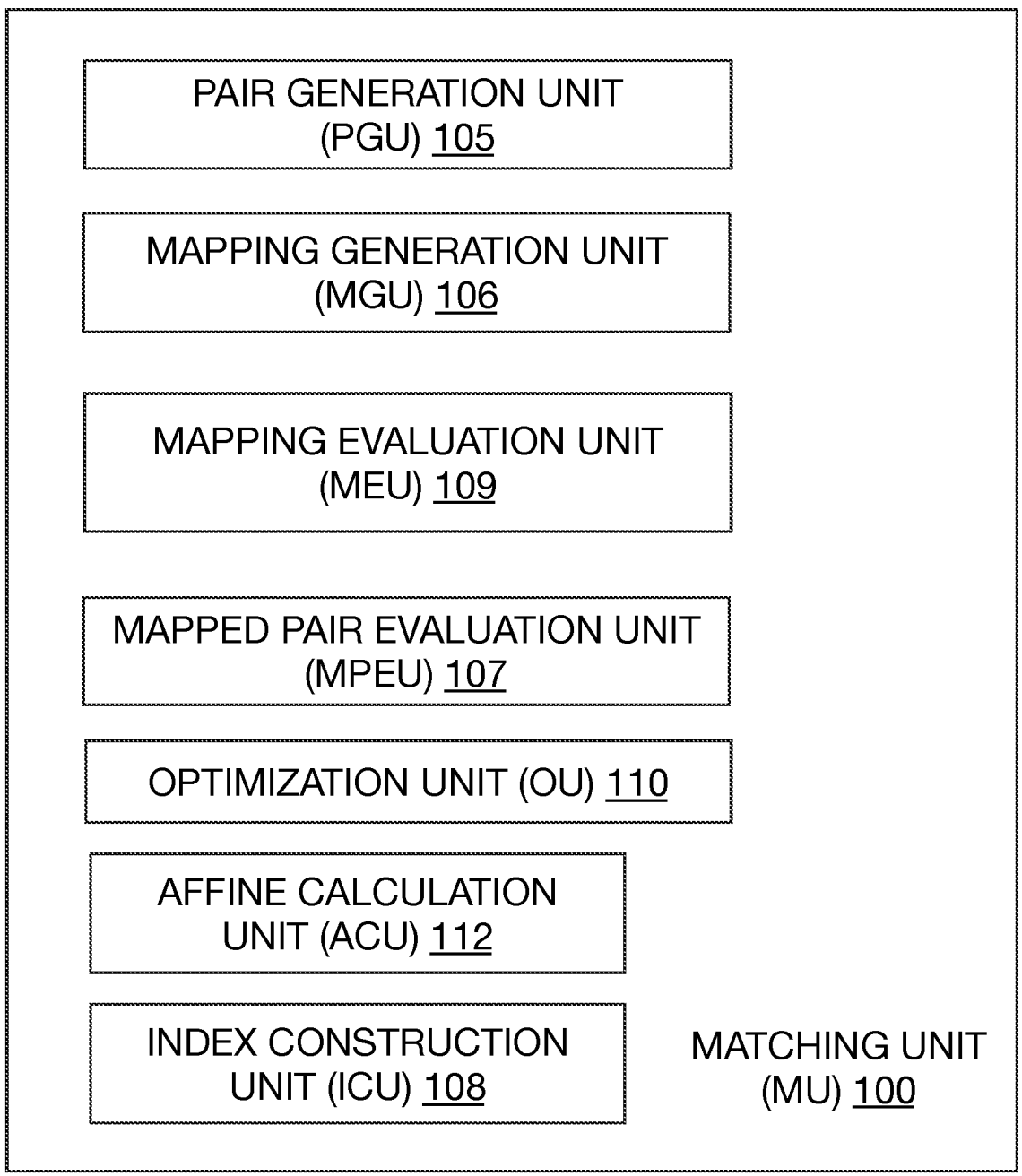
FIG. 8 is a block diagram of an exemplary Matching Unit according to one embodiment.

FIG. 9 is a block diagram of an exemplary embodiment of a Matching Unit (MU) 100. As shown in FIG. 9, MU 100 includes a PAIR Generation Unit (PGU) 105, a Mapping Generation Unit (MGU) 106, a Mapping Evaluation Unit (MEU) 109, a Mapped Pair Evaluation Unit (MPEU) 107, an Index Construction Unit (ICU) 108, an Affine Calculation Unit (ACU) 112, and an Optimization Unit (OU) 110. FIG. 8 illustrates MPEU 107 according to one embodiment, where it comprises an Energy Computation Unit (ECU) 114 and an Energy Function Computation Unit (EFCU) 116. MU 100 and its components can be are implemented on computing device 607 shown in FIG. 7 or various components can be implemented in the form of software, hardware, firmware, ASIC, or combinations thereof.

Figure 1:
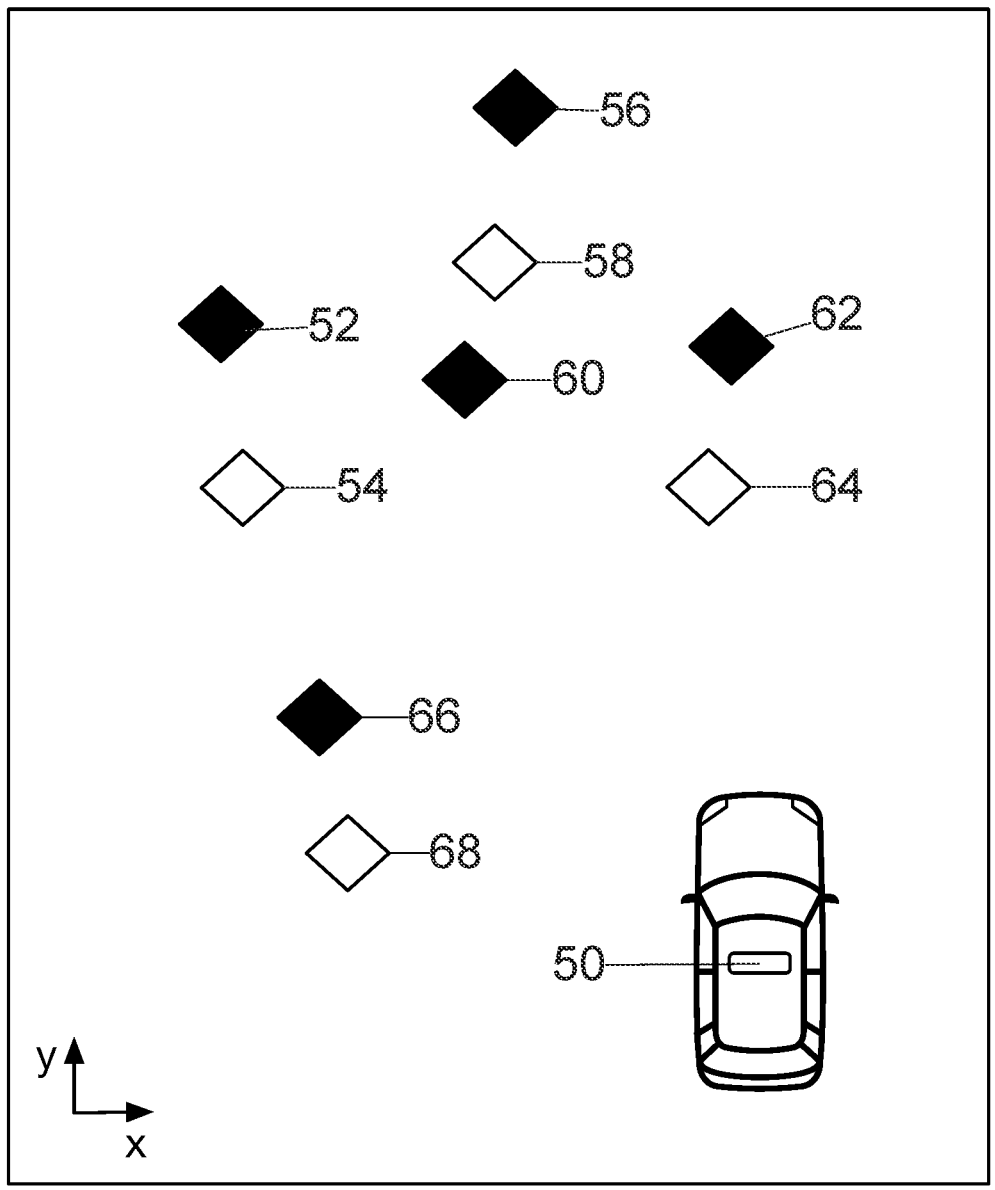
FIG. 1 is an exemplary illustration in 2D of a vehicle, a set of landmarks obtained from a digital map, and a set of points obtained from the vehicle's measurements.
Figure 2:
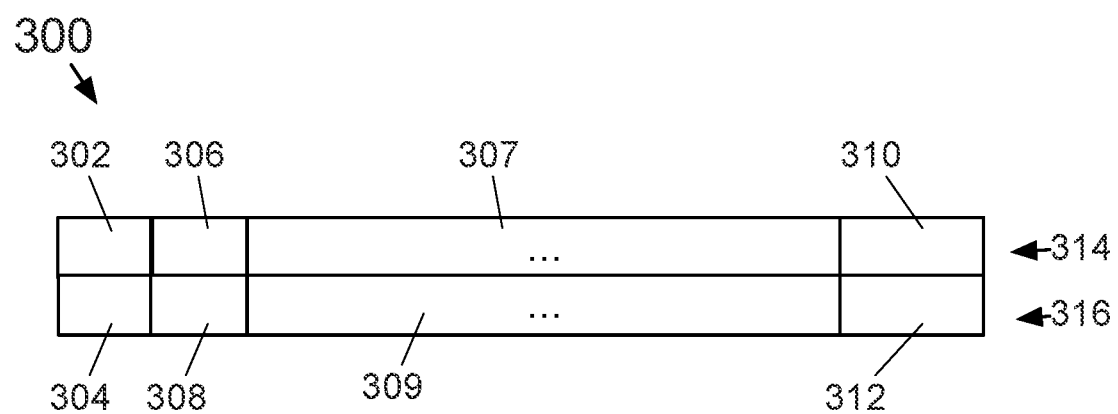
FIG. 2 is a visual illustration of the memory layouts of an exemplary array of spatial point in 2D stored as an SoA according to one embodiment.

Referring to FIG. 2, it includes a visual illustration of the memory layouts of an exemplary spatial point set in 2D, where the x and y coordinates are stored in an SoA 300 comprising an array 314 that contains the x coordinates and an array 316 that contains the y coordinates, where the x and y coordinates are stored continuously in their respective arrays. Array 314 has a first element 302, a second element 306, a collection of elements 307, and a last element 310; array 316 has a first element 304, a second element 308, a collection of elements 309, and a last element 312. According to one embodiment, the point ids are the offsets in either array. Elements 302 and 304 contain the x and y coordinates of the point whose point id is 0, elements 306 and 308 contain the x and y coordinates of the point whose point id is 1, and so on, until at the end, elements 310 and 312 contain the coordinates of the last point whose point id is M−1, where M is the number of points in the point set. Each element could contain an integer, a floating point number, or a rational number depending on the embodiment and its choice of data formats. In an embodiment in 3D, there is an additional array containing the z coordinates. Arrays 314 and 316 can be stored one after the other with or without paddings, or in separate arrays.

Figure 3:
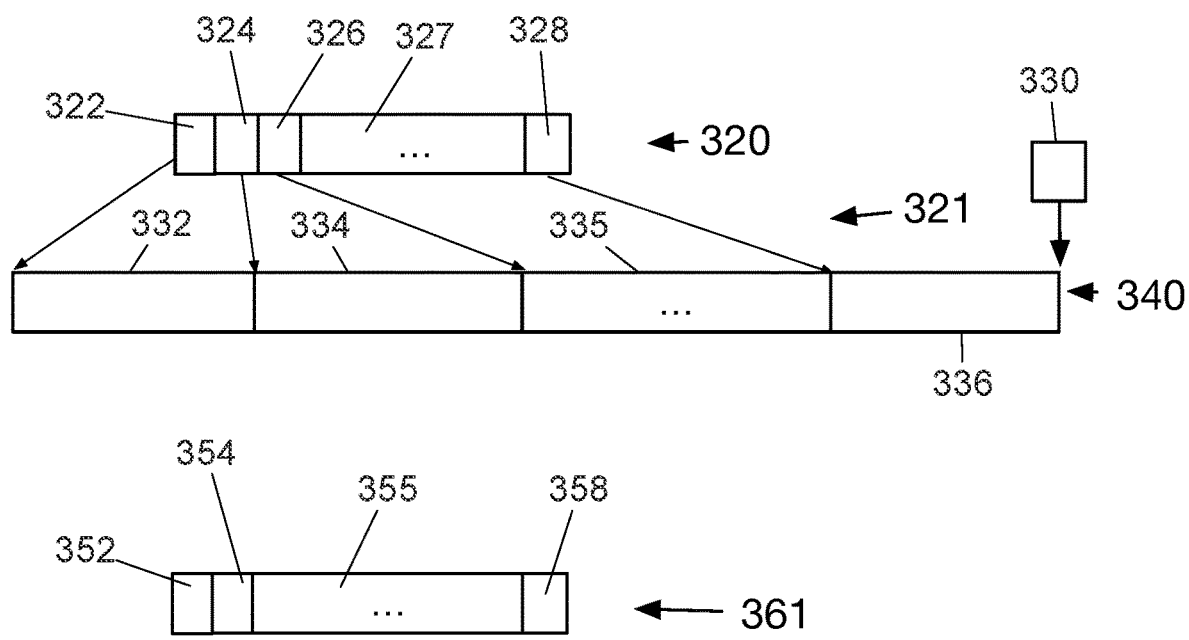
FIG. 3 is a visual illustration of the memory layouts of an exemplary CCISS according to one embodiment where the segments are not uniformly padded.

Referring to FIG. 3, it includes a visual illustration of the memory layouts of an exemplary candidate-correspondences-in-separate-sets (CCISS) between a first and a second point sets. It contains a set of candidate correspondences grouped into separate sets according to their end points in the first point set and an optional array of bases 361. The separate sets of candidate correspondences comprise two arrays 320 and 340. Array 340 concatenates non-overlapping segments 332, 334, an aggregation of one or more segments 335, and last segment 336. The number of segments in array 340 is equivalent to the number of points in the first point set.

According to one embodiment, the offsets of the elements (not the values of the elements) in array 320 are the same as the point ids, i.e., offset i that is used to access the coordinates of the point whose point id is i in the SoA of coordinates as shown in FIG. 2 is used to access the element in array 320 that contains the start offset of the corresponding segment in array 340, where the segment contains the end points in the second point set of point i's separate set of candidate correspondences. Thus the first segment in array 340 contains the point ids in the second point set of all the candidate correspondences whose end points in the first point set is 0, the second segment in array 340 contains the point ids in the second point set of all the candidate correspondences whose end points in the first point set is 1 and so on. Each segment in array 340 together with the offset of its corresponding element in array 320 correspond to one separate set of the separate sets of candidate correspondences.

As illustrated in the figure using arrow-headed lines 321, array 320 has a first element 322 that contains the start offset of first segment 332 (which in this case is 0 so it is omitted in another embodiment so that when looking for the segment of point id 0, 0 directly returned); a second element 324 that contains the start offset of second segment 334 in array 340; a third element 326 that contains the start offset of aggregation of one or more segments 335; collection of elements 327 that contain the start offsets of the remaining segments in aggregation of one or more segments 335; and last element 328 that contains the start offset of last segment 336 in array 340. Finally, in some embodiment there is an optional separate element 330 that contains the offset right after last segment 336, that is, if one appends one more segment right after last segment 336 of array 340, it would contain the offset into the beginning of this appended segment. Separate element 330 can be used for example for boundary checking. Thus the value of each element in array 340 together with the offset of the corresponding element in array 320 that contains the start offset of its segment are the two point ids of two end points of a candidate correspondence, and each candidate correspondence can be uniquely identified by its offset in array 340. A candidate correspondence can also be uniquely identified within its separate set of candidate correspondences by its offset from the start of its segment. It's important to differentiate between the index of a candidate correspondence and the index of the candidate correspondence in its separate set of candidate correspondences: the former identifies the candidate correspondence within all candidate correspondences and the later identifies it within those that share with it the same end point in the first point set.

Alternatively according other embodiments, array 340 contains offsets into an SoA or AoS of candidate correspondences where each element is a tuple of the two point ids of a candidate correspondence. In this case array 340 comprises segments that are similarly accessed by the offsets contained in array 320 as described above. Alternatively according to another embodiment, array 340 is itself an SoA or AoS of candidate correspondences, where each element is a tuple of two point ids, and the elements are grouped into segments indexed by array 320 as described previously.

FIG. 3 also shows an optional array of bases 361 containing the number of candidate correspondences defined by the segments in array 340 in the order that they appear in array 340. It has a first element 352, second element 354, a collection of elements 355, and a last element 358. Element 352 contains the number of the candidate correspondences defined by the elements of first segment 332 and the offset of the segment's corresponding element in array 320, element 354 contains the number of the candidate correspondences defined by the elements of second segment 334 and the offset of the segment's corresponding element in array 320, a collection of elements 355 containing the numbers of the candidate correspondences in the segments contained in aggregation of one or more segments 335, and last element 358 contains the number of the candidate correspondences defined by the elements of last segment 336 and the offset of the segment's corresponding element in array 320.

According to some embodiments, MU100 receives a first and a second spatial point sets in nD, and a CCISS between the two point sets, where there is no isolated points in the first point set. Alternatively in another embodiment, MU 100 receives a first and a second spatial point sets in nD, and a set of candidate correspondences between the two point sets, uses general purpose processor 602 to find any isolated point from the first point set by for example either iterating through all candidate correspondences while keeping a counter for each point in the first point set, storing all the candidate correspondences in a multi-map or multi-hashmap indexed by their end points in the first point set, or sorting the candidate correspondences according to their point ids in the first point set, then removes isolated points from the first point set, and then adjust the point ids in the candidate correspondences. For example, suppose the embodiment receives an array of coordinates as shown in FIG. 2. If a point in the first point set whose point id is 2 is removed because it is an isolated point, the point immediately after it now has point id 2, and the the point previously has point id 4 now has point id 3 and so on. While finding isolated points one can construct a mapping between the original point ids in the first point set and the number of isolated points before it. This can be used to update all candidate correspondences.

It then groups the candidate correspondences into separate sets according to their end points in the first point set for example by sorting the candidate correspondences according to their point ids in the first point set, or storing all the candidate correspondences in a multi-map or multi-hashmap indexed by their end points in the first point set (if they haven't already been sorted or stored in a multi-map or multi-hashmap). The ordering of the candidate correspondences after the sorting within each of the separate sets is regarded as the order of the CCISS within each of the separate sets. Alternatively, in addition to sorting the candidate correspondences according to their end points in the first point set, another embodiment sort the candidate correspondences using a comparator that compares two candidate correspondences by the point ids in the first point set and when they are equal then by the point ids in the second point set. A comparator is a common pattern in many programming languages and/or libraries. Alternatively if using a multi-map or multi-hashmap, given a point id in the first point set, the order in which its candidate correspondences are retrieved can be used to order the candidate correspondences within the separate set. Alternatively if isolated points are not removed, special handling would be required in various units as described in the separate units. In this case a CCISS can have segment length 0. It then allocates data structures as shown in FIG. 3. If the embodiment provides an array of bases, the size of each separate set is recorded to array of bases 361. Then it computes the accumulative sums of the separate sets into array 320, and loops through the sorted candidate correspondences to fill values into array 340, where in each single iteration it retrieves a new candidate correspondence, checks which segment this candidate correspondence belongs to by checking its end point in the first point set, and append relevant information, for example the end point in the second point set, into the corresponding element of the corresponding segment in array 340. In order to do this, it maintains a running appending location/running count starting from 0 for each of the segments.

Given two point sets and a CCISS of the point sets, MU 100 uses PGU 105 to generate an array of (n+1) combinations in the first point set and an array of one or more pairs of neighbor (n+1) combinations referencing the array of (n+1) combinations.

Figure 4:
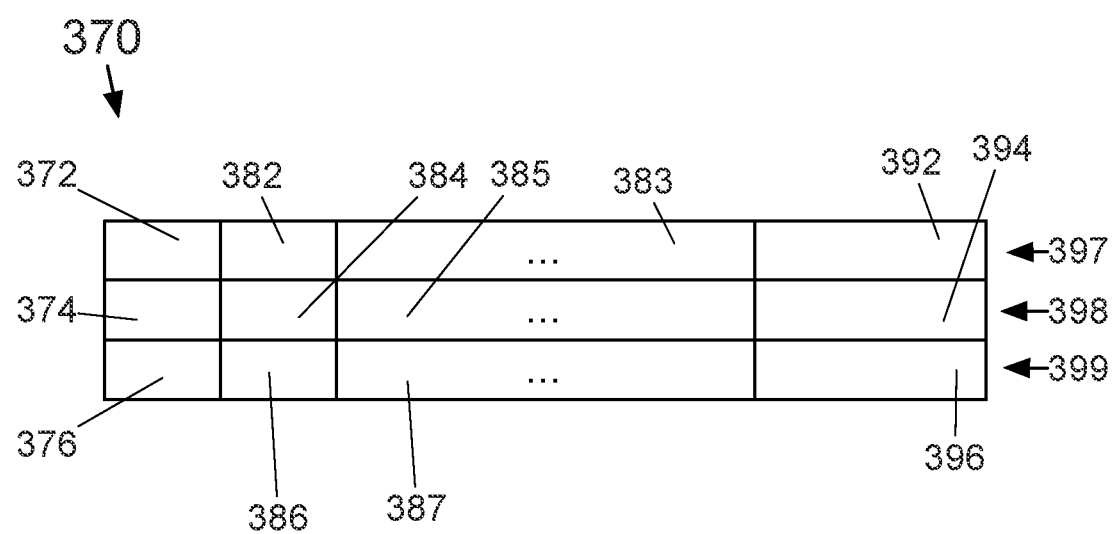
FIG. 4 is a visual illustration of the memory layouts of an exemplary array of (n+1) combinations in 2D stored as an SoA according to one embodiment.

Referring to FIG. 4, it is a visual illustration of the memory layouts of an exemplary array of (n+1) combinations 370 in 2D stored as an SoA. Array 370 comprises a first scalar array 397 containing the point ids of the first vertices of the (n+1) combinations, a second scalar array 398 containing the point ids of the second vertices of the (n+1) combinations, and a third scalar array 399 containing the point ids of the third vertices of the (n+1) combinations. First array 397 contains a first element 372, a second element 382, a collection of elements 383, and a last element 392; second array 398 contains a first element 374, a second element 384, a collection of elements 385, and a last element 394; third array 399 contains a first element 376, a second element 386, a collection of elements 387, and a last element 396. First elements 372, 374, 376 contain the point ids of the three vertices of the first (n+1) combination. The first elements are indexed by 0, which is just the first elements' offsets in the scalar arrays; second elements 382, 384, 386 contain the point ids of the three vertices of the second (n+1) combination, and they are indexed by 1 and so on. Last elements 392, 394, and 396 contain the point ids of the three vertices of the last (n+1) combination, they are indexed by N−1, where N is the number of (n+1) combinations. In another embodiment in 3D, there is a fourth array containing the point ids of the fourth vertices.

Figure 5:
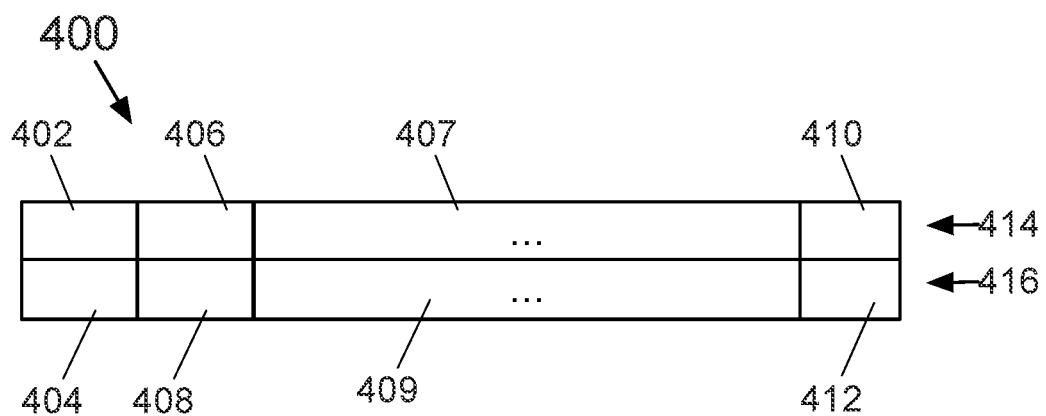
FIG. 5 is a visual illustration of the memory layouts of an exemplary array of pairs of neighbor (n+1) combinations stored as an SoA according to one embodiment.
Figure 6:
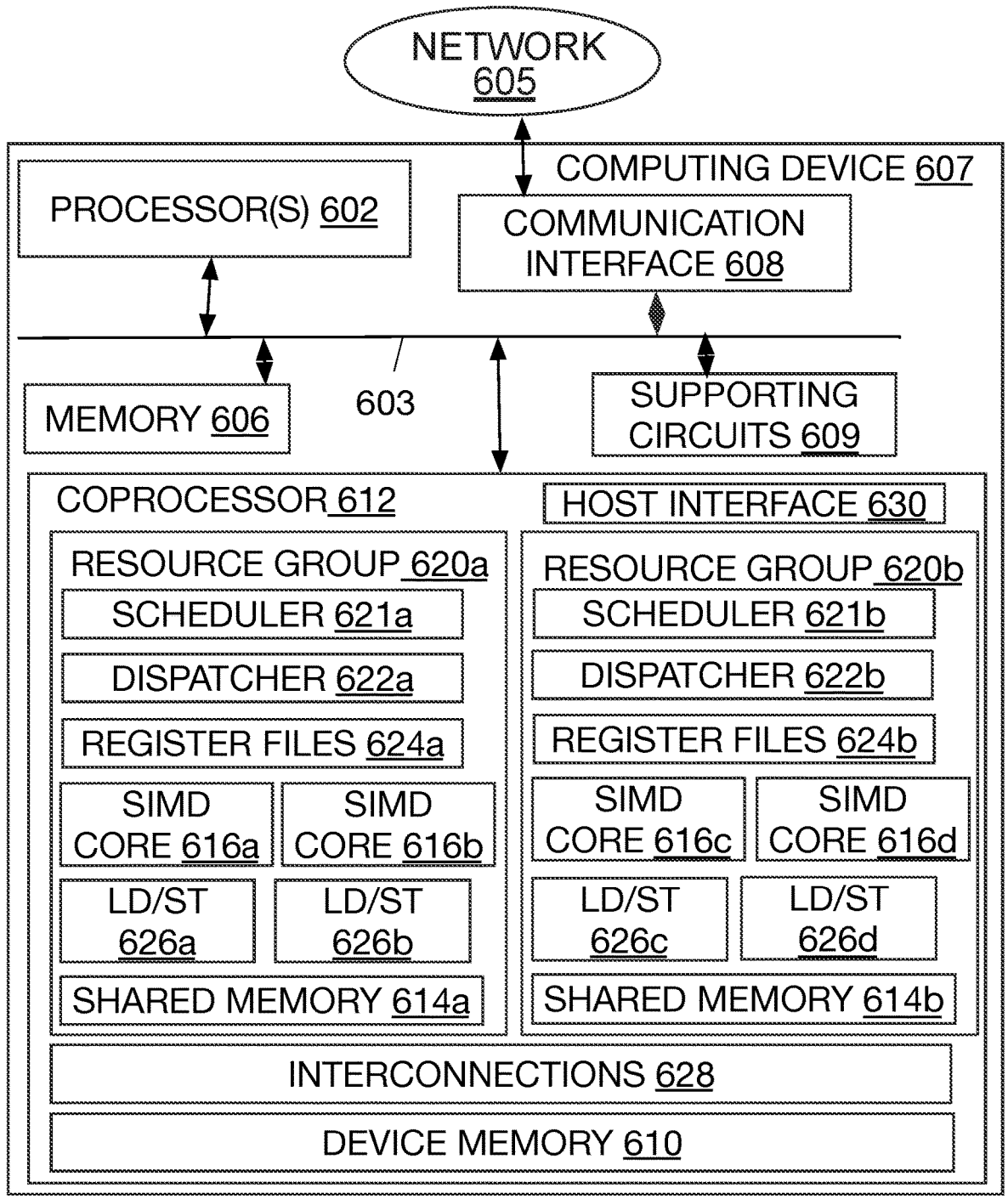
FIG. 6 shows a block diagram of an exemplary computing device including a coprocessor according to one embodiment.

Referring to FIG. 5, it is a visual illustration of the memory layouts of an exemplary array of pairs of neighbor (n+1) combinations 400 stored as an SoA. Array 400 comprises a first scalar array 414 containing the first (n+1) combination indices of the array of pairs of neighbor (n+1) combinations, and a second array 416 containing the second (n+1) combinations indices of the array of pairs of neighbor (n+1) combinations, where in both scalar arrays the (n+1) combination indices are stored continuously. First array 414 contains a first element 402, a second element 406, a collection of elements 407, and a last element 410. Second array 416 contains a first element 404, a second element 408, a collection of elements 409, and a last element 412. First elements 402 and 404 contain the two (n+1) combination indices of the first (a.k.a. 0-th) pair of neighbor (n+1) combinations; second elements 406 and 408 contain the two (n+1) combination indices of the second (a.k.a. 1-st) pair of neighbor (n+1) combinations and so on. Last elements 410 and 412 contain the two (n+1) combination indices of the last pair of neighbor (n+1) combinations, which is indexed by index K−1, where K is the number of pairs of neighbor (n+1) combinations. We'll refer to the offset/index of a pair of neighbor (n+1) combinations in an array of pairs of neighbor (n+1) combinations a pair index. Alternatively an array of pairs of neighbor (n+1) combinations can be stored as an AoS. Alternatively in another embodiment, an array of pairs of neighbor (n+1) combinations store for each pair of neighbor (n+1) combination the 2n+2 vertices of its two (n+1) combinations in an SoA or AoS, where the 2n+2 vertices may not be distinct.

An "index" refers to an identifier that can be used to retrieve a certain value from a collection of scalars or structs, where each of the scalars or structs is associated with a unique identifier. An SoA can be used to store a collection of structs and the offsets of the structs' components in the scalar arrays are used as their unique identifiers. Alternatively, other suitable indexing structures such as the hash table can be used as we'll discuss later.

MU 100 uses MGU 106 to generate a plurality of N-to-1 mappings. For each of the N-to-1 mappings it uses MEU 109 to generate an overall distance measure. To achieve this, it uses ACU 112 to generate an array of solving structures. Then according to one embodiment it uses ICU 108 to construct a two-level indexing structure for (n+1) combinations, and then uses MEU 109 to generate a plurality of local distance measures for unique combinations of the N-to-1 mappings and the pairs of neighbor (n+1) combinations. In another embodiment, after constructing a two-level indexing structure for (n+1) combinations, it further uses ICU 108 to construct a two-level indexing structure for pairs of neighbor (n+1) combinations, and uses MEU 109 to obtain a plurality of local distance measures for unique combinations of the N-to-1 mappings and the pairs of neighbor (n+1) combinations. In either cases, it then uses MEU 109 to generate an overall distance measure for each N-to-1 mapping. Finally it uses OU 110 to find and output one or more N-to-1 mapping with the lowest overall distance measures. During the process a unit may use another unit to fulfill its functions. For example, ICU 108 uses MPEU 107 to compute local distance measures when constructing two-level indexing structures for pairs of neighbor (n+1) combinations. The units involved in these steps will be discussed in the following paragraphs. As another example, ICU 108 uses ACU 112 to apply solving structures to generate necessary components of affine transformations.

Detailed Description—Mapping Generation Unit

Figure 10:
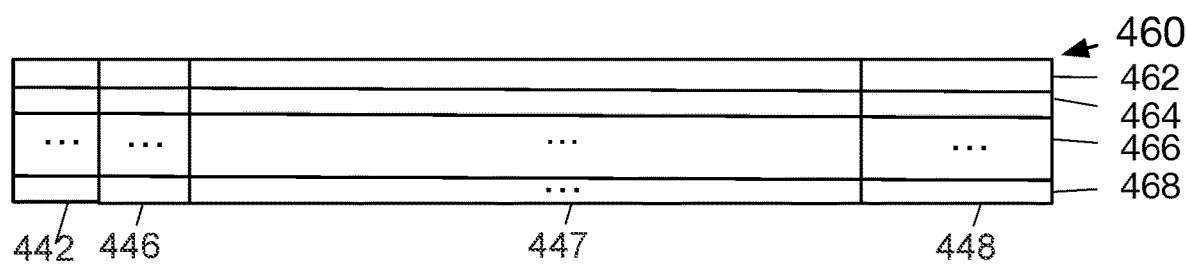
FIG. 10 is a detailed illustration of the memory layouts of first segment 754 in FIG. 14a according to one embodiment.

Referring to FIG. 9, MU 100 comprises a Mapping Generation Unit (MGU) 106. MGU 106 receives CCISS and uses it to generate a set of N-to-1 mappings between the two point sets. For example, FIG. 10 shows an exemplary scenario in 2D for illustration purpose. It shows a first point set 502, 504, 506, 507, 508, 510, 511, and a second point set 512, 513, 514, 515, 516, 517, 518, 520 and 521. For point 502, there is a gate area 532. Since points 512, 513 and 521 in the second point set are within the gate area, the CCISS includes candidate correspondences (502, 512), (502, 513), and (502, 521). Similarly, for point 504 it has a gate area 534 that contributes candidate correspondences (504, 514) and (504, 515). Points 506 and 507 has gate areas 536 and 537 respectively, which contributes candidate correspondences (506, 516), (506, 517), (507, 516), (507, 517). Point 508 has gate area 538 that contributes a candidate correspondence (508, 518), point 510 has a gate area 540 that contributes a candidate correspondence (510, 520). Point 511 has gate area 542, but since there's no points from the other point set in its gate area, there is no candidate correspondences for this point.

According to some embodiments, either the application or MU 100 removes isolated point 511, and MU 100 receives a CCISS consisting of the following separate sets of candidate correspondences: {(502, 512), (502, 513), (502, 521)}, {(504, 514), (504, 515)}, {(506, 516), (506, 517)}, {(507, 516), (507, 517)}, {(508, 518)}, {(510, 520)}.

Alternatively according to another embodiment, MGU 106 receives a CCISS comprises in addition a zero-length segment for point 511: {(502, 512), (502, 513), (502, 521)}, {(504, 514), (504, 515)}, {(506, 516), (506, 517)}, {(507, 516), (507, 517)}, {(508, 518)}, {(510, 520)}, { }. MGU 106 skips point 511 when generating N-to-1 mappings as described below. Regardless of whether the CCISS comprises isolated points or not, the number of resulting N-to-1 mappings is computed excluding the isolated point:

$$\prod_{j=0,\ldots,(M-1), n_j \neq 0} n_j = 24,$$

where $n_j$ is the number of candidate correspondences that have the j-th point in the first point set as one of its end points.

The set of N-to-1 mappings generated for the CCISS contains the Cartesian products of the separate sets: {(502, 512), (502,513), (502,521)}×{(504,514), (504,515)}×{(506, 516), (506,517)}×{(507,516), (507,517)}×{(508,518)}×{ (510,520)}, which includes 24 N-to-1 mappings:
  {(502,512), (504,514), (506,516), (507,516), (508,518), (510,520)},
  {(502,513), (504,514), (506,516), (507,516), (508,518), (510,520)},
  {(502,521), (504,514), (506,516), (507,516), (508,518), (510,520)},
  {(502,512), (504,515), (506,516), (507,516), (508,518), (510,520)},
  {(502,513), (504,515), (506,516), (507,516), (508,518), (510,520)},
  {(502,521), (504,515), (506,516), (507,516), (508,518), (510,520)},
  {(502,512), (504,514), (506,517), (507,516), (508,518), (510,520)},
  {(502,513), (504,514), (506,517), (507,516), (508,518), (510,520)},
  {(502,521), (504,514), (506,517), (507,516), (508,518), (510,520)},
  {(502,512), (504,515), (506,517), (507,516), (508,518), (510,520)},
  {(502,513), (504,515), (506,517), (507,516), (508,518), (510,520)},
  {(502,521), (504,515), (506,517), (507,516), (508,518), (510,520)},
For brevity I am just showing twelve of the twenty four resultant mappings, the other twelve can be obtained by replacing (507,516) with (507,517) in the first twelve mappings. The results are all N-to-1, although some may not be one-to-one. For example, since point 516 appears simultaneously in two gate areas, in some N-to-1 mappings both points 506 and 507 are associated with it.

The N-to-1 mappings can be computed serially using iterators or recursions. Refer to for example the answers to the Stackoverflow question "How can I create cartesian product of vector of vectors?" retrieved from Stackprinter. Alternatively, it can be computed concurrently by coprocessor 612 using a Mixed Radix Number System that maps between global thread indices of a 1D grid and N-to-1 mappings. Please refer to "Mixed Radix" retrieved from Wikipedia for more information about Mixed Radix Number Systems. To illustrate this let's use the scenario shown in FIG. 10 to give a concrete example. Excluding isolated points in the first point set, one can represent an N-to-1 mapping as a tuple of six elements $(i_0, i_1, i_2, i_3, i_4, i_5)$, where $i_1 \in \{0,1,2\}$ is an index into the separate set of candidate correspondences associated with point 502: {(502, 512), (502, 513), (502, 521)}, $i_1 \in \{0,1\}$ is an index into the separate set of candidate correspondences associated with point 504: {(504, 514), (504,515)} and so on, assuming all indices start from 0. Let's denote the size of the separate set of candidate correspondences for point 502 as $n_0=3$, for point 504 as $n_1=2$, for point 506 as $n_2=2$, for point 507 as $n_3=2$, for point 508 as $n_4=1$, and for point 510 as $n_5=1$. Such a tuple can be mapped into an integer as follows:

$$idx = i_0 * \prod_{j=1,\ldots,5} n_j + i_1 * \prod_{j=2,\ldots,5} n_j + i_2 * \prod_{j=3,\ldots,5} n_j + i_3 *$$
$$\prod_{j=4,5} n_j + i_4 * n_5 + i_5$$
$$= ((((i_0 * n_1 + i_1) * n_2 + i_2) * n_3 + i_3) * n_4 + i_4) * n_5 + i_5$$

In this specific example:

$$idx = i_0 * 8 + i_1 * 4 + i_2 * 2 + i_3 * 1 + i_4 * 1 + i_5$$
$$= ((((i_0 * 2 + i_1) * 2 + i_2) * 2 + i_3) * 1 + i_4) * 1 + i_5$$

In general if there are M non-isolated elements in a first spatial point set, and let $n_0, n_1, \ldots, n_{M-1}$ be their respective number of candidate correspondences, then an N-to-1 mapping can be represented by a tuple of M-1 elements $(i_0, i_1, \ldots, i_{M-1})$, where $0 \leq i_j < n_j$, and the tuple can be mapped into an integer as:

$$idx=(\ldots((i_0 * n_1 + i_1) * n_2 + i_2) \ldots + i_{M-2}) * n_{M-1} + i_{M-1} \quad (1)$$

On the other hand, it's straightforward to map between tuples and Mixed Radix Numbers. For example in the example given above, we can map the tuples into the numbers of a Mixed Radix Number System with six digits, where $i_0$ is mapped to the most significant digit with no being its base, and $i_5$ is mapped to the least significant digit with $n_5$ being its base, and the rests are mapped accordingly. Alternatively different schemes of mapping can be used. For example in another embodiment the mapping between the digits and the points in the first point set are reversed, $i_0$ now indexes into the separate set of candidate correspondences associated with point 510, $i_1$ now indexes into the separate set of candidate correspondences associated with point 508 and so on. Thus the mapping between the N-to-1 mappings and the integers is also changed:

$$idx = i_0 * 24 + i_1 * 24 + i_2 * 12 + i_3 * 6 + i_4 * 3 + i_5$$
$$= ((((i_0 * 1 + i_1) * 2 + i_2) * 2 + i_3) * 2 + i_4) * 3 + i_5$$

In fact any one-to-one mapping between the digits and the points in the first point set can be used as long as it is used consistently.

In general, this allows us to bijectively map between N-to-1 mappings and a continuous range of integers from 0 to $n_0 * n_1 * \ldots * n_{M-1} - 1$ inclusively through a Mixed Radix Number System with M digits whose j-th digit $i_j$ has base $n_1$. For the other direction, one can iteratively divide a given integer in the range by the bases and record the remainders in the following matter: first divide the integer by the base of the least significant digit and record the remainder, then divide the integral quotient by the base of the second least significant digit and record a second remainder, until all the bases except that of the most significant digit have been divided and all the remainders and the last quotient have been recorded. In order to do this, the bases except for the base of the most significant digit need to be be made available, and the number of digits is either stored in memory or it can be hard-coded in the form of the number of iterations if the number of digits is fixed.

This method can be applied when restricted to a subset of the first point set. For example if restricted to a given (n+1) combination of the first point set, the (n+1) local indices of the (n+1) combination can be bijectively mapped into a continuous range of integers from 0 to $*n_{m_0}*n_{m_1}* \ldots *n_{m_n}-1$, where $m_0, m_1, \ldots m_n$ are the point ids of the vertices of the (n+1) combination, through a Mixed Radix Number System of n+1 digits where digit $i_j$ has base $n_{m_j}$. If one wants to store a fixed sized datum for each of the (n+1) local indices for later retrieval, one can use either an SoA or an AoS that stores $n_{m_0}*n_{m_1}* \ldots *n_{m_n}$ number of elements, and a datum given an (n+1) local index can be stored at the element at the offset of the corresponding integer. I will refer to such an SoA or AoS as a Mixed Radix Indexed Array of the given (n+1) combination. Together the bases of the n least significant digits and the mapping between the digits and the end points of the (n+1) combination is referred to the Mixed Radix Number System of the Mixed Radix Indexed Array. The Mixed Radix Indexed Array can be queried using the (n+1) combination's (n+1) local indices through the Mixed Radix Indexed Array's Mixed Radix Number System. In this case, since the number of digits is fixed to be n+1, it can be hard coded as the number of iterations in both directions.

The (n+2) correspondences (or equivalently the (n+2) local indices) of a given pair of neighbor (n+1) combinations can be bijectively mapped into a range of integers inclusively from 0 to $n_{m_0}*n_{m_1}* \ldots *n_{m_{n+1}}-1$, where $m_0, m_1, \ldots, m_{n+1}$ are the point ids of the distinct vertices of the pair of neighbor (n+1) combinations. A Mixed Radix Indexed Array of length $n_{m_0}*n_{m_1}* \ldots *n_{m_{n+1}}$ and its Mixed Radix Number System can be similarly defined. The Array stores a fixed size datum for each (n+2) local index of the pair of neighbor (n+1) combinations.

Now back to generating all the N-to-1 mappings, in the current embodiment, MGU 106 comprises a one dimensional grid whose size is greater than or equal to the number of resulting N-to-1 mappings. Each hardware thread of the grid receives or 'computes and receives' (to be elaborated below) a global thread index, does a necessary boundary checking, then iteratively divides the global thread index by the bases starting from the base associated with the least significant digit until the penultimate base. The remainders and the last quotient are recorded in a tuple that represents an N-to-1 mapping. A tuple generated by dividing and recording contains indices of candidate correspondences in their separate sets. Alternatively, each hardware thread can be programmed to generate two or more N-to-1 mappings.

Finally, generated tuples are stored in an array of N-to-1 mappings as an SoA or an AoS at the offset of the global thread index in the device memory. In the current embodiment, the N-to-1 mappings are stored in an SoA containing a number of scalar arrays, each scalar array stores the indices of candidate correspondences in one separate set for one of the points in the first point set. For example, the first element (a.k.a. 0-th element) of the first scalar array stores the index (in its separate set) of the candidate correspondence associated with point 0 in the first point set in the 0-th N-to-1 mapping, the second element (a.k.a. the 1-st element) of the first scalar array stores the index (in its separate set) of the candidate correspondence associated with point 0 in the first point set in the 1-st N-to-1 mapping and so on. The first element (a.k.a. the 0-th element) of the second scalar array stores the index (in its separate set) of the candidate correspondence associated with point 1 in the first point set in the 0-th N-to-1 mapping and so on. The number of the scalar arrays is the number of points in the first spatial point set.

According to another embodiment where the CCISS contains segments of zero length, while a hardware thread iteratively divides and records, if it sees a base 0, it skips the division step and records for example either any integral value or a special integer, for example an integer that is large enough or negative that it can not be a valid candidate correspondence index in its separate set according to the limitation of the system or the frame, in the tuple.

For a CUDA device, a hardware thread receives a local thread index whose symbol is threadIdx, a block index whose symbol is blockIdx and a block dimensions whose symbol is blockDim. Each of them can be one, two or three dimensional. The local thread index uniquely identifies it within its thread block, and all hardware threads within a thread block share the same block index. In this case of a one dimensional grid the y and z dimensions are trivial, thus a hardware thread computes its global thread index in the x dimension as follows:

idx=blockIdx.x*blockDim.x+threadIdx.x;

For a two or three dimensional grid, the additional dimensions can be accessed in a hardware thread by symbols "blockIdx.y", "blockIdx.z", "blockDim.y", "blockDim.z", "threadIdx.y", and "threadIdx.z", and the global thread indices in the y and z dimensions can be computed similarly. For an OpenCL device, a hardware thread retrieves the x dimension of its global thread index using the following function call:

idx=get_global_id(0);

For a two dimensional or three dimensional grid, the additional dimensions of the global thread index can be retrieved by calling "g.et_globalid(1)" and "get_global_id (2)". In addition it can retrieve its local thread indices using "getlocal_id(0)", "getlocalid(1)", "getlocal_id(2)", and retrieve its block dimensions using "getiocal_size(0)", "getiocal_size(1)", and "getlocal_size(2)".

Detailed Description—Pair Generation Unit

MU 100 uses PGU 105 to generate a plurality of (n+1) combinations in the first point set and one or more pairs of neighbor (n+1) combinations referencing the plurality of (n+1) combinations. Various approaches including for example Delaunay Triangulations and random selections. Also note that for the purpose of this invention, the triangulations do not need to be Delaunay. For example an approximate Delaunay triangulation can also be used. Referring to my previous U.S. Pat. No. 8,811,772 granted Aug. 19, 2014, and U.S. Pat. No. 8,571,351 granted Oct. 19, 2013, there are various algorithms and software packages that compute Delaunay triangulations. Examples of such algorithms include the radial sweep algorithm, the incremental insertion algorithm, and the divide-and-conquer algorithm. Examples of such packages include Matlab by Mathworks, "Triangle" by Prof. Jonathan Richard Shewchuk at UC Berkley, and the Computational Geometry Algorithms Library (CGAL). In 2D one embodiment uses the Delaunay triangulation to triangulate a point set and iterates through the internal edges of the triangulation to obtain for each internal edge a pair of neighbor triangles that share the edge. In 3D another embodiment creates a 3D Delaunay triangulation of a point set and iterates through the internal triangles of the 3D triangulation to obtain for each internal triangle a pair of neighbor tetrahedra that share it.

The Delaunay triangulation can be carried out in parallel using multiple CPU cores, using a data-parallel coprocessor, or using a combination of both. For example, referring to "Parallel geometric algorithms for multi-core computers" by Batista et al, it uses a Parallel Incremental Insertion strategy that incrementally inserts new vertices and then uses the Bowyer-Watson method for point insertion that replaces the simplexes in cavities with new ones so that a triangulation remain Delaunay. To do this in parallel, the CPU threads lock impacted triangles/tetrahedra while doing insertions to avoid race conditions. Referring to "Computing two-dimensional Delaunay triangulation using graphics hardware" by Rong et al., it uses a hybrid GPU-CPU method to compute Delaunay Triangulations in 2D. Input sites are first mapped to discrete grid points. A GPU is then used to compute a discrete Voronoi diagram using the mapped sites. It then dualizes the discrete Voronoi diagram using an Euclidean coloring of the grid pixels, detects Voronoi vertices, and uses the Voronoi vertices to compute an approximate triangulation. Finally it uses the CPU to transform the approximate triangulation to a Delaunay triangulation. This method can not be easily extended to 3D due to the large number of combinations of possible colorings.

As another example, referring to "Delaunay Triangulation in $R^3$ on the GPU" by Ashwin Nanjappa, it introduces a method called gFlip3D that divides input points into batches. The batches are inserted, and then flips are done in parallel on the GPU until no further flips are possible. The result is an approximate Delaunay Triangulation due to the possibility of getting stuck in flipping a NLONT (non-locally-optimal non-transformable) cycles of faces. As yet another example, referring to the same document, it introduces a GPU based method called gStar4D that associates input 3D points with voxels of a discrete grid, builds a discrete Voronoi diagram using the Parallel Banding Algorithm, constructs a working set for each of the input points using the adjacency information in the discrete Voronoi diagram, lifts the input points in a four dimensional space, and then uses the Star Splaying Algorithm in $R^4$ to produce the underside of the convex hull of the lifted input points. The last step involves computing for each lifted input point its 'star' using the points in its working set, and then performing consistency enforcement steps until all the stars are consistent with each other. As yet another example, the same document introduces a hybrid gDel3D algorithm that combines gFlip3D and gStar4D. It first runs gFlip3D on a GPU coupled with a CPU to generate an approximate triangulation, and then runs the Star Splaying Algorithm selectively to repair only the points that are inconsistent on the CPU.

Alternatively, in another embodiment in 2D, to generate a pair of neighbor (n+1) combinations, first two distinct points are randomly selected as the end points of a common edge, next a third and a fourth distinct points are selected from the remainders of the first point set, such that neither are located on the line passing through the first two points, and the third and fourth points are to different sides of the line. The same idea can be applied in 3D. For example, first three points in general positions are randomly selected as the end points of a common triangle, next a fourth and a fifth distinct points are selected from the remaining points such that neither are in the plane containing the first three points, and the fourth and fifth points are to different sides of the plane.

Alternatively according to some embodiments where a CCISS can contain segments of zero length, PGU 105 may generate (n+1) combinations and pairs of neighbor (n+1) combinations using only non-isolated points in the first point set by calling a triangulation module using only non-isolated points.

Detailed Description—Index Construction Unit—Two-Level Indexing Structure for (N+1) Combinations A two-level indexing structure for (n+1) combinations stores in it the necessary components of affine transformations or references to them for each (n+1) local index of each (n+1) combination. According to one embodiment, it comprises two levels where the first level includes a padded length and the second level includes an array of necessary components of affine transformations stored either as an AoS or as an SoA. The array at the second level concatenates one or more non-overlapping segments. It further includes additional paddings between the segments for aligned memory accesses, so that each segment starts from (or in some other embodiments end with) a byte address that is a multiple of a fixed size, for example 256, 128, 64, or 32 bytes, which we refer to as the alignment requirements, and all of the padded segments contain the same number of elements including padding elements, which we'll refer to as being uniformly padded. Different data structures may have different alignment requirements according to not only the hardware architecture but also the size of the units if it's stored as an AoS.

Each segment in an array at the second level stores a Mixed Radix Indexed Array of necessary components of affine transformations. According to the current embodiment, the number of segments is the number of (n+1) combinations in an input array of (n+1) combinations that ICU 108 receives. The length of each segment is equivalent to the number of distinct (n+1) local indices of the corresponding (n+1) combination, which is equivalent to the product of the segment's bases. The lengths are stored in an array of products (to be discussed below).

The indices of the padded segments (in terms of the number of padded segments stored before them) in the array at the second level are the same as the offsets of the corresponding (n+1) combinations in the array of (n+1) combinations (in terms of the number of (n+1) combinations before them) as for example shown in FIG. 4, i.e., offset i that is used to access the i-th (n+1) combination is also used to access the corresponding padded segment in the array at the second level. Thus given an (n+1) combination index, it can be used to calculate the start offset of the corresponding padded segment in the array at the second level as long as we know the length of each padded segment, which can be found in a padded length. If in addition an (n+1) local index of the (n+1) combination is given, it can be used to access the necessary components of a corresponding affine transformation in the segment by calculating the corresponding integer according to the bijective mapping through the Mixed Radix Number System of the segment, assuming that the ordering of the components of the (n+1) local index is consistent with the ordering of the bases.

In this document we differentiate the "start offset" of a padded segment and the "index" of the padded segment. The start offset of a padded segment refers to the number of units before the first unit of the padded segment in an array at the second level; the index of a padded segment refers to the number of padded segments before the padded segment.

The length of each padded segment is contained in a padded length in terms of the number of units that the padded segment contains. If the array at the second level is stored as an SoA, then each unit is an element, and each element contains either some necessary components of an affine transformation or the same number of padding components. In the later case we refer to it as a padding element.

All elements in a padded segment contain the same number of components, and the padded segment comprises a scalar array for each of the components.

If an array at the second level is stored as an SoA, some embodiments find the maximum length of the lengths of all of its segments, where for each segment its length is the number of elements in it. The padded length when translated to bytes is the smallest number of bytes satisfying the alignment requirements that is also greater than or equal to the maximum segment length translated to bytes. A padded length can be stored in a constant memory if one is provided. If it is stored in the device memory then it can be copied into and later retrieved from a shared memory if one is provided. Later I'll discuss the situation where an array at the second level is stored as an AoS.

To locate the corresponding padded segment in an array at the second level of uniformly padded segments given an (n+1) combination index, it involves multiplying the (n+1) combination index by the padded length to obtain the start offset of the start unit of the padded segment.

Referring to FIG. 15a, it shows an exemplary two-level indexing structure for (n+1) combinations comprising a padded length 752, an array at the second level 753 where the segments are uniformly padded and the padded segments are stored one after the other, an array of products 802, and an optional array of bases 763. Array at the second level 753 is either stored as an AoS or as an SoA. Array at the second level 753 contains a first segment 754, a first padding 755, a second segment 756, a second padding 757, a collection of segments and paddings 758, a last segment 760 and a last padding 761. Thus the total number of units/elements in first segment 754 together with first padding 755 is equivalent to padded length 752, and same thing can be said for the combined length of each segment and its padding, except that in some embodiments, the last segment's padding may be omitted.

Figure 11:
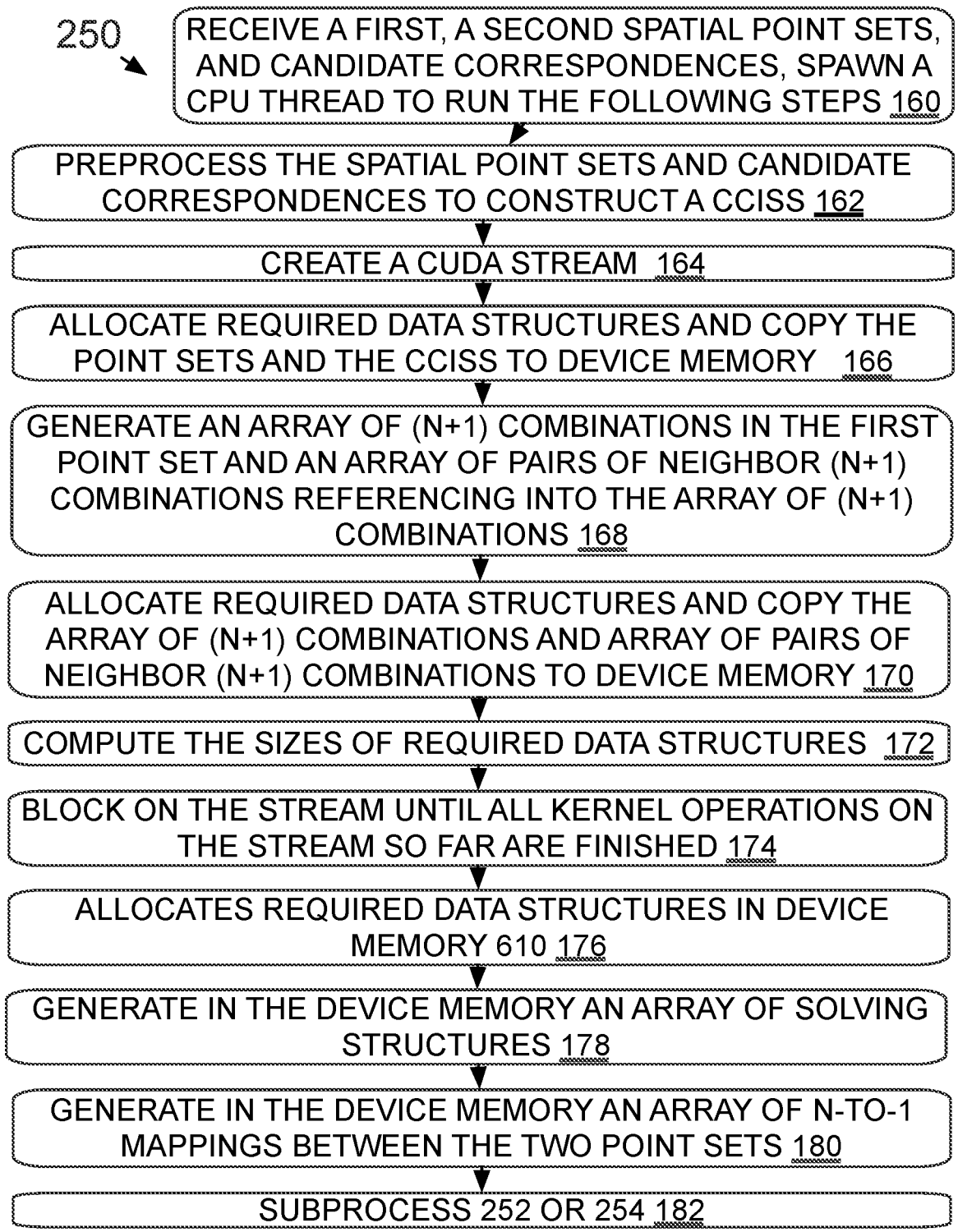
FIG. 11 shows a subprocess 250 that is the first part of two exemplary processes for generating and evaluating N-to-1 mappings between two spatial point sets in nD according to some embodiments.

Referring to FIG. 11, block 460 is a more detail illustration of first segment 754 where an array at the second level is stored as an SoA according to one embodiment. It has a first scalar array 462, a second scalar array 464, a collection of scalar arrays 466, and a last scalar array 468, where the scalar arrays have the same length and the length is equal to the number of elements in the segment. The number of scalar arrays is equal to the number of each element's components. For example in 3D according to one embodiment it only requires the left sub-matrices of affine transformations for computing local distance measures, thus 9 scalar arrays are used to record the components of the left sub-matrices. As another example in 3D, affine transformations are used to transform spatial agents, thus 12 scalar arrays are used to store the non-trivial components of the affine transformations.

First segment 754 has a first element 442 whose components are the first elements of the scalar arrays ordered according to the ordering of the scalar arrays. It contains some necessary components of an affine transformation generated for the 0-th (n+1) local index of the 0-th (n+1) combination, meaning the (n+1) local index whose corresponding integer in the range of integers is 0 according to the segment's bijective mapping. First segment 754 has a second element 446 whose components are the second elements of the scalar arrays ordered according to the ordering of the scalar arrays. It contains the necessary components of an affine transformation generated for the 1-st (n+1) local index of the 0-th (n+1) combination, a last element 448 that contains the necessary components of an affine transformation generated for the last (n+1) local index of the 0-th (n+1) combination, and a collections of elements 447 that contain the necessary components of the affine transformations of the remaining (n+1) local indices of the 0-th (n+1) combination, where the elements are ordered according to their corresponding integers and the within each element the components are ordered according to the ordering of their embedded respective scalar arrays.

Similarly imagine a detailed illustration of second segment 756 (not shown), it has the same number of scalar arrays of equal length, and its first element will contain the necessary components of the affine transformation generated for the 0-th (n+1) local index of the 1-st (n+1) combination and so on. Similarly imagine a detailed illustration of first padding 755 (not shown), it contains the same number of scalar arrays where the scalar arrays have the same length and the length is equal to the number of the padding elements of the first segment. According to the current embodiment, all the segments and paddings have the same number of scalar arrays. The scalar arrays of first padding 755 are concatenated after the corresponding scalar arrays of first segment 754, then the scalar arrays of second segment 756 are concatenated after the corresponding scalar arrays of first padding 755 and so on as illustrated in FIG. 15a. Thus the first scalar arrays of the segments and the paddings interleaves each other (they could include zero-length paddings when the maximum segment length satisfies the alignment requirements, and in another embodiment they could include a zero-length segment when a CCISS is allowed to include a zero-length segment or a padded segment consists solely of padding elements) forms a first global scalar array of the array at the second level. Similar things can be said about the other global scalar arrays.

Still assuming SoA, according to one embodiment, the global scalar arrays are stored consecutively one after the other, and the global scalar arrays other than the first one can be accessed using an optional global array length 751 shown in FIG. 15a that stores the total number of elements in all the padded segments including paddings elements. In another embodiment where the last segment is also uniformly padded, the global array length is omitted and the total number of elements is calculated as the product of the number of (n+1) combinations and the padded length. Alternatively the global scalar arrays can be accessed by keeping a references to each of them.

Similarly imagine a detailed illustration of second segment 756 (not shown), it has the same number of scalar arrays of equal length, and its first element will contain components of the affine transformation generated for the 0-th (n+1) local index of the 1-st (n+1) combination and so on.

Alternatively according to another embodiment, padded segments are stored paddings first. For example an array at the second level stored as an SoA comprises a first padding 755 followed by first segment 754 followed by second padding 757 followed by second segment 756 and so on. To access an element in a padded segment, first the start offset of the segment relative to the start offset of the padded segment is computed by subtracting the length of the segment from the padded length, and then a second offset is used relative to the start offset of the segment in the padded segment to access the corresponding element. In yet another embodiment where padded segments are also stored in an SoA, the padded segments are stored paddings first, and within segments the elements are accessed reversely. Thus to access an element in a padded segment, given a second offset, the offset of the corresponding element relative to the start offset of the padded segment is computed by subtracting the second offset from the padded length.

Alternatively according to another embodiment, it uses a two-level indexing structure for (n+1) combinations where the padded length is replaced by an array at the first level. Padded segments in the array at the second level still satisfy the alignment requirements but are not uniformly padded. The offsets of the elements (not the values of the elements) in the array at the first level are the same as the offsets of the (n+1) combinations in an array of (n+1) combinations for example as shown in FIG. 4, i.e., the i-th offset used to access the i-th (n+1) combination is also used to access the i-th element in the array at the first level, where the i-th element contains the start offset of the i-th (n+1) combination's corresponding padded segment in an array at the second level. Thus given an (n+1) combination index, it can be used to retrieve from the array at the first level the start offset of the corresponding padded segment in the array at the second level. Since the first element of an array at the first level contains 0, it can be omitted or used for other purposes. Alternatively, according to yet another embodiment, each element of the array at the first level contains the starting address of a separate segment, where the segments are allocated separately in the device memory instead of being stored one after the other in a single array at the second level with or without paddings.

The two-level indexing structure for (n+1) combinations shown in FIG. 15a comprises an optional array of bases 763 stored either as an AoS or as an SoA. For example in one embodiment, array of bases 763 is stored as an SoA. The SoA contains n arrays of scalars, where n is the space dimension, and the least significant bases, i.e. the bases of the least significant digits, are stored continuously in the first scalar array, the bases of the second least significant digits are stored continuously in the second scalar array and so on. In an alternative embodiment it may comprise an additional scalar array to store the bases of the most significant digits. It is an alternative or an addition to the array of bases 361 shown in FIG. 3.

Array of bases 763 contains a first element 762 that contains the bases of (the n least significant digits of the Mixed Radix Number System of the Mixed Radix Index Array stored in) first segment 754, a second element 764 that contains those of second segment 756, a collection of bases 765 for the segments in collection of segments and paddings 758, and a last element 766 that contains the bases of last segment 760, where each element contains the n bases for the n least significant digits of a segment. Array of bases 763 can be constructed using array of bases 361 shown in FIG. 3, array of bases 832 shown in FIG. 16, or using the lengths of segments in array 340 in the CCISS shown in FIG. 3. To do this one first retrieves the n+1 member point ids of the corresponding (n+1) combination, and then uses the point ids to access array of bases 361, array of bases 832, or array 320.

The two-level indexing structure for (n+1) combinations comprises an array of products 802. It has a first element 804 that contains the length of first segment 754 that is equal to the product of the n+1 bases of first segment 754, a second element 806 that contains the length of second segment 756 that is equal to the product of the n+1 bases of second segment 756, a collection of elements 808 that contain the lengths of the segments stored in collection of segments and paddings 758, and a last element 810 that contains the length of last segment 760 that is equal to the product of the n+1 bases of last segment 760. Array of products 802 is used for boundary checking to tell apart elements/units in segments and elements/units in paddings as we'll see later.

The offsets of the elements in array of products 802 are the same as the offsets of their corresponding (n+1) combinations in an input array of (n+1) combinations for example as shown in FIG. 4. This also applies to array of bases 763.

Referring to FIG. 15b, it shows a series of steps for constructing a two-level indexing structure for (n+1) combinations as shown in FIG. 15a according to one embodiment.

At step 770, it receives an input array of (n+1) combinations, allocates and fills array of products 802 and optionally array of bases 763. After allocating array of products 802, it launches a one dimensional grid on the coprocessor, where the size of the grid is at least as much as the number of (n+1) combinations. For example an embodiment uses the CUDA programming model and launches a grid that has a non-trivial x component in its block dimensions and a non-trivial x component in its grid dimensions. The total number of hardware threads is the product of the x component of the block dimensions and the x component of the grid dimensions, assuming that each hardware thread handles one (n+1) combination. Unless the number of the (n+1) combinations is an integral multiple of the x component of the block dimensions, there will be extra hardware threads that are not mapped to (n+1) combinations.

A hardware thread of the grid generates a global thread index, does a necessary boundary checking, maps the global thread index into an (n+1) combination index for example by regarding the global thread index as an (n+1) combination index if it passes the boundary checking, retrieves the corresponding (n+1) combination using the (n+1) combination index from the input array of (n+1) combinations, retrieves the (n+1) combination's n+1 bases from a CCISS for example as shown in FIG. 3 or a CCISS as shown in FIG. 16, multiplies together the n+1 bases to obtain a product, and stores the product in array of products 802 at the offset of the (n+1) combination index. If array of bases 763 is also allocated, it also stores the n bases of the n least significant digits into array of bases 763 at the offset of the (n+1) combination index. According to the current embodiment, the ordering of the bases follows the ordering of the corresponding members of the (n+1) combination. Alternatively it could follow the ordering of the members in the ascending or descending order if used consistently. Alternatively the products and the bases can be computed and retrieved in the host memory by one or more CPU threads and then copied to the device memory.

At step 772, it computes and stores padded length 752. It also optionally computes and stores global array length 751. Assuming that an SoA is used for the array at the second level, in one embodiment this involves carrying out a parallel reduction on array of products 802 to find the maximum segment length, converting the maximum segment length to the corresponding number of bytes that is the product of the maximum segment length and the number of bytes in each necessary component, rounding the number of bytes up to the smallest integer satisfying the alignment requirements that is greater than or equal to it, and dividing the smallest integer by the number of bytes in each necessary component to convert it back to a number of elements. Alternatively this can also be carried out by one or more CPU threads, and the result is copied to padded length 752 in device memory. In the current embodiment, global array length 751 stores the product of the number of segments and the padded length. In another embodiment, it evaluates "(number of segments−1)*padded length+length of the last segment" and store the result into global array length 751.

Alternatively according to another embodiment, if an AoS at the second level is used, it computes for each segment the number of units it uses. The memory layouts are similar to the memory layouts of AoS of solving structures (to be discussed later). Take one example where an AoS at the second level contains multiple units, and each unit contains three elements followed by one padding. It also requires that the first element of a segment is always stored at the first element of a unit. If a first segment contains four elements it occupies two units. If the segment is followed by a padding unit the padding unit starts from the third unit. The conversion between the number of elements and the number of units can be done using simple algebra, and padded length 752 stores the number of units in each padded segment including padding units, i.e., units that contain only paddings.

At step 774, it allocates an array at the second level 753 in the device memory using the results computed above, where the start address of the array at the second level satisfies the alignment requirements.

At step 776, it fills in the array at the second level in the device memory with values. To do this, according to one embodiment, ICU 108 launches a one or two dimensional grid on the coprocessor, where the number of hardware threads is at least as much as the global array length discussed earlier.

Referring to FIG. 15c, it illustrates the sub-steps carried out by the grid's hardware threads according to some embodiments. At step 1052 a hardware thread receives a global thread index.

At step 1054, it obtains from the global thread index an (n+1) combination index that is used to locate a padded segment, and a second offset that relative to the start offset of the padded segment and is used to index into the padded segment. If it is a one dimensional grid and the array at the second level is stored as an SoA, the global thread index is divided by the padded length, the integral quotient is regarded as the (n+1) combination index and the remainder is regarded as the second offset. On the other hand if it's using an AoS and each unit stores more than one element, then the x component of the global thread index is instead divided by the product of the padded length which stores the number of units in each padded segment including padding units and the number of elements each unit stores. Similarly the integral quotient is regarded as the (n+1) combination index and the remainder is regarded as the second offset.

If the array at the second level is stored as an SoA, and the grid is two dimensional such that its y dimension is at least as much as the number of padded segments, and its x dimension is at least as much as the padded length, then the x component of the global thread index is regarded as the second offset, and they component is regarded as the (n+1) combination/padded segment index. On the other hand, if the array at the second level is stored as an AoS, and it is a two dimensional grid such that its y dimension is at least as much as the number of padded segments, and its x dimension is at least as much as the padded length, then the x component of the global thread index is regarded as the second offset, and they component is regarded as the (n+1) combination/padded segment index. In this case, each hardware thread that passes the below boundary checking is supposed to process a unit of elements.

In either cases, the number of (n+1) combinations can be used to boundary check the validity of the (n+1) combination index, and array of products 802 can be used to boundary check if the second offset refers to a padding unit, meaning a unit that contains only padding elements in the case of the array at the second level being an AoS, or a unit that is a padding element in the case of an SoA.

At step 1056, it uses the (n+1) combination index to retrieve the corresponding (n+1) combination from an array of (n+1) combinations.

At step 1058, it retrieves the corresponding bases from array of bases 763 at the offset of the (n+1) combination index. Alternatively if array of bases 763 is not available, it retrieves the corresponding bases from array of bases 361 in FIG. 3 or array of bases 832 in FIG. 16 using the (n+1) combination retrieved at step 1056. Alternatively the bases can be read from the lengths of the corresponding segments shown in array 340 in FIG. 3 if it is provided and used.

At step 1060, it computes an (n+1) local index containing n+1 indices of n+1 candidate correspondences in their separate sets of candidate correspondences. If the array at the second level is stored as an SoA, it iteratively divides the second offset by the bases of the n least significant digits and records the remainders and the last quotient. On the other hand if the array at the second level is stored as an AoS, according to one embodiment at step 1054 it converts the second offset into a number of element indices, where the number is equal to the number of elements stored in each unit. For example if a segment contains 8 elements and each unit contains 3 elements, then the hardware thread for the 0-th unit handles the elements whose indices are 0, 1, 2; the hardware thread for the 1-st unit handles the elements whose indices are 3, 4, 5; and the hardware thread for the 2-nd unit handles the elements whose indices are 6, 7. It then does a boundary checking for the element indices using for example an array of products, runs steps 1056 and 1058, and repeats steps 1060 to 1070 for each of the element indices in the place of the second offset.

At step 1062, according to one embodiment, it use the members of the (n+1) combination as offsets to retrieve from array 320 n+1 start offsets of n+1 corresponding segments in array 340 of a CCISS as shown in FIG. 3.

On the other hand if it's using a CCISS as shown in FIG. 16 that is also uniformly padded and includes a padded length, it multiplies the member point ids of the (n+1) combination and the padded length of the CCISS to obtain n+1 starting offsets of n+1 padded segments in the CCISS.

Referring to FIG. 16, it shows a uniformly padded CCISS according to one embodiment. The CCISS includes a padded length 850, an array 820, and an array of bases 832.

Array 820 concatenates one or more non-overlapping segments and their paddings. In this example it includes a first segment 824, a first padding 825, a second segment 826, a second padding 827, a collection of segments and paddings 828, a last segment 830, and a last padding 831. The number of segments in array 820 is equal to the number of points in the first point set. First segment 824 in array 820 contains the point ids in the second point set of all the candidate correspondences whose end points in the first point set have point id 0, second segment 826 contains the point ids in the second point set of all the candidate correspondences whose end points in the first point set have point id 1 and so on. Each segment correspond to one of the separate sets of candidate correspondences. Padded length 850 is computed similarly as that of a two-level indexing structure for (n+1) combinations discussed earlier. For example it can be an integer that's at least as much as the maximum segment length and also satisfies the alignment requirements. Array of bases 832 is similar to array of bases 361. It contains the number of candidate correspondences defined by each of the segments or equivalently the length of the segments in array 820 where the numbers are stored consecutively in the same order that the segments appear in array 820. It has a first element 834 containing the number of candidate correspondences defined by the elements of first segment 824 and the index of its padded segment in array 820, a second element 836 containing the number of candidate correspondences in second segment 826 defined by the elements of second segment 826 and the index of its padded segment in array 820, a collection of elements 838 containing the numbers of candidate correspondences in the segments contained in collection of segments and paddings 828, and a last element 840 containing the number of candidate correspondences defined by the elements of last segment 830 and the index of its padded segment in array 820. For a uniformly padded CCISS, the offsets of padding elements in array 820 don't correspond to valid candidate correspondences, and array of bases 832 is used for boundary checking.

Similar to the alternatives of the CCISS shown in FIG. 3, alternatively according to other embodiments, segments in array 820 may contain offsets into another SoA or AoS of candidate correspondences, or elements in array 820 may contain tuples representing candidate correspondences.

At step 1064, it uses the (n+1) local index's n+1 members as relative offsets from the start offsets of the corresponding segments in array 820 or in array 340, where the start offsets of the corresponding segments are retrieved at step 1062, to retrieve the point ids of n+1 end points in the second point set. It's possible that the n+1 end points are not distinct, nevertheless together they make an (n+1) correspondent of the (n+1) combination.

At step 1066, it retrieves the coordinates of the members of the (n+1) correspondent from the second point set.

At step 1068, it retrieves the corresponding solving structure from an array of solving structures at the offset of the (n+1) combination index.

At step 1070, it applies the solving structure to the coordinates retrieved at step 1066 to compute some necessary components of an affine transformation using ACU 112, where exactly what components are necessary depends on the embodiment.

At step 1072, it stores the components into the array at the second level allocated at step 774. It uses the (n+1) combination index to compute the offset of the corresponding padded segment. It then locates the unit in the segment of the padded segment that contains the element (including the situation where the unit is the element if the array at the second level is stored as an AoS) at the offset of the second offset relative to the start of the segment, and stores the necessary components of the affine transformation into the unit. If the array at the second level is stored as an AoS, then according to one embodiment at step 1070 it stores the necessary components of a number of affine transformations into a unit in its local memory, where the number is equal to the number of elements in each unit. Then at this step it copies the unit in the local memory into a unit in the segment in the device memory. Shared memories can be used such that the unit is first copied into a shared memory. Then the hardware threads within a thread block copies the unit from the shared memory into the device memory in an aligned and coalesced fashion.

Alternatively according to another embodiment, still assuming the array at the second level is stored as an AoS, and there are more than one elements in each unit. If each hardware thread handles one element, then multiple hardware threads will access a same unit. Concurrent writes to the unit need to be put into a critical section, which can be achieved using atomic functions. Shared memories can be used so that concurrent writes happen in the shared memories instead of in the global memory.

At various steps the orderings of the components of two relevant tuples are required to be consistent with each other. According to some embodiments, it requires the orderings to follow the ordering of the corresponding members of a relevant (n+1) combination. The members of the (n+1) local index computed at step 1060 are ordered according to the ordering among the digits of the Mixed Radix Number System of the segment corresponding to the (n+1) combination index, which in turn are ordered according to the ordering among the corresponding members of the corresponding (n+1) combination, and the n+1 start offsets calculated at step 1062 are ordered following the ordering among the corresponding members of the corresponding (n+1) combination. At step 1064, they are thus combined correctly so that the start offsets and the members of the (n+1) local index that correspond to the same members of the (n+1) combination are paired together.

The ordering is passed down to the ordering of the members of the (n+1) correspondent. At step 1066, the coordinates are ordered following the ordering of the members of the (n+1) correspondent retrieved at step 1064. The solving structure retrieved at step 1068 is computed with the coordinates arranged following the ordering of the members of the (n+1) combination. Thus at step 1070, the solving structure is applied correctly to the coordinates of the members of the (n+1) correspondent, so that the numerics reflects that each point is transformed to its correspondent. Alternatively other schemes may be used if used consistently, for example another embodiment may require each relevant tuple's members be ordered according to the ascending or descending ordering of the members of the (n+1) combination.

Alternatively according to another embodiment, if an array at the first level is used, then at step 772 it in addition allocates and fills the array at the first level. To do this it allocates the array at the first level in the device memory, copies the array of products to the array at the first level, round each element in the array at the first level to satisfy the alignment requirements, run an exclusive parallel scan algorithm to generate an array of accumulative products in the array at the first level, where the first element contains 0, the second element contains the rounded product of the 0-th (n+1) combination, the third element contains the sum of the rounded products of the 0-th and the 1-st (n+1) combinations, the fourth element contains the sum of the rounded products of the 0-th, the 1-st, and the 2-nd (n+1) combinations and so on.

Then in order for a hardware thread to obtain the (n+1) combination index at step 1054, at step 772 it also generates a scalar array of integers whose number of elements is at least as much as the number of elements in the array at the second level optionally excluding the paddings after the last segment, so that each element before the paddings of the last segment in the array at the second level has a corresponding (meaning at the same offset relative to their corresponding arrays) element in the array of integers. The elements in the array of integers are initialized to 0s. Then the elements corresponding to the first elements of each padded segment except for that corresponding to the first element of the first padded segment are set to 1. Then it runs a parallel scan algorithm in the array of integers, so that afterwards, the elements in the array of integers correspond to the elements of the first padded segment in the array at the second level are filled with 0s, the elements in the array of integers correspond to the elements of the second padded segment in the array at the second level are filled with 1s and so on. In general if two elements of the array at the second level belong to the same padded segment, the two corresponding elements in the array of integers contain the same value. Alternatively the (n+1) combination index can be obtained by binary searching or sequentially searching through the array at the first level for the first element that contains an offset that's smaller than or equal to the global thread index.

Referring to "Parallel Prefix Sum (Scan) with CUDA" by Harris et al., it introduces an efficient parallel prefix sum (scan) algorithm. Given an input array and a binary associative operator defined for elements of the input array, the algorithm is composed of an Up-Sweep phase(a.k.a reduction phase) that computes partial sums at certain elements of the array using information within data blocks. It then performs a Down-Sweep phase where the partial sums are distributed to other positions within data blocks. It is followed by a third phase where the locally computed sums are updated with results from their preceding data blocks. A parallel scan algorithm can be either inclusive or exclusive as one can easily be derived from the other. Alternatively as one skilled in the art knows there are other variations of the parallel scan algorithm.

Referring to FIG. 15*d*, it illustrates the steps carried out by a hardware thread to query a two-level indexing structures for (n+1) combinations as shown in FIG. 15*a* to retrieve some necessary components of an affine transformation given an (n+1) combination index and an (n+1) local index according to one embodiment.

At step 1080 it receives an (n+1) combination index and an (n+1) local index.

At step 1082, it multiplies the (n+1) combination index by the padded length to compute the start offset of the corresponding padded segment in the array at the second level.

At step 1084 according to one embodiment it retrieves the corresponding bases from array of bases 763 at the offset of the (n+1) combination index. If it alternatively retrieves the corresponding bases from the array of bases 361 shown in FIG. 3 or array of bases 832 shown in FIG. 16, then it also needs to retrieve the (n+1) combination for example using step 1056 in FIG. 15*c* before this step.

At step 1086, it computes a second offset using the bases and the n+1 members of the (n+1) local index according to equation (1) with M being set to n+1, and the resultant second offset is at the left hand side of the equation. The second offset is relative to the start offset of the segment of the corresponding padded segment whose start offset was retrieved at step 1082.

At step 1088, it retrieves the element at the second offset computed at step 1086 relative to the start offset of the segment. As an example of changing steps' orders, step 1082 can be carried out in any order relative to other steps in this figure as long as it's carried out before step 1088. Alternatively, if the array at the second level is stored as an AoS, as discussed earlier, this requires translating the second offset into a corresponding unit offset by dividing the second offset by the number of elements per unit, and then if there are multiple elements in a unit, it would require accessing the corresponding element within the unit according to the remainder.

The previous discussion about the ordering of the components of two relevant tuples also applies to the steps in FIG. 15*d*. According to the current embodiment, the bases retrieved at step 1084 are ordered following the ordering of the corresponding members of the corresponding (n+1) combination, and it requires the members of the (n+1) local index received at step 1080 are also ordered after the ordering of the corresponding members of the corresponding (n+1) combination, at step 1086 they are combined correctly to compute the second offset.

Alternatively other data structures may be used in places of an array at the second level. For example in another embodiment, the array at the second level is replaced by hash tables, where each segment is replaced by a second level hash table whose keys are either integers from the segment's Mixed Radix Number System's ranges of integers or are strings that serialize the segment's corresponding (n+1) combination's (n+1) local indices, and the values are some necessary components of the (n+1) local indices' corresponding affine transformations. There's also a first level hash table whose keys are the (n+1) combination indices and the values are references to the second level hash tables. As another example, the array at the second level is replaced by a hash table, whose keys are pairs each containing an (n+1) combination index and an (n+1) local index.

Assuming that shared memories are provided and given an array of solving structures stored as an AoS. When generating the two-level indexing structure for (n+1) combinations stored as an SoA according to the steps illustrated in FIG. 15*c*, according to one embodiment a grid is launched such that the thread blocks are mapped to the padded segments where each thread block fills for one padded segment. When the grid is launched, for each thread block a blank copy of a unit in the AoS of solving structures is allocated in its shared memory. Within each thread block the hardware threads cooperatively load the padded segment's corresponding unit from the AoS of solving structures in an aligned and coalesced fashion. Then at step 1068 in FIG. 15*c*, the hardware threads retrieve solving structure from the copy in the shared memory concurrently.

This can be extended to where each thread block handles two or more padded segments and each padded segment is handled by one thread block. For each thread block the hardware threads cooperatively load the padded segments' corresponding units from the AoS of solving structures in an aligned and coalesced fashion. Then at step 1068 in FIG. 15*c*, different subsets of hardware threads retrieves different solving structures from the shared memory.

As another example of using shared memories, various steps require reading from a CCISS, including step 1064 in FIG. 15*c*. The hardware threads in a thread block can cooperatively load a CCISS into its shared memory in a coalesced and aligned fashion, and then each of them read from the copy in the shared memory when carrying out step 1064. For example array 340 in FIG. 3 can be loaded into the shared memory of a thread block as follows:

```
for(int i = threadIdx.x; i < nCC; i+= blockDim.x)
{
    ccInShared[i] = ccInGlobal[i];
}
```
, where "nCC" is the number of candidate correspondences, "ccInGlobal" refers to array 340 stored in the device memory, and "ccInShared" refers to a blank copy allocated in the shared memory. Embodiments may consider as candidates for shared memories various data structures including for example an array of coordinates, one or more solving structures, one or more (n+1) combinations, one or more (padded) segments of a two-level indexing structure for (n+1) combinations, one or more (padded) segments of a two-level indexing structure for pairs of neighbor (n+1) combinations, an array of bases, and one or more MBD elements etc.

Alternatively, according to some embodiments a two-level indexing structures for (n+1) combinations may contain two or more arrays at the second level, each of which has its own padded length. The two-level indexing structure also includes in addition a first indexing data structure such that given an (n+1) combination index, it returns a reference to the corresponding array at the second level that contains the padded segment for the (n+1) combination and the index or the start offset of the padded segment in the corresponding array at the second level, we'll refer to the index or the start offset as a segment index. According to one embodiment, the first indexing data structure can be implemented using an array of pairs where the offsets of its pairs are the same as the offsets of the (n+1) combinations in an input array of (n+1) combinations. The pair's offsets are the same as the offsets in an array of (n+1) combinations, and each pair stores an offset's corresponding (n+1) combination's corresponding array at the second level's reference and an index/start offset of the (n+1) combination's padded segment relative to the start of the array at the second level. Alternatively it can be implemented using a hash table. Alternatively it may contain an array of references to padded segments in the two or more arrays at the second level where the offsets are the same as the offsets in an array of (n+1) combinations.

Each of the two or more arrays at the second level can be constructed separately with its padded length computed as before except that at step 1054 in FIG. 15*c*, the obtained (n+1) combination index is indeed a segment index specific to the array at the second level, and it needs to be translated into an (n+1) combination index. Thus it requires another indexing data structure: given a reference to an array at the second level and one of its padded segment's segment index, this data structure returns the corresponding (n+1) combination index.

This second indexing data structure can be implemented by for example a first level scalar array referencing multiple second level scalar arrays, one for each of the arrays at the second level. Thus the number of second level scalar arrays is equal to the number of arrays at the second level. The arrays at the second level are given integral handles that start from 0. Thus the first array at the second level is assigned handle 0, the second array at the second level is assigned handle 1, and so on. The first level scalar array stores the second level scalar arrays' references at the offsets of their handles. A second level scalar array stores the (n+1) combination indices that the array at the second level handles at the offsets of the corresponding segment indices.

The two additional indexing data structures can be constructed for example after generating an array of products and an array of bases at step 770 in FIG. 15*b*, and before the steps shown in FIG. 15*c*. After step 770, it first clusters the (n+1) combination indices into k clusters according to their segment lengths using a clustering technique where k is a predetermined number of clusters. Such clustering techniques include for example k-means, k-means++, and Yinyang K-means. In the classic k-means, which is also referred to as the Lloyd's algorithm, at the beginning a set of clusters are initialized, and then it iteratively carries out a labeling stage that assigns each point to one of the clusters and a centroid updating stage that updates the clusters' centroids according to the labeling results. Referring to "Accelerating K-Means on the Graphics Processor via CUDA" by Zechner et al, the labeling stage is performed on a GPU where data points are partitioned into chunks and each thread block performs labeling for one or more chunks.

Referring to "Yinyang K-means: a drop-in replacement of the classic K-means with consistent speedup" by Ding et al., at the beginning a set of clusters are initialized and they are divided into a certain number of groups. In addition it initializes a set of group lower bounds, one for each of the groups, and a global up bound. Then it iteratively carries out a labeling stage and an updating stage. The labeling stage involves a group filtering step and a local filtering step, where the steps use the bounds to filter out unnecessary distance calculations before assigning a point to one of the clusters. At the global filtering step, it identifies a subset of the groups that contain potential clusters for the point, and at the local filtering step, the clusters in the subset of groups are further filtered and the point is assigned to one of the remaining clusters. I don't see why these two improvements cannot be combined for the labeling stage, and it's probably the approach that the software package kmcuda takes since referring to "'Yinyang' K-means and K-nn using NVIDIA CUDA' by Vadim Markovtsev, in its documentation it mentions that it uses Yinyang K-means and it's implemented using CUDA, although I haven't examined the code. The kmcuda software package can be retrieved from https://github.com/src-d/kmcuda.

It then runs step 772 to compute a padded length for each of the clusters. At this point or between steps 774 and 776, it allocates a first indexing data structure and a second indexing data structure, and iterates through the (n+1) combination indices within each cluster to fill into both the first and the second indexing data structures.

According to one embodiment, when queried with an (n+1) combination index and an (n+1) local index, at step 1082 in FIG. 15*d*, it retrieves a reference to the corresponding array at the second level and a segment index of the corresponding padded segment in the array at the second level from the first indexing data structure using the (n+1) combination index. It then multiplies the segment index by the padded length of the corresponding array at the second level to retrieve the start offset of the corresponding padded segment relative to the start of the corresponding array at the second level. Alternatively according to another embodiment, at step 1082 in FIG. 15*d* it directly retrieves a reference to the corresponding padded segment.

Detailed Description—Index Construction Unit—Two-Level Indexing Structure for Pairs of Neighbor (N+1) Combinations The two-level indexing structure described above is referred to as a two-level indexing structure for (n+1) combinations. Similarly one can construct in the device memory a two-level indexing structure for pairs of neighbor (n+1) combinations. According to one embodiment, it comprises a padded length, an array at the second level, an array of products, a Mapping Between Digits (MBD), an optional array of points, and an array of bases. The array at the second level concatenates one or more non-overlapping padded segments, where each segment contains local distance measures for all of the distinct (n+2) local indices of a pair of neighbor (n+1) combinations. The indices of the padded segments in the array at the second level are the same as the offsets of their corresponding pairs of neighbor (n+1) combinations in an array of pairs of neighbor (n+1) combinations (a.k.a. the pair indices), and the number of padded segments is equal to the number of pairs of neighbor (n+1) combinations in the array of pairs of neighbor (n+1) combinations.

Each segment in the array at the second level is a Mixed Radix Indexed Array of local distance measures. The length of each segment is equal to the number of distinct (n+2) local indices of the corresponding pair of neighbor (n+1) combinations.

Thus given a pair index, it can be used to calculate the start offset of the corresponding padded segment in the array at the second level as long as we know the length of each padded segment, which is stored in the padded length. It involves multiplying the pair index by the padded length. If in addition an (n+2) local index is given, it can be used to access the corresponding local distance measure in the segment by mapping the (n+2) local index to the corresponding integer according to the bijective mapping through the Mixed Radix Number System of the segment, assuming that the components of the (n+2) local index are paired with the bases correctly.

Similarly Similar to the case of a two-level indexing structure for (n+1) combinations, the padded length is the rounded maximum segment length that satisfies the alignment requirements when converted to bytes. Similarly to locate the corresponding padded segment given a pair index, it involves multiplying the pair index by the padded length.

Similar to an alternative two-level indexing structure for (n+1) combinations, according to an alternative embodiment, a two-level indexing structure for pairs of neighbor (n+1) combinations uses an array at the first level instead of the padded length, and in the array at the second level the padded segments are not uniformly padded.

In the array of products, each product is now the product of the n+2 bases of the Mixed Radix Number System of a pair of neighbor (n+1) combinations, and in the array of bases each element contains the n+1 bases for the n+1 least significant digits of a segment. The MBD contains for each pair of neighbor $(n+1)$ combinations a mapping between the n+2 digits of its corresponding segment's Mixed Radix Number System and the two n+1 digits of the pair's two (n+1) combinations' segments' two Mixed Radix Number Systems in a two-level indexing structure for (n+1) combinations.

Referring to FIG. 18a, it shows a visual illustration of the memory layouts of an exemplary two-level indexing structure for pairs of neighbor (n+1) combinations. It comprises a padded length 928, an array at the second level 930 where the padded segments are stored one after the other as an SoA, an array of products 960, an array of bases 950, an MBD 900, and an optional array of points 1100. Array at the second level 930 contains a first segment 932, a first padding 934, a second segment 936, a second padding 938, a collection of segments and paddings 940, a last segment 942 and a last padding 944. Thus the total number of units/elements in first segment 932 together with first padding 934 is equivalent to padded length 928, and same thing can be said for the combined length of each segment and its padding, except that in some embodiments, the last segment's padding may be omitted.

The two-level indexing structure for pairs of neighbor (n+1) combinations comprises an array of bases 950 stored either as an AoS or as an SoA. For example in one embodiment, array of bases 950 is stored as an SoA. The SoA contains n+1 scalar arrays, where the least significant bases, i.e. the bases of the least significant digits, are stored continuously in the first scalar array, the second least significant bases are stored continuously in the second scalar array and so on. In an alternative embodiment it may comprise an additional scalar array that stores the bases of the most significant digits. First elements of the n+1 scalar arrays store the n+1 bases of (the n+1 least significant digits of the Mixed Radix Number System of the Mixed Radix Indexed Array of) the first pair of neighbor (n+1) combination, second elements of of the n+1 scalar arrays store the n+1 bases of the second pair of neighbor (n+1) combination and so on.

Still referring to FIG. 18a, array of bases 950 has a first element 952 that contains the bases for first segment 932, a second element 954 that contains the bases for second segment 936, a collection of bases 956 for the segments stored in collection of segments and paddings 940, and a last element 958 that contains the bases for last segment 942, where each element contains n+1 bases for the n+1 least significant digits of a corresponding segment. Array of bases 950 can be constructed using for example array of bases 361 shown in FIG. 3, array of bases 763 shown in FIG. 15a, or array of bases 832 shown in FIG. 16. One can access array of bases 763 using an (n+1) combination index while for the other two one needs to first retrieve the corresponding point ids.

Array of products 960 has a first element 962 that contains the length of first segment 932 that is equal to the product of the n+2 bases of first segment 932, a second element 964 that contains the length of second segment 936 that is equal to the product of the n+2 bases of second segment 936, a collection of elements 966 that contains the lengths of the segments stored in collection of segments and paddings 940, and a last element 968 that contains the length of last segment 942 that is equal to the product of the n+2 bases of last segment 942. Array of products 960 is used for boundary checking to tell apart elements/units in segments and elements/units in paddings as illustrated later.

The offsets of the elements in array of products 960 are the same as the offsets of their respective pairs of neighbor (n+1) combinations in an input array of pairs of neighbor (n+1) combinations as for example shown in FIG. 5. This also be said for array of bases 950.

FIG. 18a also shows a visual illustration of the memory layouts of an exemplary MBD 900. Referring to exemplary MBD 900, it contains a first element 902, a second element 904, a collection of one or more elements 906, and a last element 908. First element 902 stores the mapping between the n+2 digits of the Mixed Radix Number System of first segment 932 and the 2n+2 digits of the Mixed Radix Number Systems of two segments in a two-level indexing structure for (n+1) combinations, where the two segments are generated for the two (n+1) combination indices of the 0-th pair of neighbor (n+1) combinations. Second element 904 stores the mapping between the n+2 digits of the Mixed Radix Number System of second segment 936 and the 2n+2 digits of the Mixed Radix Number Systems of two segments in the two-level indexing structure for (n+1) combinations, where the two segments are generated for the two (n+1) combination indices of the 1-st pair of neighbor (n+1) combinations and so on. Until last element 908 stores the mapping between the n+2 digits of the Mixed Radix Number System of last segment 942 and the 2n+2 digits of the Mixed Radix Number Systems of two segments in the two-level indexing structure for (n+1) combinations, where the two segments are generated for the two (n+1) combination indices of the last pair of neighbor (n+1) combinations. We'll refer to each of elements 902, 904, 908 as an MBD element. According to the current embodiment, each MBD element contains 2n+2 components where the first n+1 components record a mapping for the first (n+1) combination index of a pair of neighbor (n+1) combinations, and the second n+1 components record a mapping for the second (n+1) combination index of the pair. Tuple 910 illustrates first element 902 of MBD 900 in more detail according to an embodiment in 3D where the MBD is stored as an AoS. Tuple 910 has a first component 912, a second component 914, a third component 916, a fourth component 918, a fifth component 920, a sixth component 922, a seventh component 924, and an eighth component 926. According to the current embodiment each MBD element stores 8 components, and each component stores 4 bytes, this makes it a total of 32 bytes and there's no paddings between the MBD elements. According to an alternative embodiment in 2D, each MBD element stores 6 components. That makes a total of 24 bytes, and 8 bytes are padded after each MBD element.

According to one embodiment, it receives an input array of pairs of neighbor (n+1) combinations as shown in FIG. 5, where first elements 402 and 404 refer to two (n+1) combinations including a first (n+1) combination and a second (n+1) combination. The components in tuple 910 are arranged such that first component (a.k.a. 0-th component) 912 records which digit of (the Mixed Radix Number System of the Mixed Radix Indexed Array stored in) first segment 932 is mapped to the first digit (a.k.a. 0-th digit) of the (Mixed Radix Number System of the segment generated for the) first (n+1) combination, the second component (a.k.a. 1-st component) 914 records which digit of first segment 932 is mapped to the second digit (a.k.a. 1-st digit) of the first (n+1) combination and so on until the fourth component. Then the fifth component (a.k.a. 4-th component) 920 records which digit of first segment 932 is mapped to the first digit (a.k.a. 0-th digit) of the second (n+1) combination, the sixth component (a.k.a. 5-th component) 922 records which digit of first segment 932 is mapped to the second digit (a.k.a. 1-st digit) of the second (n+1) combination and so on until the eighth component.

Optional array of points 1100 contains a first element 1102, a second element 1104, a collection of elements 1106, and a last element 1108. First element 1102 contains the n+2 distinct point ids of the first pair of neighbor (n+1) combinations, second element 1104 contains the n+2 distinct point ids of the second pair of neighbor (n+1) combinations and so on, until last element 1108 that contains the n+2 distinct point ids of the last pair of neighbor (n+1) combinations. According to one embodiment, for each element the n+2 point ids are ordered by their numerical values in the ascending order. Alternatively in another embodiment they are stored in the descending order. In the current embodiment array of points 1100 is stored as an AoS, alternatively it can be stored as an SoA. Alternatively another embodiment may receive array of points 1100 as input instead of providing it in a two-level indexing structure for pairs of (n+1) combinations. Alternatively another embodiment does not include array of points 1100, but instead retrieves two tuples each containing n+1 point ids from an input array of (n+1) combinations and merge them into a tuple containing n+2 point ids each time they are needed.

FIG. 18*b* shows a series of steps for constructing a two-level indexing structure for pairs of neighbor (n+1) combinations as shown in FIG. 18*a* according to one embodiment.

At step 970, it allocates array of products 960, array of bases 950, array of points 1100, and MDB 900 in the device memory. It then launches a one dimensional grid by the coprocessor, where the size of the grid is at least as much as the length of the input array of pairs of neighbor (n+1) combinations. A hardware thread of the grid generates a global thread index, does necessary boundary checking, maps the global thread index into a pair index for example by regarding the global thread index as a pair index if it passes the boundary checking, retrieves the two (n+1) combination indices of the corresponding pair of neighbor (n+1) combinations using the pair index from an input array of pairs of neighbor (n+1) combinations for example as shown in FIG. 5.

The hardware thread then retrieves the corresponding two tuples of n+1 point ids from an array of (n+1) combinations for example as shown in FIG. 4, compares the two tuples of point ids to identify n+2 distinct point ids. The comparison can be made in linear time if the point ids in both tuples are stored in for example either the ascending or the descending order. For an example in 3D, if it retrieves a first tuple (1,2,3,4) and a second tuple (2,3,4,5), then the n+2 distinct point ids are 1,2,3,4, 5. The n+2 point ids are then arranged for example in the ascending (or alternatively in the descending order) if not already is and stored into array of points 1100 if one is provided. The ordering scheme derives a mapping between the 2n+2 components of the two (n+1) combinations and the n+2 components of a tuple holding the n+2 point ids according to the ordering scheme. The ordered point ids are then stored in array of points 1100.

The hardware thread then retrieves the n+2 bases of the n+2 distinct point ids from for example array of bases 361 shown in FIG. 3, array of bases 832 shown in FIG. 16, or array of bases 763 shown in FIG. 15*a*. In the last case, the two n+1 bases are merged as the two tuples of point ids are compared. The n+2 bases are ordered following the ordering of the point ids to determine a Mixed Radix Number System for the pair of neighbor (n+1) combinations. For example if the point ids are in ascending order, the least significant digit is assigned the base of the smallest point id, the second least significant digit is assigned the base of the second smallest point id and so on. Alternatively other schemes for example the descending order can be used.

It then multiplies together the n+2 bases to obtain a product, and stores the product in array of products 960 at the offset of the pair index. It also stores the n+1 bases corresponding to the n+1 least significant digits in array of bases 950 at the offset of the pair index where the ordering of the n+1 bases follows the ordering of their point ids. It also records the corresponding MBD element into the MBD at the offset of the pair index. Still using the above example of retrieving two tuples (1,2,3, 4) and (2,3, 4,5), and assuming that the n+2 bases are ordered following the ordering of the point ids in the ascending order, which we'll referred to as the new ordering. Since point 1 is the 0-th element in the new ordering and it comes from the 0-th component of the first tuple, the 0-th component of the corresponding MBD element stores the offset 0 in the new ordering. Since point 2 is the 1-st element in the new ordering and it comes from the 1-st component of the first tuple and the 0-th component of the second tuple, the 1-st and the 4-th components of the MBD element store the offset 1 in the new ordering and so on.

Alternatively assuming for each MBD element the n+2 point ids are arranged in the descending order, then the 0-th component of the corresponding MBD element stores 4, the 1-st and the 4-th components of the corresponding MBD element store 3, the 2-nd and the 5-th component of the corresponding MDB element stores 2, the 3-rd and the 6-th component of the corresponding MBD element stores 1, and the 7-th component stores 0.

To fill MBD elements, according to one embodiment for each of the n+2 distinct point ids it records for example in registers its one or two position(s) in the two tuples which can be used to derived the one or two corresponding components in the MBD element, and then it records into the MBD element the position of the point id in the new ordering into the one or two corresponding components. For example, still using the above example and assuming the ascending order, for point 1, its positions in the two tuples are recorded in a tuple of two components (0,NA), where NA could be for example a very large or a negative integer indicating that it is not a valid point id. Now a 0 in the first component of the tuple corresponds to the 0-th component of the corresponding MBD element. Recall that according to the new ordering, point 1 has new offset 0 in the new ordering. Thus new offset 0 is stored into the 0-th component. For point 2, its positions in the two tuples are (1, 0), which correspond to components 1 and 4 in the MBD element. Point 2 has new offset 1 in the new ordering. Thus new offset 1 is stored into the 1-st and the 4-th components of the corresponding MBD element. Alternatively, an MBD element stores a tuple of two components for each fo the n+2 distinct point ids as described above.

At step 972, it computes and stores the padded length 928 using array of products 960. In one embodiment this involves carrying out a parallel reduction on array of products 960 to find the maximum segment length, converting the maximum segment length to a corresponding number of bytes that is the product of the maximum segment length and the number of bytes in each of the elements that store local distance measures, rounding the number of bytes up to the smallest integer satisfying the alignment requirements that is greater than or equal to it, and converting the rounded number back to a number of elements by dividing the smallest integer by the number of bytes in each element. Alternatively this can also be carried out by one or more CPU threads, and the result is stored to padded length 928 in the device memory.

At step 974, it allocates an array at the second level 930 in the device memory using the information computed above.

At step 976, it fills in the array at the second level in the device memory with values. To do this, ICU 108 launches a one or two dimensional grid on the coprocessor.

Referring to FIG. 18*c*, it illustrates the sub-steps carried out by the grid's hardware threads given a two-level indexing structure for (n+1) combinations as for example illustrated in FIG. 15*a* according to some embodiments. At step 980 a hardware thread receives a global thread index.

At step 982, it obtains from the global thread index a pair index that is used to locate a padded segment, and a second offset that is used to index into the padded segment. If it is a one dimensional grid the global thread index is divided by the padded length, then the integral quotient is regarded as the pair index and the remainder is regarded as the second offset.

If it is a two dimensional grid such that its y dimension is at least as much as the number of padded segments, and its x dimension is at least as much as the padded length, then the x component of the global thread index is regarded as the second offset, and the y component is regarded as the pair index. Alternatively the roles of the x and y components are switched.

Then the number of pairs of neighbor (n+1) combinations can be used to boundary check the validity of the pair index, and array of products 960 can be used to boundary check if the second offset refers to a padding unit/element.

At step 984, it retrieves the corresponding bases from array of bases 950 at the offset of the pair index.

At step 986, it computes an (n+2) local index where it iteratively divides the second offset by the bases of the n+1 least significant digits and records the remainders and the last quotient in the order that they are generated such that the first remainder is regarded as the value of the least significant digit.

At step 988, the hardware thread then retrieves the corresponding MBD element from MBD 900 using the pair index, and groups the (n+2) local index into two groups representing respectively a first (n+1) local index and a second (n+1) local index according to the 2n+2 components of the MBD element, where the first (n+1) local index is of the first (n+1) combination of the pair of neighbor (n+1) combinations, the second (n+1) local index is of the second (n+1) combination of the pair of neighbor (n+1) combinations, and n of the n+2 local indices belong to both groups. According to the current embodiment, to set the i-th component of the j-th (j=0,1) (n+1) local index, it reads the k-th component of the (n+2) local index, where k is retrieved from the (j*(n+1)+i)-th component of the MBD element.

At step 990, the two (n+1) combination indices and their (n+1) local indices are used to query the two-level indexing structures for (n+1) combinations to retrieve the required components of two affine transformations according to the steps shown in FIG. 15*d*.

At step 992, it uses MPEU 107 to compute a local distance measure using the required components and at step 994 it stores the result into the array at the second level. For this it uses the pair index to retrieve the start offset of the corresponding padded segment, and then stores the result at the offset of the second offset relative to the start offset of the segment of the padded segment.

Similarly, according to some embodiments, a two-level indexing structures for pairs of neighbor (n+1) combinations with uniformly padded segments may contain two or more arrays at the second level.

Alternatively, according to another embodiment, it constructs a two-level indexing structure for pairs of neighbor (n+1) combinations without first constructing a two-level indexing structures for (n+1) combinations. Thus instead of retrieving the required components of two affine transformations from a two-level indexing structures for (n+1) combinations, a hardware thread computes an (n+2) correspondent of a pair of neighbor (n+1) combinations using a series of steps similar to those shown in FIG. 15*c*, retrieves the coordinates of the components of the (n+2) correspondent from a second spatial point set, retrieves the n+2 components of the pair of neighbor (n+1) combinations from array of points 1100, retrieves the coordinates of the n+2 components of the pair of neighbor (n+1) combinations from a first spatial point set, computes some necessary components of two affine transformations using both coordinates, and then computes a local distance measure using the necessary components.

Referring to FIG. 18*d*, it illustrates the steps carried out by a hardware thread to query the two-level indexing structures for pairs of neighbor (n+1) combinations shown in FIG. 18*a* to retrieve a local distance measure given a pair index and an (n+2) local index according to one embodiment.

At step 996, it receives a pair index and an (n+2) local index. The ordering of the members of the (n+2) local index is required to match the ordering of the n+2 digits of the Mixed Radix Indexed Array of the pair of neighbor (n+1) combinations indexed by the pair index, meaning if a point id is associated with the i-th digit, where $0 \leq i \leq n+1$, then it is also associated with the i-th member of the (n+2) local index.

At step 998, it multiplies the pair index by the padded length to get the start offset of the corresponding padded segment in the array at the second level.

Step 1002 is similar to step 984 in FIG. 18*c*.

At step 1004, it computes a second offset using the bases and the n+2 members of the (n+2) local index according to equation (1), with M being set to n+2, and the resultant second offset is at the left hand side of the equation.

At step 1006, it retrieves the local distance measure at the second offset relative to the start offset of the segment of the padded segment whose start offset was computed at step 998.

When generating a two-level indexing structure for pairs of neighbor (n+1) combinations, according to one embodiment the thread blocks are mapped to padded segments such that each thread block handles one padded segment. This means that all the hardware threads in each thread block query a two-level indexing structure for (n+1) combinations with the same two (n+1) combination indices and all their various (n+1) local indices.

Assuming that shared memories are provided, they can be used as an intermediary when hardware threads retrieve required components of affine transformations from the device memory. At first it allocates for each thread block two copies of blank padded segments of the padded length of the two-level indexing structure for (n+1) combinations. Before step 990 in FIG. 18*c*, in each thread block all hardware threads computes two start offsets of two padded segments, where one of the start offsets is the product of the first (n+1) combination index and the padded length of the two-level indexing structure for (n+1) combinations, and the second start offset is the product of the second (n+1) combination index and the padded length of the two-level indexing structure for (n+1) combinations. The hardware threads then cooperatively copies the two padded segments (or the two segments fo the two padded segments) at the two start offsets into the two blank copies in the shared memory in an aligned and coalesced fashion. After synchronizing across the thread block using a thread barrier (in general, appropriate synchronizations are required if there are potential race conditions when accessing shared memories), each hardware thread uses its two (n+1) local indices to query the two padded segments in the shared memory respectively to retrieve the necessary components of two affine transformations at step 1088 as shown in FIG. 15*d*.

Detailed Description—Affine Calculation Unit

Referring to FIG. 9, MU 100 comprises an Affine Calculation Unit (ACU) 112. ACU 112 receives an (n+1) combination and one of its (n+1) correspondent, and computes the required components of an affine transformation that maps the end points of the (n+1) combination to their correspondents in the (n+1) correspondent. In 2D numerically it satisfies the following relationship: let A denote the affine matrix, $x_1$, $x_2$, $x_3$ denote the three points of the n+1 combination, $loc(x_1)$, $loc(x_2)$, $loc(x_3)$ denote their coordinates in column vectors in homogeneous coordinates, $loc'(x_1)$, $loc'(x_2)$, $loc'(x_3)$ denote their respective correspondents' coordinates under the affine transformation in column vectors in homogeneous coordinates, and $u_1$, $u_2$, $u_3$ denote their respective displacements under the affine transformation as column vectors with the extra dimensions set to 0:

$$A[loc(x_1), loc(x_2), loc(x_3)] = [loc(x_1), loc(x_2), loc(x_3)] + [u_1, u_2, u_3]$$
$$= [loc'(x_1), loc'(x_2), loc'(x_3)]$$

After the summation, the right hand side just contains the coordinates of the correspondents of $x_1$, $x_2$, and $x_3$. This equation is used to specify a numerical relationship. Although it can be used to compute A, it doesn't necessarily demand that A has to be computed using this matrix equation in homogeneous coordinates. Referring to my previous U.S. Pat. Nos. 8,811,772 and 8,571,351, various approaches to compute the affine transformation have been discussed. Examples include computing the inverses of the location matrix $[loc(x_1), loc(x_2), loc(x_3)]$ analytically using determinants and cofactors, computing the inverses of the location matrix using the LU or QR decomposition by solving linear systems with the unit vectors at the right hand side, solving the matrix equation using various matrix decomposition methods such as the LU decomposition with or without pivoting or the QR decomposition, using the Gauss Jordan Elimination, or solving the linear system using the Direct linear transformation (DLT) algorithm where the problem is converted to that of solving a linear system where the unknown vector x is composed of the elements of the transformation matrix (please refer to "Direct linear transformation" retrieved from Wikipedia for more details), etc. In the current embodiment the floating point arithmetic is used. Alternatives include for example the fixed point arithmetic or the rational number system, etc. An affine transformation can be solved as long as $x_1$, $x_2$, $x_3$ are in general position, although it may be singular if the right hand side is either not in general position, or is not one-to-one. This extends to 3D using four points.

When an (n+1) combination has multiple (n+1) local indices associated with it, multiple instances of the above matrix equation with different right hand sides need to be solved. In such situations it helps to reuse intermediate results. Examples of such intermediate results include the inverses of location matrices. lower and upper triangular matrices (which can be stored in the same matrix) generated by the LU decomposition, or Q and R matrices generated by the QR decomposition or their equivalents. We'll refer to these intermediate results as "solving structure"s. Depending on the context, to apply a solving structure could mean for example carrying out forward and backward substitutions using the lower and upper triangular matrices, multiplying by the inverses of location matrices, or applying the transpositions of the Q matrices and then do back substitution with the corresponding R matrices.

Referring to FIG. 17, it shows a collection of solving structures stored in an AoS of solving structures 860 according to one embodiment. AoS of solving structures 860 includes a first element 870, a second element 872, a third element 874, a first padding 876, and a collection of elements and paddings 882. In 3D, each element contains the sixteen L and U components of a solving structure stored continuously. Alternatively in 2D it contains the nine L and U components of a solving structure stored continuously. Alternatively in 3D it also stores permutation information where pivoted LU decomposition is applied.

To access a corresponding solving structure using an offset involves accessing the unit at the offset of the offset, and access the element in the unit. Regardless of how many elements a unit hold, we'll refer to it as a unit of solving structures. When a unit packs more than one elements, multiple concurrent write accesses to the unit need to be put into a critical section, which can be achieved using atomic functions.

Block 862 shows the details of first element 870 according to one embodiment in 2D, and matrix 864 contains a visual illustration in matrix form of the components of block 862. Block 862 contains floats denoted by U11, U12, U13, U22, U23, U33, L21, L31, L32 in the order. Among them U11, U12, U13 are the floats in the first row of matrix 864 from left to right, floats L21, U22, U23 are in the second row of matrix 864 from left to right, and floats L31, L32, U33 are in the third row of matrix 864 from left to right. The U components of matrix 864 correspond to the upper triangular matrix generated by the LU decomposition for an input coordinates matrix (not shown) that contains the coordinates of an (n+1) combination's members arranged such that the first column contains the 0-th member's coordinates, the second column contains the 1-st member's coordinates, the third column contains the 2-nd member's coordinates, and the last row are all 1s, and the L components of matrix 864 correspond to the lower triangular matrix generated by the LU decomposition for the coordinates matrix.

Detailed Description—Mapped Pair Evaluation Unit

Referring to FIG. 8, it shows an embodiment of Mapped Pair Evaluation Unit (MPEU) 107, which computes local distance measures for (n+2) local indices of pairs of neighbor (n+1) combinations. In FIG. 8, MPEU 107 comprises Energy Computation Unit (ECU) 114, and optional Energy Function Computation Unit (EFCU) 116.

ECU 114 receives some necessary components of a pair of affine transformations T1, T2 generated from two (n+1) local indices of a pair of neighbor (n+1) combinations, and use the necessary components to compute a local distance measure. Various local distance measures have been discussed. Referring to my U.S. Pat. No. 8,811,772 granted Aug. 19, 2014, embodiments compute the difference of the left sub-matrices of two affine transformations, and compute a local distance measure based on the difference, including computing its singular values using a Matrix Decomposition Unit (MDU) and then computing matrix norms such as the Ky Fan p-k norm or the (c,p)-norm etc. using a distance computation unit (DCU). The patent also discloses embodiments of ECU 114 that computes local distance measures using the Frobenius norm or the trace norm without using an MDU. In these situations, the necessary components of affine transformations consists of the components of the left-submatrices of the affine transformations.

Alternatively, referring to my U.S. Pat. No. 8,571,351 granted Oct. 19, 2013, embodiments compute a local distance measure by defining a spatial agent, applying two input affine transformations to the spatial agent to generate two transformed spatial agents, and computing a local distance measure based on the transformed spatial agents. In these situations, the necessary components of affine transformations include the non-trivial components of the affine transformations.

Alternatively, referring to "An Affine Energy Model for Image Registration Using Markov Chain Monte Carlo" by Yang and Keyes, there a local distance measure comprises the Euclidean distance between the corresponding elements of the matrices of a given pair of affine transformations.

Optional EFCU 116 receives local distance measures from ECU 114 and adds one or more terms to them. Each additional term has a multiplicative coefficient that represents the term's significance relative to the other terms. For example, in an alternative embodiment it also receives for each point a feature vector. For an example of such feature vectors, referring to "Distinctive Image Features from Scale-Invariant Keypoints" by David Lowe, associated with each interest point a SIFT feature vector of 128 elements is computed. The feature vector summarizes the local geometry around the interest point. Thus an additional term could comprise the Euclidean distance between feature vectors associated with the end points of a pair of neighbor (n+1) combinations and feature vectors associated with their correspondents in two input (n+1) local indices. As yet another example, such terms could include the Euclidean distance between a first vector of texels within the convex hull of a pair of neighbor (n+1) combinations, and a second vector of texels within the convex hull of one of its (n+2) correspondent under two affine transformations, where the first vector of texels are transformed according to the affine transformations and are interpolated/extrapolated at the target texel locations.

Detailed Description—Mapping Evaluation Unit

Referring to FIG. 9, MU 100 comprises a Mapping Evaluation Unit 109 that for each N-to-1 mapping generates one or more local distance measures and summarizes them with an overall distance measure. Referring to my earlier U.S. Pat. No. 8,811,772 granted Aug. 19, 2014 and U.S. Pat. No. 8,571,351 granted Oct. 19, 2013, an overall distance measure summarizes one or more local distance measures by for example computing their arithmetic mean, their geometric mean, their weighted average, or their maximum.

According to one embodiment, MEU 109 allocates a scalar array of local distance measures in the device memory. Given an input frame, the array comprises a local distance measure for each of the unique combinations of the pairs of neighbor (n+1) combinations generated by PGU 105 and the N-to-1 mappings generated by MGU 106. The array concatenates multiple segments, one for each of the pairs of neighbor (n+1) combinations, where the length of each segment is the number of the N-to-1 mappings. Alternatively, the array concatenates multiple padded segments, where the length of each padded segment satisfies the alignment requirement and is greater than or equal to the number of the N-to-1 mappings. Alternatively, the array concatenates multiple segments one for each of the N-to-1 mappings, where the length of each segment is the number of the pairs of neighbor (n+1) combinations.

It then launches a two dimensional grid on the coprocessor. The x dimension of the grid is at least the number of the N-to-1 mappings, and the y dimension is at least the number of the pairs of neighbor (n+1) combinations. (Alternatively in another embodiment the association is switched.) One can visualize this as a virtual matrix whose row indices are the same as the offsets into the array of pairs of neighbor (n+1) combinations, and column indices are the same as the offsets into the array of N-to-1 mappings. An element at the i-th row and the j-th column stores the local distance measure for the pair of neighbor (n+1) combinations at offset i in the array of pairs of neighbor (n+1) combinations and the N-to-1 mapping at offset j in the array of N-to-1 mappings.

Referring to FIG. 19, it illustrates the steps carried out by a hardware thread that queries a two-level indexing structure for pairs of neighbor (n+1) combinations as shown in FIG.

18a to retrieve a local distance measure given a pair index and an N-to-1 mapping index according to one embodiment.

At step 1010, it receives an N-to-1 mapping index and a pair index. For example if a CUDA device is used, a hardware thread of the grid generates a global thread index using the block dimensions, its local thread index, and its block index:

```
int threadx = blockIdx.x * blockDim.x + threadIdx.x;
int thready = blockIdx.y * blockDim.y + threadIdx.y;
```

It then does a necessary boundary checking so that the x component references a valid N-to-1 mapping and they component references a valid pair of neighbor (n+1) combinations:

```
if (threadx >= nN21Mappings || thready >= nPairs)
    { return; }
int nTo1MappingIdx = threadx;
int pairIdx = thready;
```

Note that boundary checking is not always necessary using the OpenCL programming paradigm. In the OpenCL programming paradigm, for a kernel launch the NDRange size does not have to be an integral multiple of the corresponding work-group size.

Alternatively, according to another embodiment, a one dimensional grid can be used to generate the indices. Still assuming that a CUDA device is being used:

```
int threadx = blockIdx.x * blockDim.x + threadIdx.x;
if (threadx >= nN21Mappings * nPairs)
    { return; }
int nTo1MappingIdx = threadx % nN21Mappings;
int pairIdx = threadx / nN21Mappings;
```

At step 1012, it receives the n+2 distinct point ids of the pair of neighbor (n+1) combination from array of points 1100 at the offset of the 'pairIdx' in the order the point ids are stored. For this array of points 1100 can be stored in the constant memory if provided. Alternatively if array of points 1100 is not provided or used, it queries an array of (n+1) combinations using the two (n+1) combination indices of the pair of neighbor (n+1) combination to retrieve two tuples of end points each of length n+1, and merge the two tuples to obtain n+2 end points.

At step 1014, it retrieves an n+2 local index comprising n+2 indices of n+2 candidate correspondences in their separate sets at the components of the n+2 distinct point ids from the tuple representing the N-to-1 mapping indexed by the "nto1mappingidx", where the ordering follows that of the corresponding end points. According to one embodiment as described previously, the N-to-1 mappings are stored in an SoA containing a number of scalar arrays. At this step the collection of hardware threads that handle a row of the virtual matrix all retrieve from the same n+2 scalar arrays, thus shared memories can be used to facility access if provided. For example according to the current embodiment, each thread block handles one row of the virtual matrix. The hardware threads in a thread block cooperatively copy the n+2 scalar arrays of the SoA of N-to-1 mappings into its shared memory in a coalesced and aligned fashion before this step, then at this step it reads from the copies in the shared memory. Alternatively each thread block can handle can two or more rows of the virtual matrix.

At step 1016, it queries the two-level indexing structure for pairs of neighbor (n+1) combinations with the pair index and the (n+2) local index to retrieve a local distance measure according to the steps shown in FIG. 18*d*.

At step 1018, it stores the local distance measure in an array of local distance measures. For example when there is no paddings between local distance measures, it outputs at the offset of:

int outputOffset=pairIdx*nNTO1Mappings+nTo1MappingIdx;

where 'nNTO1Mappings' is a symbol that contains the number of N-to-1 mappings generated by MGU 106. As another example when the length of each row is the smallest integer satisfying the alignment requirements that's greater than or equal to the number of N-to-1 mappings, then the output offset can be computed as follows:

int outputOffset=pairIdx*p2+nTo1MappingIdx;

where 'p2' is a symbol that contains the padded length.

Alternatively, according to another embodiment a two-level indexing structure for pairs of neighbor (n+1) combinations is not provided or is not used but a two-level indexing structure for (n+1) combinations, an array of points 1100, and an MBD 900 are provided and used. Referring to FIG. 20, it illustrates the steps carried out by a hardware thread to query a two-level indexing structures for (n+1) combinations shown in FIG. 15*a* to compute a local distance measure given a pair index and an N-to-1 mapping index according to one embodiment.

At step 1022, it receives an N-to-1 mapping index and a pair index.

Step 1024, 1026 are similar to steps 1012, 1014 in FIG. 19.

At step 1028, the hardware thread retrieves the corresponding MBD element from MBD 900 at the offset of the pair index, and groups the (n+2) local index into two groups representing a first and a second (n+1) local index according to the 2n+2 components of the MBD element, where the first (n+1) local index is of the first (n+1) combination of the pair of neighbor (n+1) combinations, the second (n+1) local index is of the second (n+1) combination of the pair of neighbor (n+1) combinations, and n of the n+2 local indices belong to both groups. This step is similar to step 988 in FIG. 18*c*.

At step 1030, it queries the two-level indexing structure for (n+1) combinations with the two (n+1) combination indices and the two (n+1) local indices respectively to retrieve the required components of two affine transformations according to for example the steps shown in FIG. 15*d*. Shared memories can be used in a similar fashion as at step 990 in FIG. 18*c*.

At step 1032, it then uses MPEU 107 to compute a local distance measure using the required components.

At step 1034, it stores the local distance measure into an array of local distance measures. This step is similar to step 1018 in FIG. 19.

Similar to the steps in FIG. 19, the ordering of the n+2 end points retrieved at step 1024 is passed down along the steps to the ordering of the members of the (n+2) local index retrieved at step 1026.

MEU 109 then launches one or more grids to summarize the local distance measures to compute an overall distance measure for each N-to-1 mapping.

To compute overall distance measures, according to one embodiment where there is no padding elements between local distance measures, it involves using a one dimensional grid whose x dimension is no less than the number of N-to-1 mappings, such that each hardware thread that passes boundary checking generates an overall distance measure for one of the N-to-1 mappings. Each hardware thread after doing boundary checking sums up the local distance measures generated for the N-to-1 mapping with all the pairs of neighbor (n+1) combinations, and the hardware threads store the results to start elements of the elements of the array of local distance measures corresponding to the first row of the virtual matrix:

```
__global__ void ComputeOverallDistanceMeasures (int *g_idata,
unsigned int nPairs, unsigned int nMappings) {
    // set thread ID
    unsigned int tid = threadIdx.x;
    unsigned int idx = blockIdx.x*blockDim.x + threadIdx.x;
    if (idx < nMappings)
    {
        float a1 = g_idata[idx];
        for (int i = 1; i < nPairs; ++i)
        {
            a1 += g_idata[idx + i * nMappings];
        }
        g_idata[idx] = a1;
    }
}
```

As another example where the array of local distance measures concatenates multiple padded segments, one for each pair of neighbor (n+1) combinations, where the length of each padded segment is the smallest integer satisfying the alignment requirements that is greater than or equal to the number of N-to-1 mappings, a similar kernel is used except that $a1+=g\_idata[idx+*nMappings]$;

is replaced by:

$a1+=g\_idata[idx+i*p2]$;

Alternatively according to another embodiment, the pairs of neighbor (n+1) combinations are divided into two halves according to their offsets in the array of pairs of neighbor (n+1) combinations. Two overall distance measures are generated for each N-to-1 mapping using the two halves according to the embodiments described above. Next for each N-to-1 mapping the two overall distance measures are summarized for example by summing them up or by averaging them either using another grid or using a CPU thread after being copied to the host memory to generate another overall distance measure. This can be extended to divide into three or more parts.

Detailed Description—Optimization Unit

Optimization Unit (OU) 110 receives one or more N-to-1 mappings and their overall distance measures, and finds an N-to-1 mapping with the lowest overall distance measure. In one embodiment a CPU thread copies overall distance measures from the device memory to the host memory, and then iterates through the overall distance measures while maintaining the running minimal overall distance measure and its offset. It then retrieves the N-to-1 mapping at the offset in the array of N-to-1 mappings. In another embodiment, within each thread block a parallel reduction algorithm is performed by the coprocessor on the overall distance measures to find the minimum overall distance measure, and then the hardware threads of the thread block after necessary synchronizations atomically recording their global thread indices into a common memory location if the corresponding overall distance measures are equal to the minimum overall distance measure. The minimum overall distance measures from different thread blocks are further compared serially or concurrently to find the overall minimum overall distance measure and a minimizing global thread index. One skilled in the art will recognize that in order to compare floating point numbers for equivalence it usually involves a small epsilon.

Detailed Description—Processes

Referring to FIGS. 12, 13a, 13b, and 14, there are shown different parts of two exemplary processes carried out by MU 100 shown in FIG. 9 and implemented on computing device 607 shown in FIG. 7 including coprocessor 612 for generating and evaluating N-to-1 mappings. It is written with NVIDIA® CUDA® terminology, however similar processes shall be applicable to other data-parallel coprocessors. The processes are divided into a first subprocess 250 shown in FIG. 12, a first second subprocesses 252 shown in FIG. 13a and a second second subprocess 254 shown in FIG. 13b, and a third subprocess 256 shown in FIG. 14. The processes are divided as such because it's easy for me to describe.

The first exemplary process begins with first subprocess 250, followed by first second subprocess 252, and then followed by third subprocess 256.

At step 160, computing device 607 receives in host memory 606 a first and a second spatial point sets, and a set of candidate correspondences between the two spatial point sets. It then spawns a CPU thread to run the following steps.

At step 162, the CPU thread preprocesses the spatial point sets and candidate correspondences to construct a CCISS using MU 100.

At step 164, the CPU thread creates a CUDA stream for processing the current frame composed of the two point sets and the CCISS. According to one embodiment, all of the following kernels that are executed on the coprocessor and memory copying between the host and the coprocessor are associated with this stream. Alternatively multiple streams can be used, for example one for the operations up to step 174, and another one for those after step 174. Alternatively multiple coprocessors can be used, for example one for the operations up to step 174 (according to the order illustrated by arrows and not using the steps' numeric orders), and another one for those after step 174, as long as the host synchronizes the operations so that those after step 174 are carried out after those before step 174.

At step 166, it allocates necessary data structures to hold the two point sets and the CCISS in the coprocessor, and copies the two point set and the CCISS to the data structures. As one skilled in the art knows, data structures need to be allocated in the device memory either explicitly or implicitly for example with Unified Memory before data can be copied from the host to the device, and they shall be freed after all relevant operations have been performed on them either explicitly or implicitly. Similarly data structures need to be allocated in the host memory before they are copied from the device memory to the host memory. Such sub-steps of allocating in the host memory or in the device memory are sometimes not explicitly mentioned as one skilled in the art shall already know.

At step 168, MU 100 generates in either the host memory or the device memory an array of (n+1) combinations and an array of one or more pairs of neighbor (n+1) combinations referencing into the array of (n+1) combinations in the first point set using PGU 105. PGU 105 generates the arrays using either the general purpose processors, the coprocessor, or a combination of both.

At step 170, if the array of (n+1) combinations and/or the array of pairs of neighbor (n+1) combinations are not generated in device memory 610, it allocates the necessary data structures to hold the array of (n+1) combinations and/or the array of pairs of neighbor (n+1) combinations in the coprocessor, and copies those generated at step 168 that are not already in the device memory to the data structures.

At step 172, it computes the sizes of the required data structures to be constructed at later steps. For the two-level indexing structures for (n+1) combinations it involves steps 770 and 772 in FIG. 15*b*. For the two-level indexing structures for pairs of neighbor (n+1) combinations it involves steps 970 and 972 in FIG. 18*b*. For the number of N-to-1 mappings, it is computed by multiplying together the number of candidate correspondences of each of the separate sets of candidate correspondences, and it can be computed either iteratively by the one or more CPU threads using the general purpose processors, or launching another kernel to run a parallel reduction to multiply the elements of array of bases 361 or 832. It also computes the size of the array of local distance measures and the size of the array of solving structures as described previously. Although the exact formulas for computing the byte sizes of some of the data structures are not explicitly given, those skilled in the art shall have no problem deriving them from the descriptions and embodiment specifics including for example components' byte sizes.

At step 174, the CPU thread block on the stream until all kernel operations that have been pushed into the stream so far are finished. Alternatively if there has been no kernel operations so far, then this step can be omitted. If it's a CUDA device, it does the blocking for example by calling "cudaStreamSynchronize" at this step, or by calling "cudaEventRecord" to push in an event after step 172 and then calling "cudaStreamWaitEvent" to synchronize on the event at this step. In OpenCL the host can block by calling "clWaitForEvents" on a list of events associated with the kernels enqueued at the previous steps.

At step 176, it allocates all data structures required by the following steps but haven't been allocated by previous steps in the device memory except for those that are dynamically allocated inside kernels if there is any. In one embodiment it allocates an array of solving structures, a two-level indexing structure for (n+1) combinations, a two-level indexing structure for pairs of neighbor (n+1) combinations, an array of N-to-1 mappings, and an array of local distance measures. In another embodiment it allocates an array of solving structures, a two-level indexing structure for (n+1) combinations, an array of N-to-1 mappings, and an array of local distance measures. For example step 774 in FIG. 15*b* and step 974 in FIG. 18*b* are carried out at this step.

At step 178, it generates in the device memory an array of solving structures for the array of (n+1) combinations. According to one embodiment, it launches a one dimensional grid by the coprocessor, where the size of the grid is greater than or equal to the number of (n+1) combinations. A hardware thread of the grid receives a global thread index, does a necessary boundary checking, maps the global thread index into an (n+1) combination index for example by treating the global thread index as an (n+1) combination index, retrieves the corresponding (n+1) combination using the (n+1) combination index from the array of (n+1) combinations, retrieves the coordinates of the members of the (n+1) combination from the spatial point sets, uses ACU 112 to compute a solving structure for the (n+1) combination, and stores the solving structure to the array of solving structures allocated at step 176 at the offset of the (n+1) combination index.

In this and other steps, one can replace a one dimensional grid with a two or three dimensional grid, as long as the number of hardware threads of the two or three dimensional grid meets the same requirement of the size of the one dimensional grid. For example a global thread index in a two dimensional grid having x and y components can be converted to a one dimensional global index by multiplying the y component by the grid's global size in the x dimension, and then add to it the x component.

According to one embodiment, the array of (n+1) combinations is stored as an SoA as illustrated in FIG. 4, and the array of solving structures is stored as an AoS as illustrated in FIG. 17. Shared memories are used such that when a grid is launched at this step, it allocates for each thread block one or more consecutive units in its shared memory to hold one or more consecutive units in the array of solving structures, where the one or more consecutive units in the shared memory are also stored as an SoA. After the hardware threads of a thread block generate their solving structures, where each solving structure is generated by one of the hardware threads, the solving structures are stored into the consecutive units in its shared memory by each of the hardware threads, where the components of each solving structure are stored together in memory. The hardware threads then synchronize with each other. The hardware threads hen cooperatively store the consecutive units in the shared memory into the corresponding units in the device memory in an aligned and coalesced fashion.

At step 180, it generates in the device memory an array of N-to-1 mappings between the two point sets using MGU 106.

At step 182, it continues to first second subprocess 252.

At step 222, it generates in device memory 610 a two-level indexing structure for (n+1) combinations for the array of (n+1) combinations using ICU 108.

At step 224, it generates in device memory 610 local distance measures for unique combinations of the N-to-1 mappings and the pairs of neighbor (n+1) combinations using MEU 109, during the process it queries the two-level indexing structure for (n+1) combinations generated at step 222 as described earlier.

At step 226, it continues to the third subprocess 256.

At step 240, it computes in the device memory overall distance measures for the N-to-1 mappings using MEU 109.

At step 242, it copies the overall distance measures from the device memory to the host memory.

At step 243, the CPU thread blocks on stream until all kernel operations enqueued into stream after step 174 are finished.

At step 244, it finds an N-to-1 mapping with the minimum overall distance measure in the host memory using OU 110. Alternatively steps 242-244 can be carried out on the coprocessor as described earlier.

The second exemplary process begins with first subprocess 250, followed by second second subprocess 254, and then followed by third subprocess 256. Steps 160-180 are similar to those of the first exemplary process. At step 182, it instead continues to the second second subprocess 254. At step 232, it generates in the device memory a two-level indexing structure for (n+1) combinations for the array of (n+1) combinations using ICU 108. This step is similar to step 222 in the previous process.

At step 234, it generates in the device memory a two-level indexing structure for pairs of neighbor (n+1) combinations for the pairs of neighbor (n+1) combinations using ICU 108.

At step 236, it generates in device memory 610 local distance measures for unique combinations of the array of N-to-1 mappings and the array of pairs of neighbor (n+1) combinations using MEU 109, during the process it queries the two-level indexing structure for pairs of neighbor (n+1) combinations generated at step 234.

At step 238, it continues to the third subprocess 256.

Steps 240-244 are similar to those described earlier.

Alternatively instead of distance measures, embodiments may compute weights instead of local distance measures and overall weights instead of overall distance measures. Thus they return N-to-1 mappings with maximum overall weights instead. Referring to my previous U.S. application Ser. No. 16,428,970 filed on Jun. 1, 2019 and U.S. application Ser. No. 16,442,911 filed on Jun. 17, 2019, a Weight Computation Unit (WCU) receives local distance measures and computes weights that are inversely related to them. Let $d_1, \ldots, d_M$ be the local distance measures or overall distance measures, and $w_1, \ldots, w_M$ be the corresponding weights or overall weights. There are various approaches to compute weights from local distance measures and overall weights from overall distance measures. In one embodiment, $w_i = \max_{j=1}^{M}(d_j) - d_i$. In another embodiment, $w_i = \max_{j=1}^{M}(d_j)/d_i$. In yet another embodiment, $w_i = 1 - \text{softmax}(d_i)$, where "softmax" refers to the softmax function: softmax $$(d_i) = \frac{\text{Exp}(d_i)}{\Sigma_j \text{Exp}(d_j)}.$$

Alternatively according to another embodiment, the data structures are allocated and filled in the host memory and multiple CPU threads access the data structures in the host memory. A data grid is decomposed into multiple chunks containing consecutive elements where each CPU thread handles one of the chunks. Different programming languages may provide different mechanisms to manage CPU threads. For example in C++, Pthreads and OpenMP can be used to distribute work among multiple CPU threads within a process, while MPI can be used across a cluster of computers. When using Pthreads, a user is required to manage CPU threads manually. In comparison, OpenMP provides special compiler instructions such as the "parallel for" directive that reduces programming efforts. The are widely supported on various platforms.

Various Intel® and AMD® CPUs support various vector instructions that operate on vector registers including for example the Streaming SIMD Extensions (SSE) and the Advanced Vector Extensions (AVX) families of technologies. Each of the technologies provides a set of vector registers that can be operated in parallel by an array of function units. A user can use special vector intrinsics that are recognized by compatible compilers to program the function units. These technologies can be used together with multi-threading. After a grid is decomposed into multiple chunks each being handled by a CPU thread, although a chunk sometimes can't be directly fit into a vector register, it can be decomposed into multiple sub-chunks where each of which fits into a vector register.

One skilled in the art will appreciate that, for this and other processes, the steps may be implemented in different order. For example an alternative embodiment may carry out step 180 in sub-process 250 instead in FIG. 12 between steps 222 and 224 in sub-process 252 shown in FIG. 13a, or between steps 232 and 236 in sub-process 254 in FIG. 13b.

Furthermore, the steps are only provided as examples. thus some steps may be optional, combined into fewer steps, split into multiple steps, or expanded into additional steps. Further, the outlined functional units are provided as examples. That is, units may be combined, sub-units may be organized in different ways, or parent units may be expanded to include additional units without distracting from the essence of the disclosed embodiments. Multiple kernels can be combined or a kernel can be divided into multiple ones. Various steps can be carried out on the general purpose processors or on the data-parallel coprocessor. One skilled in the art also knows that when retrieving data from the device memory at some steps, shared memories can optionally be used as intermediaries. Alternative to launching a grid whose size is at least that of the size of an input array, embodiments may use block partitioning or cyclic partitioning so that a hardware thread may process two or more data elements.

One skilled in the art will also appreciate that a set of offsets, for example the offsets of all the elements in a padded segment of an array at the second level, or the offsets of all the elements of an array of solving structures, may be offseted by another offset to accommodate for example the an omitted first element in array 320 shown in FIG. 3, a certain amount of front padding, or for example in Matlab and Fortran, array indices start from 1 instead of 0. When this happens various steps disclosed in this document may need to be adjusted accordingly. Also a set of offsets may be translated into another set of offsets for example by providing an array whose elements are indexed by the first set of offsets and their values are the second set of offsets, or for example by using byte offsets instead of element offsets.

Detailed Description—Hash Tables for Data-Parallel Coprocessors

Hash tables implemented on data-parallel coprocessors can be used to provide alternative indexing mechanisms whenever an offset is used to retrieve a certain value from an array on a data-parallel coprocessor where offsets can be regarded as specific cases of indices. For example as described previously, hash tables can be used when a two-level indexing structure contains two or more arrays at the second level. Referring to "Building an Efficient Hash Table on the GPU" by Alcantara et al., it uses multiple (for example four in the paper) hash functions that can be used to compute multiple insertion locations for an input key, where the hash functions are used in a round-robin fashion. After receiving a new key and value pair, a hardware thread uses one of the hash functions to compute a first storage location. If a resident key and value pair is not already stored at that location, the new key and value pair is stored at the first storage location and the insertion succeeds. Otherwise the new key and value pair is swapped with the resident key and value pair. It then computes a second storage location using the next hash function and try to store the key and value pair that has just been swapped out into the second storage location and so on. This scheme is referred to as "cuckoo hashing". The swap operation is implemented using atomics, thus multiple new key and value pairs can be inserted concurrently by multiple hardware threads. If after a maximum number of iterations it doesn't succeed, the hash table is rebuilt. On the other hand, when queried with a new input key, it uses the hash functions to compute multiple storage locations, compares the keys stored at the multiple storage locations with the new input key, and either returns a value if a match is found or reports not found.

One issue with the above method is that the hash table needs to be rebuilt every time an insertion fails. Referring to "More Robust Hashing: Cuckoo Hashing with a Stash" by Kirsch et al., it discusses an improvement that uses a small memory called a stash to reduce the frequency of rebuilding hash table. The stash serves as a temporary storage for outstanding key and value pairs. Referring to "Overview of CUDPP hash tables" retrieved from cudpp.github.io/cudpp/2.0/hash_overview.html on Dec. 20, 2019, the CUDPP library implements cuckoo hashing with a stash for CUDA devices, the code can be downloaded from http://cudpp.github.io/or https://github.com/cudpp/cudpp. The library implements in addition for example a parallel reduction algorithm and a prefix scan algorithm.

I claim:

1. A system for generating and evaluating N-to-1 mappings between spatial point sets in n-D, n being either 2 or 3, the system comprising:

A programmable general purpose processor;

A programmable data-parallel coprocessor coupled to the programmable general purpose processor;

A memory coupled to the programmable general purpose processor and the programmable data-parallel coprocessor, and the memory embodying information indicative of instructions that cause the programmable general purpose processor and the programmable data-parallel coprocessors to perform first operations comprising:

receiving in the memory a first and a second spatial point sets in nD, and a plurality of candidate correspondences between the first and the second spatial point sets, wherein each member of the spatial point sets comprises n coordinates, each of the plurality of candidate correspondences comprising a first reference to one member of the first spatial point set and a second reference to one member of the second spatial point set, and the plurality of candidate correspondences are grouped into a plurality of separate sets according to their end points in the first spatial point set, all the members of each of the plurality of separate sets having a common end point in the first spatial point set, each member of the first spatial point set has a corresponding separate set in the plurality of separate sets, and each of the plurality of candidate correspondences being indexed in its separate set by an in-separate-sets index;

receiving in the memory a plurality of bases for the plurality of separate sets, wherein each of the plurality of separate sets has a corresponding base in the plurality of bases that is the size of the separate set;

generating in the memory a plurality of collections of in-separate-sets indices and a plurality of overall distance measures based on the first and the second spatial point sets, the plurality of candidate correspondences, the plurality of bases, and a predetermined mapping scheme, wherein each of the plurality of collections of in-separate-sets indices has a corresponding overall distance measure in the plurality of overall distance measures, each of the plurality of collections of in-separate-sets indices comprises one of the plurality of in-separate-sets indices for a corresponding member of the first spatial point set for each member of the first spatial point set, the corresponding member of the first spatial point set being the end point in the first spatial point set of the candidate correspondence indexed by the in-separate-sets index in the plurality of candidate correspondences, whereby each of the plurality of collections of in-separate-sets indices represents an N-to-1 mapping between the members of the first spatial point set and the members of the second spatial point set; and generating in the memory an optimal collection of in-separate-sets indices of the plurality of collections of in-separate-sets indices, wherein the optimal collection of in-separate-sets indices has the lowest overall distance measure among the plurality of overall distance measures.

2. The system of claim 1, wherein the members of the first spatial point set are referenced by the members of a first set of point ids, each member of the first spatial point set being referenced by a corresponding member of the first set of point ids, and the generating in the memory the plurality of collections of in-separate-sets indices with the plurality of overall distance measures comprises:

(1) generating in the memory a triangulation whose vertices comprise of all the members of the first spatial point set;

(2) generating in the memory a plurality of (n+1) combinations referenced by a plurality of (n+1) combination indices based on the triangulation, each of the plurality of (n+1) combinations comprising n+1 of the first set of point ids referencing n+1 distinct members of the first spatial point set, each of the plurality of (n+1) combinations being referenced by a corresponding (n+1) combination index of the plurality of (n+1) combination indices, wherein the n+1 distinct point ids are ordered according to the predetermined mapping scheme;

(3) generating in the memory one or more pairs of neighbor (n+1) combinations referenced by one or more pair indices based on the triangulation, wherein each of the one or more pairs of neighbor (n+1) combinations is referenced by one of the one or more pair indices, and each of the one or more pairs of neighbor (n+1) combinations comprises two of the plurality of (n+1) combination indices;

(4) generating in the memory one or more collections of n+2 distinct point ids of the first set of point ids and a plurality of between-digits mappings based on the predetermined mapping scheme, the plurality of (n+1) combinations, the one or more pairs of neighbor (n+1) combinations, wherein each of the plurality of one or more pairs of neighbor (n+1) combination has a corresponding collection of n+2 distinct point ids in the one or more collections of n+2 distinct point ids, the collection of n+2 distinct point ids comprising the distinct members of the two n+1 components of the two (n+1) combinations referenced by the pair of neighbor (n+1) combinations' two (n+1) combination indices, and a corresponding between-digits mapping in the plurality of between-digits mappings, and for each of the one or more pairs of neighbor (n+1) combinations, the n+2 components of its corresponding collection in the one or more collections of n+2 distinct point ids are ordered according to the predetermined mapping scheme and the n+2 components are mapped to the two n+1 components of the two (n+1) combinations referenced by the pair of neighbor (n+1) combinations' two (n+1) combination indices in the plurality of (n+1) combinations according to the pair of neighbor (n+1) combinations' corresponding between-digits mapping in the plurality of between-digits mappings; and (5) generating in the memory the plurality of collections of in-separate-sets indices and the plurality of overall distance measures based on the plurality of (n+1) combinations, the one or more pairs of neighbor (n+1) combinations, the plurality of separate sets, the first and the second spatial point sets, the plurality of between-digits mappings, the plurality of bases, and the one or more collections of n+2 distinct point ids.

3. The system of claim 2, wherein item (5) comprises:

(a) generating in the memory a plurality of tuples of necessary components of affine transformations of a plurality of affine transformations based on the plurality of (n+1) combinations, the plurality of separate sets, the plurality of bases, and the first and second spatial point sets, the plurality of tuples of necessary components of affine transformations being selected from the group consisting of the collections of the left-submatrices of the plurality of affine transformations and the collections of the non-trivial components of the plurality of affine transformations;

(b) in a concurrent manner generating in the memory a plurality of local distance measures based on the one or more pairs of neighbor (n+1) combinations, the plurality of between-digits mappings, the plurality of bases, and the plurality of tuples of necessary components of affine transformations using the data-parallel coprocessor;

(c) in a concurrent manner generating in the memory the plurality of collections of in-separate-sets indices based on the plurality of bases using the data-parallel coprocessor; and (d) in a concurrent manner generating in the memory the plurality of overall distance measures based on the plurality of collections of in-separate-sets indices, the plurality of local distance measures, the one or more collections of n+2 distinct point ids, and the one or more pairs of neighbor (n+1) combinations using the data-parallel coprocessor.

4. The system of claim 3, wherein item (a) comprises for each of the plurality of (n+1) combinations performing the following necessary-components-generating operations:

retrieving the (n+1) combination's n+1 members' n+1 corresponding separate sets' n+1 corresponding bases from the plurality of bases;

generating one or more (n+1) local indices using the n+1 corresponding bases, wherein each of the one or more (n+1) local indices comprises n+1 of the plurality of in-separate-sets indices, the n+1 of the plurality of in-separate-sets indices indexing n+1 corresponding candidate correspondences in the (n+1) combination's n+1 members' n+1 corresponding separate sets and the point ids of the n+1 corresponding candidate correspondences' n+1 end points in the first spatial point set are the members of the (n+1) combination; and for the one or more (n+1) local indices generating in the memory one or more of the plurality of tuples of necessary components of affine transformations based on the n+1 corresponding separate sets in the plurality of separate sets of the n+1 distinct members of the first spatial point set referenced by the (n+1) combination's n+1 of the first set of point ids, the n+1 corresponding separate sets' n+1 corresponding bases in the plurality of bases, and the first and second spatial point sets, wherein each of the one or more (n+1) local indices has a corresponding tuple of necessary components of affine transformations in the one or more of the plurality of tuples of necessary components of affine transformations and the corresponding tuple of necessary components of affine transformations is indexed in the plurality of tuples of necessary components of affine transformations by the combination of the (n+1) combination index of the (n+1) combination on one hand and the (n+1) local index on the other hand.

5. The system of claim 3, wherein item (b) comprises for each of the one or more pairs of neighbor (n+1) combinations performing the following local-distance-measures-generating operations by one or more SIMD cores of the data-parallel coprocessor:

retrieving the pair of neighbor (n+1) combinations' corresponding collection of n+2 distinct point ids' n+2 corresponding separate sets' n+2 corresponding bases in the plurality of bases;

generating one or more (n+2) local indices using the n+2 corresponding bases, wherein each of the one or more (n+2) local indices comprises n+2 of the plurality of in-separate-sets indices, the n+2 of the plurality of in-separate-sets indices indexing n+2 corresponding candidate correspondences in the pair of neighbor (n+1) combinations' corresponding collection of n+2 distinct point ids' n+2 corresponding separate sets and the point ids of the n+2 corresponding candidate correspondences' n+2 end points in the first spatial point set are the members of the pair of neighbor (n+1) combinations' corresponding collection of n+2 distinct point ids;

grouping each of the one or more (n+2) local indices into two (n+1) local indices according to the pair of neighbor (n+1) combinations' corresponding between-digits mapping in the plurality of between-digits mappings, wherein each of the two (n+1) local indices has a corresponding (n+1) combination in the plurality of (n+1) combinations that is indexed by one of the two (n+1) combination indices of the pair of neighbor (n+1) combinations, and for each of the two (n+1) local indices, the (n+1) local index comprises n+1 of the plurality of in-separate-sets indices, the n+1 of the plurality of in-separate-sets indices indexing n+1 corresponding candidate correspondences in the corresponding (n+1) combination's n+1 members' n+1 corresponding separate sets and the point ids of the n+1 corresponding candidate correspondences' n+1 end points in the first spatial point set are the members of the corresponding (n+1) combination;

for each of the one or more (n+2) local indices retrieving two of the plurality of tuples of necessary components of affine transformations based on the two (n+1) combination indices of the pair of neighbor (n+1) combinations, the plurality of bases, and the two (n+1) local indices grouped from the (n+2) local index; and for each of the one or more (n+2) local indices computing in the memory one of the plurality of local distance measures indexed by the combination of the pair index of the pair of neighbor (n+1) combinations on one hand and the (n+2) local index on the other hand based on the two tuples of necessary components of affine transformations retrieved for the (n+2) local index and the plurality of bases.

6. The system of claim 5, wherein each of the plurality of tuples of necessary components of affine transformations comprises the components of the left-submatrices of one of the plurality of affine transformations, and the computing in the memory one of the plurality of local distance measures based on the two tuples of necessary components of affine transformations comprises computing the Frobenius norm of the differences of the two left-submatrices of the two tuples of necessary components of affine transformations.

7. The system of claim 6, wherein item (a) comprises for each of the plurality of (n+1) combinations performing the following necessary-components-generating operations:
retrieving the (n+1) combination's n+1 members' n+1 corresponding separate sets' n+1 corresponding bases from the plurality of bases;
generating one or more (n+1) local indices using the n+1 corresponding bases, wherein each of the one or more (n+1) local indices comprises n+1 of the plurality of in-separate-sets indices, the n+1 of the plurality of in-separate-sets indices indexing n+1 corresponding candidate correspondences in the (n+1) combination's n+1 members' n+1 corresponding separate sets and the point ids of the n+1 corresponding candidate correspondences' n+1 end points in the first spatial point set are the members of the (n+1) combination; and
for the one or more (n+1) local indices generating in the memory one or more of the plurality of tuples of necessary components of affine transformations based on the n+1 corresponding separate sets in the plurality of separate sets of the n+1 distinct members of the first spatial point set referenced by the (n+1) combination's n+1 of the first set of point ids, the n+1 corresponding separate sets' n+1 corresponding bases in the plurality of bases, and the first and second spatial point sets, wherein each of the one or more (n+1) local indices has a corresponding tuple of necessary components of affine transformations in the one or more of the plurality of tuples of necessary components of affine transformations and the corresponding tuple of necessary components of affine transformations is indexed in the plurality of tuples of necessary components of affine transformations by the combination of the (n+1) combination index of the (n+1) combination on one hand and the (n+1) local index on the other hand.

8. The system of claim 7, wherein the generating in the memory one or more of the plurality of tuples of necessary components of affine transformations comprises generating in the memory a plurality of solving structures based on the first spatial point set and the plurality of (n+1) combinations, the plurality of solving structures being selected from the group consisting of the collections of the lower and upper triangular matrices of the LU decomposition of the location matrices of the plurality of (n+1) combinations, the collections of the inverses of the location matrices of the plurality of (n+1) combinations, and the collections of the Q and R matrices of the QR decomposition of the location matrices of the plurality of (n+1) combinations, and in a concurrent manner using the data-parallel coprocessor to generate in the memory the one or more tuples of necessary components of affine transformations based on the plurality of separate sets, the second spatial point set, and the plurality of solving structures.

9. The system of claim 5, wherein item (d) comprises for each of the plurality of collections of in-separate-sets indices performing the following overall-distance-measures-generating operations by one or more SIMD cores of the data-parallel coprocessor to generate an overall distance measure of the plurality of overall distance measures:
retrieving a determined (n+2) local index for each of the one or more pairs of neighbor (n+1) combinations using the pair of neighbor (n+1) combinations' corresponding collection of n+2 distinct point ids in the one or more collections of n+2 distinct point ids, wherein each component of the corresponding collection of n+2 distinct point ids has a corresponding component in the determined (n+2) local index, and for each component of the corresponding collection of n+2 distinct point ids, its corresponding component in the determined (n+2) local index is retrieved from the collection of in-separate-sets indices using the component of the corresponding collection of n+2 distinct point ids;
retrieving one or more local distance measures from the plurality of local distance measures based on the pair indices of the one or more pairs of neighbor (n+1) combinations, the determined (n+2) local index, and the plurality of bases; and
summarizing the one or more local distance measures to compute the overall distance measure.

10. The system of claim 3, wherein item (d) comprises for each of the plurality of collections of in-separate-sets indices performing the following overall-distance-measures-generating operations by one or more SIMD cores of the data-parallel coprocessor to generate an overall distance measure of the plurality of overall distance measures:
retrieving a determined (n+2) local index for each of the one or more pairs of neighbor (n+1) combinations using the pair of neighbor (n+1) combinations' corresponding collection of n+2 distinct point ids in the one or more collections of n+2 distinct point ids, wherein each component of the corresponding collection of n+2 distinct point ids has a corresponding component in the determined (n+2) local index, and for each component of the corresponding collection of n+2 distinct point ids, its corresponding component in the determined (n+2) local index is retrieved from the collection of in-separate-sets indices using the component of the corresponding collection of n+2 distinct point ids;
retrieving one or more local distance measures from the plurality of local distance measures based on the pair indices of the one or more pairs of neighbor (n+1) combinations, the determined (n+2) local index, and the plurality of bases; and
summarizing the one or more local distance measures to compute the overall distance measure.

11. A method for generating and evaluating N-to-1 mappings between spatial point sets in n-D, n being either 2 or 3, the method comprising:
providing a computing device comprising a programmable general purpose processor and a programmable data-parallel coprocessor coupled with the programmable general purpose processor;
receiving, by the computing device, a first and a second spatial point sets in nD, and a plurality of candidate correspondences between the first and the second spatial point sets, wherein each member of the spatial point sets comprises n coordinates, each of the plurality of candidate correspondences comprising a first reference to one member of the first spatial point set and a second reference to one member of the second spatial point set, and the plurality of candidate correspondences are grouped into a plurality of separate sets according to their end points in the first spatial point set, all the members of each of the plurality of separate sets having a common end point in the first spatial point set, each member of the first spatial point set has a corresponding separate set in the plurality of separate sets, and each of the plurality of candidate correspondences being indexed in its separate set by an in-separate-sets index;
receiving, by the computing device, a plurality of bases for the plurality of separate sets, wherein each of the plurality of separate sets has a corresponding base in the plurality of bases that is the size of the separate set;

generating, by the computing device, a plurality of collections of in-separate-sets indices and a plurality of overall distance measures based on the first and the second spatial point sets, the plurality of candidate correspondences, the plurality of bases, and a predetermined mapping scheme, wherein each of the plurality of collections of in-separate-sets indices has a corresponding overall distance measure in the plurality of overall distance measures, each of the plurality of collections of in-separate-sets indices comprises one of the plurality of in-separate-sets indices for a corresponding member of the first spatial point set for each member of the first spatial point set, the corresponding member of the first spatial point set being the end point in the first spatial point set of the candidate correspondence indexed by the in-separate-sets index in the plurality of candidate correspondences, whereby each of the plurality of collections of in-separate-sets indices represents an N-to-1 mapping between the members of the first spatial point set and the members of the second spatial point set; and generating, by the computing device, an optimal collection of in-separate-sets indices of the plurality of collections of in-separate-sets indices, wherein the optimal collection of in-separate-sets indices has the lowest overall distance measure among the plurality of overall distance measures.

12. The method of claim 11, wherein the members of the first spatial point set are referenced by the members of a first set of point ids, each member of the first spatial point set being referenced by a corresponding member of the first set of point ids, and the generating the plurality of collections of in-separate-sets indices with the plurality of overall distance measures comprises using the computing device for:

(1) generating a triangulation whose vertices comprise of all the members of the first spatial point set;

(2) generating a plurality of (n+1) combinations referenced by a plurality of (n+1) combination indices based on the triangulation, each of the plurality of (n+1) combinations comprising n+1 of the first set of point ids referencing n+1 distinct members of the first spatial point set, each of the plurality of (n+1) combinations being referenced by a corresponding (n+1) combination index of the plurality of (n+1) combination indices, wherein the n+1 distinct point ids are ordered according to the predetermined mapping scheme;

(3) generating one or more pairs of neighbor (n+1) combinations referenced by one or more pair indices based on the triangulation, wherein each of the one or more pairs of neighbor (n+1) combinations is referenced by one of the one or more pair indices, and each of the one or more pairs of neighbor (n+1) combinations comprises two of the plurality of (n+1) combination indices;

(4) generating one or more collections of n+2 distinct point ids of the first set of point ids and a plurality of between-digits mappings based on the predetermined mapping scheme, the plurality of (n+1) combinations, the one or more pairs of neighbor (n+1) combinations, wherein each of the plurality of one or more pairs of neighbor (n+1) combination has a corresponding collection of n+2 distinct point ids in the one or more collections of n+2 distinct point ids, the collection of n+2 distinct point ids comprising the distinct members of the two n+1 components of the two (n+1) combinations referenced by the pair of neighbor (n+1) combinations' two (n+1) combination indices, and a corresponding between-digits mapping in the plurality of between-digits mappings, and for each of the one or more pairs of neighbor (n+1) combinations, the n+2 components of its corresponding collection in the one or more collections of n+2 distinct point ids are ordered according to the predetermined mapping scheme and the n+2 components are mapped to the two n+1 components of the two (n+1) combinations referenced by the pair of neighbor (n+1) combinations' two (n+1) combination indices in the plurality of (n+1) combinations according to the pair of neighbor (n+1) combinations' corresponding between-digits mapping in the plurality of between-digits mappings; and (5) generating the plurality of collections of in-separate-sets indices and the plurality of overall distance measures based on the plurality of (n+1) combinations, the one or more pairs of neighbor (n+1) combinations, the plurality of separate sets, the first and the second spatial point sets, the plurality of between-digits mappings, the plurality of bases, and the one or more collections of n+2 distinct point ids.

13. The method of claim 12, wherein item (5) comprises:

(a) generating, using the computing device, a plurality of tuples of necessary components of affine transformations of a plurality of affine transformations based on the plurality of (n+1) combinations, the plurality of separate sets, the plurality of bases, and the first and second spatial point sets, the plurality of tuples of necessary components of affine transformations being selected from the group consisting of the collections of the left-submatrices of the plurality of affine transformations and the collections of the non-trivial components of the plurality of affine transformations;

(b) generating, in a concurrent manner using the data-parallel coprocessor, a plurality of local distance measures based on the one or more pairs of neighbor (n+1) combinations, the plurality of between-digits mappings, the plurality of bases, and the plurality of tuples of necessary components of affine transformations;

(c) generating, in a concurrent manner using the data-parallel coprocessor, the plurality of collections of in-separate-sets indices based on the plurality of bases; and (d) generating, in a concurrent manner using the data-parallel coprocessor, the plurality of overall distance measures based on the plurality of collections of in-separate-sets indices, the plurality of local distance measures, the one or more collections of n+2 distinct point ids, and the one or more pairs of neighbor (n+1) combinations.

14. The method of claim 13, wherein item (a) comprises for each of the plurality of (n+1) combinations performing the following necessary-components-generating operations:

retrieving, using the computing device, the (n+1) combination's n+1 members' n+1 corresponding separate sets' n+1 corresponding bases from the plurality of bases;

generating, using the computing device, one or more (n+1) local indices using the n+1 corresponding bases, wherein each of the one or more (n+1) local indices comprises n+1 of the plurality of in-separate-sets indices, the n+1 of the plurality of in-separate-sets indices indexing n+1 corresponding candidate correspondences in the (n+1) combination's n+1 members' n+1 corresponding separate sets and the point ids of the n+1 corresponding candidate correspondences' n+1 end points in the first spatial point set are the members of the (n+1) combination; and for the one or more (n+1) local indices generating using the computing device one or more of the plurality of tuples of necessary components of affine transformations based on the n+1 corresponding separate sets in the plurality of separate sets of the n+1 distinct members of the first spatial point set referenced by the (n+1) combination's n+1 of the first set of point ids, the n+1 corresponding separate sets' n+1 corresponding bases in the plurality of bases, and the first and second spatial point sets, wherein each of the one or more (n+1) local indices has a corresponding tuple of necessary components of affine transformations in the one or more of the plurality of tuples of necessary components of affine transformations and the corresponding tuple of necessary components of affine transformations is indexed in the plurality of tuples of necessary components of affine transformations by the combination of the (n+1) combination index of the (n+1) combination on one hand and the (n+1) local index on the other hand.

15. The method of claim 13, wherein item (b) comprises for each of the one or more pairs of neighbor (n+1) combinations performing the following local-distance-measures-generating operations by one or more SIMD cores of the data-parallel coprocessor:

retrieving the pair of neighbor (n+1) combinations' corresponding collection of n+2 distinct point ids' n+2 corresponding separate sets' n+2 corresponding bases in the plurality of bases;

generating one or more (n+2) local indices using the n+2 corresponding bases, wherein each of the one or more (n+2) local indices comprises n+2 of the plurality of in-separate-sets indices, the n+2 of the plurality of in-separate-sets indices indexing n+2 corresponding candidate correspondences in the pair of neighbor (n+1) combinations' corresponding collection of n+2 distinct point ids' n+2 corresponding separate sets and the point ids of the n+2 corresponding candidate correspondences' n+2 end points in the first spatial point set are the members of the pair of neighbor (n+1) combinations' corresponding collection of n+2 distinct point ids;

grouping each of the one or more (n+2) local indices into two (n+1) local indices according to the pair of neighbor (n+1) combinations' corresponding between-digits mapping in the plurality of between-digits mappings, wherein each of the two (n+1) local indices has a corresponding (n+1) combination in the plurality of (n+1) combinations that is indexed by one of the two (n+1) combination indices of the pair of neighbor (n+1) combinations, and for each of the two (n+1) local indices, the (n+1) local index comprises n+1 of the plurality of in-separate-sets indices, the n+1 of the plurality of in-separate-sets indices indexing n+1 corresponding candidate correspondences in the corresponding (n+1) combination's n+1 members' n+1 corresponding separate sets and the point ids of the n+1 corresponding candidate correspondences' n+1 end points in the first spatial point set are the members of the corresponding (n+1) combination;

for each of the one or more (n+2) local indices retrieving two of the plurality of tuples of necessary components of affine transformations based on the two (n+1) combination indices of the pair of neighbor (n+1) combinations, the plurality of bases, and the two (n+1) local indices grouped from the (n+2) local index; and for each of the one or more (n+2) local indices computing one of the plurality of local distance measures indexed by the combination of the pair index of the pair of neighbor (n+1) combinations on one hand and the (n+2) local index on the other hand based on the two tuples of necessary components of affine transformations retrieved for the (n+2) local index and the plurality of bases.

16. The method of claim 15, wherein each of the plurality of tuples of necessary components of affine transformations comprises the components of the left-submatrices of one of the plurality of affine transformations, and the computing in the memory one of the plurality of local distance measures based on the two tuples of necessary components of affine transformations comprises computing the Frobenius norm of the differences of the two left-submatrices of the two tuples of necessary components of affine transformations.

17. The method of claim 16, wherein item (a) comprises for each of the plurality of (n+1) combinations performing the following necessary-components-generating operations:

retrieving, using the computing device, the (n+1) combination's n+1 members' n+1 corresponding separate sets' n+1 corresponding bases from the plurality of bases;

generating, using the computing device, one or more (n+1) local indices using the n+1 corresponding bases, wherein each of the one or more (n+1) local indices comprises n+1 of the plurality of in-separate-sets indices, the n+1 of the plurality of in-separate-sets indices indexing n+1 corresponding candidate correspondences in the (n+1) combination's n+1 members' n+1 corresponding separate sets and the point ids of the n+1 corresponding candidate correspondences' n+1 end points in the first spatial point set are the members of the (n+1) combination; and for the one or more (n+1) local indices generating using the computing device one or more of the plurality of tuples of necessary components of affine transformations based on the n+1 corresponding separate sets in the plurality of separate sets of the n+1 distinct members of the first spatial point set referenced by the (n+1) combination's n+1 of the first set of point ids, the n+1 corresponding separate sets' n+1 corresponding bases in the plurality of bases, and the first and second spatial point sets, wherein each of the one or more (n+1) local indices has a corresponding tuple of necessary components of affine transformations in the one or more of the plurality of tuples of necessary components of affine transformations and the corresponding tuple of necessary components of affine transformations is indexed in the plurality of tuples of necessary components of affine transformations by the combination of the (n+1) combination index of the (n+1) combination on one hand and the (n+1) local index on the other hand.

18. The method of claim 17, wherein the generating one or more of the plurality of tuples of necessary components of affine transformations further comprises generating using the computing device a plurality of solving structures based on the first spatial point set and the plurality of (n+1) combinations, the plurality of solving structures being selected from the group consisting of the collections of the lower and upper triangular matrices of the LU decomposition of the location matrices of the plurality of (n+1) combinations, the collections of the inverses of the location matrices of the plurality of (n+1) combinations, and the collections of the Q and R matrices of the QR decomposition of the location matrices of the plurality of (n+1) combinations, and in a concurrent manner using the data-parallel coprocessor to generate the one or more tuples of necessary components of affine transformations based on the plurality of separate sets, the second spatial point set, and the plurality of solving structures.

19. The method of claim 15, wherein item (d) comprises for each of the plurality of collections of in-separate-sets indices performing the following overall-distance-measures-generating operations by one or more SIMD cores of the data-parallel coprocessor to generate an overall distance measure of the plurality of overall distance measures:

retrieving a determined (n+2) local index for each of the one or more pairs of neighbor (n+1) combinations using the pair of neighbor (n+1) combinations' corresponding collection of n+2 distinct point ids in the one or more collections of n+2 distinct point ids, wherein each component of the corresponding collection of n+2 distinct point ids has a corresponding component in the determined (n+2) local index, and for each component of the corresponding collection of n+2 distinct point ids, its corresponding component in the determined (n+2) local index is retrieved from the collection of in-separate-sets indices using the component of the corresponding collection of n+2 distinct point ids;

retrieving one or more local distance measures from the plurality of local distance measures based on the pair indices of the one or more pairs of neighbor (n+1) combinations, the determined (n+2) local index, and the plurality of bases; and summarizing the one or more local distance measures to compute the overall distance measure.

20. The method of claim 13, wherein item (d) comprises for each of the plurality of collections of in-separate-sets indices performing the following overall-distance-measures-generating operations by one or more SIMD cores of the data-parallel coprocessor to generate an overall distance measure of the plurality of overall distance measures:

retrieving a determined (n+2) local index for each of the one or more pairs of neighbor (n+1) combinations using the pair of neighbor (n+1) combinations' corresponding collection of n+2 distinct point ids in the one or more collections of n+2 distinct point ids, wherein each component of the corresponding collection of n+2 distinct point ids has a corresponding component in the determined (n+2) local index, and for each component of the corresponding collection of n+2 distinct point ids, its corresponding component in the determined (n+2) local index is retrieved from the collection of in-separate-sets indices using the component of the corresponding collection of n+2 distinct point ids;

retrieving one or more local distance measures from the plurality of local distance measures based on the pair indices of the one or more pairs of neighbor (n+1) combinations, the determined (n+2) local index, and the plurality of bases; and summarizing the one or more local distance measures to compute the overall distance measure.

\* \* \* \* \*